US011473626B2

(12) United States Patent
Ineson et al.

(10) Patent No.: US 11,473,626 B2
(45) Date of Patent: Oct. 18, 2022

(54) BEARING SYSTEM WITH SELF-LUBRICATION FEATURES, SEALS, GROOVES AND SLOTS FOR MAINTENANCE-FREE OPERATION

(71) Applicant: Roller Bearing Company of America, Inc., Oxford, CT (US)

(72) Inventors: David Ineson, Oakville, CT (US); Philip Smith, Harwinton, CT (US); Charles E. Condon, III, Harwinton, CT (US); John H. Cowles, Jr., Unionville, CT (US)

(73) Assignee: Roller Bearing Company of America, Inc., Oxford, CT (US)

( * ) Notice: Subject to any disclaimer, the term of this patent is extended or adjusted under 35 U.S.C. 154(b) by 270 days.

(21) Appl. No.: 16/845,568

(22) Filed: Apr. 10, 2020

(65) Prior Publication Data
US 2020/0240470 A1 Jul. 30, 2020

Related U.S. Application Data

(63) Continuation-in-part of application No. 15/594,881, filed on May 15, 2017, now Pat. No. 10,718,375.
(Continued)

(51) Int. Cl.
*F16J 15/36* (2006.01)
*F16C 33/74* (2006.01)
(Continued)

(52) U.S. Cl.
CPC ............ *F16C 33/74* (2013.01); *F16C 17/045* (2013.01); *F16J 15/3212* (2013.01)

(58) Field of Classification Search
CPC ..... F16C 33/74; F16C 17/045; F16J 15/3212; F16J 15/36; F16J 15/3476; F16J 15/3464; F16J 15/50–52
See application file for complete search history.

(56) References Cited

U.S. PATENT DOCUMENTS 2,489,545 A 11/1949 Storer et al.
3,018,112 A 1/1962 Amirault et al.
(Continued)

FOREIGN PATENT DOCUMENTS

CN 202017219 U 10/2011
DE 1044532 B 11/1958
(Continued)

OTHER PUBLICATIONS

Extended European Search Report issued in corresponding EP Application No. 201693819, dated Oct. 16, 2020, pp. 1-5.
(Continued)

*Primary Examiner* — Vishal A Patel
(74) *Attorney, Agent, or Firm* — Robinson & Cole LLP

(57) ABSTRACT

A maintenance-free bearing system having self-lubricating features, seals, grooves and slots for use in a cushion hitch assembly for a hitch pull scraper vehicle. An interconnected bearing linkage system having two or more horizontal two-axis combined journal and thrust bearings with self-lubricating liners therein, two or more vertical single-axis sleeve bearings with self-lubricating liners therein and one or more vertical thrust bearing with self-lubricating liners therein, that cooperate with one another to accommodate vertical and horizontal angular movement relative to one another. The vertical thrust bearings incorporate an outer seal assembly and/or an inner seal assembly with a tapered configuration that improves retention of the seal assembly during rotation.

26 Claims, 47 Drawing Sheets

Related U.S. Application Data

(60) Provisional application No. 62/336,811, filed on May 16, 2016.

(51) Int. Cl.
*F16C 17/04* (2006.01)
*F16J 15/3212* (2016.01)

(56) References Cited

U.S. PATENT DOCUMENTS

| | | | |
|---|---|---|---|
| 3,027,165 A * | 3/1962 | Kempff | F16J 15/36 |
| | | | 277/372 |
| 3,843,216 A | 10/1974 | Campbell | |
| 4,648,605 A | 3/1987 | Marsi | |
| 4,936,593 A * | 6/1990 | Finney | B63H 23/321 |
| | | | 74/18 |
| 5,026,324 A | 6/1991 | Schurger et al. | |
| 5,137,374 A | 8/1992 | Orkin | |
| 5,143,457 A | 9/1992 | Langhof et al. | |
| 5,263,736 A | 11/1993 | Stevens | |
| 5,827,042 A | 10/1998 | Ramsay | |
| 6,273,231 B1 | 8/2001 | Koschmieder et al. | |
| 6,517,082 B2 | 2/2003 | Yamada et al. | |
| 6,517,083 B2 | 2/2003 | Yamada et al. | |
| 6,616,118 B2 | 9/2003 | Nortier | |
| 6,726,219 B2 | 4/2004 | Bivens | |
| 6,866,271 B2 | 3/2005 | MacDonald | |
| 7,004,471 B2 | 2/2006 | Bryde et al. | |
| 7,036,613 B2 | 5/2006 | Burr | |
| 7,134,671 B2 | 11/2006 | Duke et al. | |
| 7,291,006 B2 | 11/2007 | Ilmonen | |
| 7,469,906 B2 | 12/2008 | Peet et al. | |
| 7,788,778 B2 | 9/2010 | Relan | |
| 7,850,765 B2 | 12/2010 | Kleinschmidt | |
| 7,901,140 B2 | 3/2011 | Petri | |
| 7,942,422 B2 | 5/2011 | Tierling | |
| 8,099,012 B2 | 1/2012 | Askren et al. | |
| 8,235,255 B2 | 8/2012 | Springhom et al. | |
| 8,272,556 B2 | 9/2012 | Marion | |
| 8,516,671 B2 | 8/2013 | Scheidenhelm | |
| 8,529,545 B2 | 9/2013 | Connolly et al. | |
| 8,544,816 B2 | 10/2013 | Bielass | |
| 8,590,304 B2 | 11/2013 | Bernadat et al. | |
| 8,590,903 B2 | 11/2013 | Berdichevsky et al. | |
| 8,764,034 B2 | 7/2014 | Wells et al. | |
| 8,833,338 B2 | 9/2014 | Pekrul | |
| 8,914,959 B2 | 12/2014 | Relan | |
| 8,919,782 B2 | 12/2014 | Berdichevsky | |
| 8,920,900 B2 | 12/2014 | Nakayama | |
| 9,599,227 B2 | 3/2017 | Himeno et al. | |
| 9,611,712 B2 | 4/2017 | Kalinec | |
| 9,624,645 B2 | 4/2017 | Choi et al. | |
| 9,775,460 B2 | 10/2017 | Summons | |
| 9,879,727 B2 | 1/2018 | Makke et al. | |
| 9,915,359 B2 | 3/2018 | Ricard et al. | |
| 10,139,003 B2 | 11/2018 | Yamanaka et al. | |
| 10,184,583 B2 | 1/2019 | Walkowski | |
| 10,221,954 B2 | 3/2019 | Fong | |
| 10,286,889 B2 | 5/2019 | Kim | |
| 2004/0056427 A1 | 3/2004 | Rapp et al. | |
| 2004/0113369 A1 | 6/2004 | Wright et al. | |
| 2004/0223930 A1 | 11/2004 | Cho | |
| 2004/0245728 A1 | 12/2004 | Armour et al. | |
| 2004/0256475 A1 | 12/2004 | Henige | |
| 2005/0167219 A1 | 8/2005 | Hall et al. | |
| 2006/0147141 A1 | 7/2006 | Harwood et al. | |
| 2006/0175762 A1 | 8/2006 | Barnett et al. | |
| 2007/0039654 A1 | 2/2007 | Pinette | |
| 2007/0166096 A1 | 7/2007 | Lim et al. | |
| 2008/0014300 A1 | 1/2008 | Ilmonen | |
| 2008/0053060 A1 | 3/2008 | Olver | |
| 2008/0169157 A1 | 7/2008 | Wyker et al. | |
| 2008/0251345 A1 | 10/2008 | Zahner et al. | |
| 2008/0315534 A1 | 12/2008 | Guiochet et al. | |
| 2009/0085328 A1 | 4/2009 | Moyna | |
| 2009/0220179 A1 | 9/2009 | Kaneko et al. | |
| 2009/0238506 A1 | 9/2009 | Inoue et al. | |
| 2009/0274566 A1 | 11/2009 | Fong | |
| 2009/0302548 A1 | 12/2009 | Ramsay | |
| 2010/0278642 A1 | 11/2010 | Olver | |
| 2011/0085757 A1 | 4/2011 | White et al. | |
| 2011/0091143 A1 | 4/2011 | Murphy et al. | |
| 2011/0220762 A1 | 9/2011 | Gyuricsko et al. | |
| 2012/0058923 A1 | 3/2012 | Hamel et al. | |
| 2012/0241648 A1 | 9/2012 | Krampert | |
| 2012/0313329 A1 | 12/2012 | Battles | |
| 2014/0016888 A1 | 1/2014 | Harper et al. | |
| 2014/0021687 A1 | 1/2014 | Berdichevsky et al. | |
| 2014/0093198 A1 | 4/2014 | Voisine | |
| 2014/0203520 A1 | 7/2014 | Yamanaka et al. | |
| 2014/0284883 A1 | 9/2014 | Kustermans et al. | |
| 2015/0031958 A1 | 1/2015 | Kleyman | |
| 2015/0226256 A1 | 8/2015 | Voisine | |
| 2015/0233417 A1 | 8/2015 | Komatsubara et al. | |
| 2015/0354703 A1 | 12/2015 | Berdichevsky et al. | |
| 2016/0068204 A1 | 3/2016 | Rathod | |
| 2017/0122055 A1 | 5/2017 | Embury | |
| 2018/0274584 A1 * | 9/2018 | Sato | F16J 3/042 |
| 2018/0355977 A1 | 12/2018 | Tanner et al. | |
| 2019/0226584 A1 | 7/2019 | Cabaj et al. | |
| 2019/0301612 A1 | 10/2019 | Maina et al. | |

FOREIGN PATENT DOCUMENTS

| | | |
|---|---|---|
| DE | 3873149 T2 | 3/1993 |
| DE | 10062983 A1 | 6/2002 |
| EP | 1659303 A1 | 5/2006 |
| EP | 2505858 A2 | 3/2012 |
| EP | 3489525 A1 | 5/2019 |
| FR | 2908728 A1 | 5/2008 |
| GB | 1482138 A | 8/1977 |
| JP | 2005069365 A | 3/2005 |
| WO | 2014018373 A1 | 1/2014 |

OTHER PUBLICATIONS

Office Action issued in corresponding EP Application No. 19210097.2, dated Aug. 4, 2021, pp. 1-6.
European Search Report issued in corresponding EP Application No. 19210097.2, dated Jan. 24, 2020, pp. 1-12.
Partial European Search Report for corresponding EP17171217 dated Oct. 20, 2017.

* cited by examiner 1330A, 1430A 1330B, 1430B

BEARING SYSTEM WITH SELF-LUBRICATION FEATURES, SEALS, GROOVES AND SLOTS FOR MAINTENANCE-FREE OPERATION

CROSS REFERENCE TO RELATED APPLICATIONS

The instant application is a continuation-in-part application of U.S. non-provisional patent application Ser. No. 15/594,881, now U.S. Pat. No. 10,718,375, filed May 15, 2017 and entitled "Bearing System with Self-Lubrication Features, Seals, Grooves and Slots for Maintenance-Free Operation" which claims priority to U.S. Provisional Patent Application No. 62/336,811, filed on May 16, 2016 and entitled "Bearing System with Self-Lubrication Features, Seals, Grooves and Slots for Maintenance-Free Operation", the entirety of which is incorporated herein by reference.

FIELD OF THE INVENTION

This invention relates to a maintenance-free bearing system having self-lubricating features, seals, grooves and slots for use in a cushion hitch assembly for a hitch pull scraper vehicle, and is more particularly related to an interconnected bearing linkage system having two or more horizontal two-axis combined journal and thrust bearings with self-lubricating liners therein, two or more vertical single-axis sleeve bearings with self-lubricating liners therein and one or more vertical thrust bearing with self-lubricating liners therein, that cooperate with one another to accommodate vertical and horizontal angular movement relative to one another. The one or more vertical thrust bearings incorporate an outer seal assembly and an inner seal assembly. At least one of the outer seal assembly, a groove in the rotatable thrust plate that accommodates a portion of the outer seal assembly, the inner seal assembly and a groove in a face seal ring proximate the stationary thrust plate that accommodates a portion of the inner seal assembly of the thrust bearing has a tapered configuration. The tapered configuration improves retention of the outer seal assembly in the groove of the rotatable thrust plate during rotation of the rotatable thrust plate and/or improves retention of the inner seal assembly in the face seal ring during rotation of the face seal ring relative to the stationary thrust plate.

BACKGROUND

As shown in FIG. 1 a hitch pull type scraper 100 includes a pulling portion 101 such as a diesel engine powered cab or cabin. A scraper bowl 102 is coupled to the pulling portion (e.g., a cab or cabin) 101 by a hitch assembly 103. The hitch assembly 103 includes two H-links each having two journal bearings therein having a common shaft and another two journal bearings having another common shaft. The H-links moveably couple a linkage structure to a portion of the pulling portion 101. The hitch assembly 103 includes two vertical journal bearings disposed in a housing. Above one of the journal bearings is a thrust bearing. The two vertical journal bearings each employ a bronze sleeve disposed between a shaft and an interior surface defined by a bore in housing to facilitate rotational movement between the shaft and the housing. The thrust bearing employs a bronze bearing plate disposed therein to accommodate rotational movement of an upper thrust plate relative to a lower thrust plate. The thrust bearing incorporates a self-lubricating sleeve that wears away over time, creating debris that is pushed out of the thrust bearing, which interferes with the operation of the upper thrust plate relative to the lower thrust plate.

A grease supply system (e.g., a configuration of tubes, valves and pressurizing devices) injects grease between the upper thrust plate and the lower thrust plate and the bronze bearing plate to maintain lubrication therebetween. The grease supply system also supplies grease to the sleeve in the journal bearings. The grease supply system can be damaged by projectiles such as rocks and stones that are propelled by the movement of the scraper 100. Use of a grease supply system leads to several undesired effects such as: 1) increased power requirements for the vehicle; 2) increased capital cost and maintenance related costs; and 3) environmental impact when old grease is purged from bearings, for example grease can seep out of the bearings during re-lubrication or due to leakage and can fall onto the ground. In addition, damage of the grease supply system can cause the flow of grease to the thrust bearing and journal bearings to cease and create undesirable grease discharge to the environment.

US 2014/093198 A1 relates to a two stage seal for spherical plain bearing assemblies to inhibit contamination from entering the bearing raceways. The bearing assembly (e.g., a spherical plain bearing assembly) includes an inner member (e.g., a ball) having an outer engagement surface. The bearing assembly also includes an outer race having an inner surface defining a first end and a second end. The inner surface is positioned on the outer engagement surface of the inner member. In order to reduce contamination of the surfaces in sliding engagement with each other, a first annular groove is formed in the inner surface, proximate one of the first end and the second end. A second annular groove is formed in the inner surface and is positioned axially inward from the first annular groove. An external seal is positioned in the first annular groove and slidably engages the inner member. An internal seal is positioned in the second annular groove and slidingly engages the inner member.

US 2011/085757 A1 relates generally to axle and final drive assemblies for heavy machinery, and more particularly to an axle assembly including a cover plate having a bearing assembly for engagement of an end of an axle shaft. In order to reduce wear, distortional stresses and the associated decreased axle performance and/or axle failure, a thrust plate is used in a drive assembly between an end of an axle shaft and a bearing, where the bearing is retained within a housing of a rotatable drive component. The thrust plate has a first end that defines an axle engaging wear surface and a second end that includes an extension configured for fitted engagement with the bearing, the thrust plate including a central axis of rotation, the axle engaging wear surface disposed transverse to the central axis.

EP 2 505 858 A2 discloses a self-lubricating spherical bearing. Many self-lubricating bearings experience ingress of contaminants that degrade the bearing and the self-lubricating coating compositions, especially for heavy load vehicles used in harsh environments, such as military equipment, construction vehicles, hauling vehicles, mining equipment, and fire trucks. To alleviate this problem, a sealed spherical bearing comprising a race and a ball disposed in the race is proposed, the race and the ball being rotatable relative to each other. The bearing further includes a ring-like seal having a first edge and a retainer. The retainer is secured to the first edge of the seal. The retainer is press-fit into a first annular groove defined by a race, so that the retainer is fixed relative to the race. The ring-like seal rotates with and engages a rotatable thrust plate and engages a stationary thrust plate that is coaxial with the rotatable thrust plate. The portion of the ring-like seal that engages the stationary thrust plate often becomes dislodged during rotation of the ring-like seal, exposing the rotating surfaces between the rotatable thrust plate and the stationary thrust plate to contamination.

Thus, there is a need for an improved bearing system for the hitch assembly in a scraper vehicle and a ring-like seal that maintains engagement with the stationary thrust plate during rotation of the rotatable thrust plate.

SUMMARY

There is disclosed herein an outer seal assembly for a thrust bearing assembly. The outer seal assembly includes a flexible outer annular ring and a sliding ring. The flexible outer annular ring extends between a first outer end and a second outer end and has a radially inward-opening C-shaped cross section. The cross section of the flexible outer annular ring has an anchor leg extending radially inward proximate to the first outer end. The anchor leg secures the outer annular ring to an outer receiving area of a rotatable thrust plate of the thrust bearing assembly. A flexible neck extends between the first outer end and the second outer end. A sealing leg extends radially inward, proximate to the second outer end. A sliding ring has a pocket formed therein. The sealing leg is secured in the pocket. The sliding ring is made from a lubricious material and slides in a groove of a stationary thrust plate of the thrust bearing assembly. The sealing leg and the pocket taper to improve retention of the sealing leg within the groove during rotation of the sliding ring within the stationary thrust plate.

In one embodiment, the sealing leg is elastically biased, in the radially inward direction into the pocket.

In one embodiment, the outer seal assembly has a lip extending axially away from the second outer end. The lip sealingly and slidingly engages a portion of the stationary thrust plate of the thrust bearing assembly.

In one embodiment, the outer ring has a metallic retaining ring secured to the first outer end. The retaining ring has a mounting portion thereon and the mounting portion is press fit into the receiving area.

In one embodiment, the outer seal has a shield extending radially away from the first outer end.

In one embodiment, an upper surface of the sealing leg and a lower surface of the sealing leg terminate at a radially inward engagement surface. The upper surface and/or the lower surface are oriented at a draft angle α, measured relative to a horizontal reference line. The draft angle α improves the retention of the sealing leg within the pocket as the sliding ring rotates in the groove of the stationary thrust plate.

In one embodiment, the pocket has a radially outward-opening C-shaped cross section shape having an upper sliding surface, a lower sliding surface and a radially inward pocket surface extending between. The upper sliding surface and/or the lower sliding surface are oriented at a draft angle β, measured relative to a horizontal reference line. The draft angle β improves the retention of the sealing leg within the pocket as the sliding ring rotates in the groove of the stationary thrust plate.

In one embodiment, the pocket has a radially outward-opening C-shaped cross section with an upper sliding surface, a lower sliding surface and a radially inward pocket surface extending between. A portion of the lower sliding surface is oriented at a draft angle β, measured relative to a horizontal reference line. The draft angle β being improves retention of the sealing leg within the pocket as the sliding ring rotates in the groove of the stationary thrust plate.

In one embodiment, the sliding ring rotates against an axial facing surface of the stationary thrust plate. A portion of the axial facing surface is oriented at a secondary draft angle γ, measured relative to a horizontal reference line. The draft angle β and/or the secondary draft angle γ improve the retention of the sealing leg within the pocket as the sliding ring rotates in the groove of the stationary thrust plate.

There is also disclosed herein an inner seal assembly for a thrust bearing assembly. The inner seal assembly has a flexible inner annular ring extending between a first inner end and a second inner end. The flexible inner annular ring has a serpentine shape having a radially outward-opening C-shaped cross section that transitions into a radially inward-opening C-Shaped cross section. The radially outward-opening C-shaped cross section has an anchor leg extending radially outward proximate to the first inner end, a radially extending transition leg and a first flexible neck extending between the first inner end and the radially extending transition leg. The anchor leg secures the inner annular ring to an inner receiving area of a rotatable thrust plate of the thrust bearing assembly. The radially inward-opening C-Shaped cross section has a sealing leg extending radially inward proximate to the second inner end and a second flexible neck extending between the sealing leg and the radially extending transition leg. The inner seal assembly also has a face seal ring, a compression seal and a biasing unit. The second inner end of the flexible inner annular ring being secured to the face seal ring. The face seal ring defining a pocket. The sealing leg is secured in the pocket and the sealing leg and/or the pocket tapers to improve retention of the sealing leg within the pocket during rotation of the face seal ring. The face seal ring is made of a lubricious material and slides on an axial facing surface of a stationary thrust plate of the thrust bearing assembly. The face seal has an axially facing groove opposite the axial facing surface of the stationary thrust plate. The compression seal is disposed in the axially facing groove. The compression seal seals against the axial facing surface of the stationary thrust plate. The biasing unit axially engaging the face seal ring and is compressed between the face seal ring and a receiving surface of the rotatable thrust plate. The biasing unit urges the face seal ring towards the axial facing surface of the stationary thrust plate, compressing the compression seal against the axial facing surface of the stationary thrust plate for sealing and engagement with the axial facing surface of the stationary thrust plate.

In one embodiment, an axial outward facing upper surface of the sealing leg and an axial inward facing lower surface of the sealing leg both terminate at a radial inward facing engagement surface and at least a portion of the axial outward facing upper surface and/or the axial inward facing lower surface is oriented at a draft angle α measured relative to a horizontal reference line. The draft angle α improves retention of the sealing leg within the pocket during rotation of the face seal ring.

In one embodiment, the pocket is defined by a radially outward-opening C-shaped cross section having an axial inward facing upper sliding surface, an axial outward facing lower sliding surface and a radial outward facing pocket surface extending between. The axial inward facing upper sliding surface and/or the axial outward facing lower sliding surface is oriented at a draft angle β measured relative to a horizontal reference line. The draft angle β improves retention of the sealing leg within the pocket during rotation of the face seal ring.

In one embodiment, the inner seal assembly includes a retainer ring secured to the anchor leg. The retainer ring secures the flexible inner annular ring in a shoulder formed in the rotatable thrust plate of the thrust bearing assembly.

In one embodiment, the biasing unit of the inner seal assembly surrounds the flexible inner annular ring.

In one embodiment, the retainer ring of the inner seal assembly has a metallic core with an elastomeric layer disposed thereon.

In one embodiment, the retainer ring of the inner seal assembly has an L-shaped cross section.

In one embodiment, the pocket of the inner seal assembly is radially outward facing and the sealing leg elastically biases radially inward, into the pocket.

In one embodiment, the compression seal of the inner seal assembly is made from an elastic material and the compressed compression seal is compressed by 10 to 20 percent of a size of the compression seal in a relaxed state.

There is also disclosed herein a seal assembly having an outer seal assembly and an inner seal assembly disposed radially inward of the outer seal assembly. The outer seal assembly includes a flexible outer annular ring and a sliding ring. The flexible outer annular ring extends between a first outer end and a second outer end and has a radially inward-opening C-shaped cross section. The cross section of the flexible outer annular ring has a first anchor leg extending radially inward proximate to the first outer end. The first anchor leg secures the outer annular ring to an outer receiving area of a rotatable thrust plate of the thrust bearing assembly. A first flexible neck extends between the first outer end and the second outer end. A first sealing leg extends radially inward, proximate to the second outer end. A sliding ring has a first pocket formed therein. The first sealing leg is secured in the first pocket. The sliding ring is made from a lubricious material and slides in a groove of a stationary thrust plate of the thrust bearing assembly. The first sealing leg and the first pocket taper to improve retention of the sealing leg within the groove during rotation of the sliding ring within the stationary thrust plate. The inner seal assembly has a flexible inner annular ring extending between a first inner end and a second inner end. The flexible inner annular ring has a serpentine shape having a radially outward-opening C-shaped cross section that transitions into a radially inward-opening C-Shaped cross section. The radially outward-opening C-shaped cross section has a second anchor leg extending radially outward proximate to the first inner end, a radially extending transition leg and a second flexible neck extending between the first inner end and the radially extending transition leg. The second anchor leg secures the inner annular ring to an inner receiving area of a rotatable thrust plate of the thrust bearing assembly. The radially inward-opening C-Shaped cross section has a second sealing leg extending radially inward proximate to the second inner end and a third flexible neck extending between the second sealing leg and the radially extending transition leg. The inner seal assembly also has a face seal ring, a compression seal and a biasing unit. The second inner end of the flexible inner annular ring being secured to the face seal ring. The face seal ring defining a second pocket. The second sealing leg is secured in the second pocket and the second sealing leg and/or the second pocket tapers to improve retention of the second sealing leg within the second pocket during rotation of the face seal ring. The face seal ring is made of a lubricious material and slides on an axial facing surface of a stationary thrust plate of the thrust bearing assembly. The face seal has an axially facing groove opposite the axial facing surface of the stationary thrust plate. The compression seal is disposed in the axially facing groove. The compression seal seals against the axial facing surface of the stationary thrust plate. The biasing unit axially engaging the face seal ring and is compressed between the face seal ring and a receiving surface of the rotatable thrust plate. The biasing unit urges the face seal ring towards the axial facing surface of the stationary thrust plate, compressing the compression seal against the axial facing surface of the stationary thrust plate for sealing and engagement with the axial facing surface of the stationary thrust plate.

In one embodiment, an upper surface of the first sealing leg and a lower surface of the first sealing leg terminate at a radially inward engagement surface. The upper surface and/or the lower surface are oriented at a draft angle α, measured relative to a horizontal reference line. The draft angle α improves the retention of the first sealing leg within the first pocket as the sliding ring rotates in the groove of the stationary thrust plate.

In one embodiment, the first pocket has a radially outward-opening C-shaped cross section shape having an upper sliding surface, a lower sliding surface and a radially inward first pocket surface extending between. The upper sliding surface and/or the lower sliding surface are oriented at a draft angle β, measured relative to a horizontal reference line. The draft angle β improves the retention of the first sealing leg within the first pocket as the sliding ring rotates in the groove of the stationary thrust plate.

In one embodiment, the first pocket has a radially outward-opening C-shaped cross section with an upper sliding surface, a lower sliding surface and a radially inward first pocket surface extending between. A portion of the lower sliding surface is oriented at a draft angle β, measured relative to a horizontal reference line. The draft angle β being improves retention of the first sealing leg within the pocket as the sliding ring rotates in the groove of the stationary thrust plate.

In one embodiment, the sliding ring rotates against an axial facing surface of the stationary thrust plate. A portion of the axial facing surface is oriented at a secondary draft angle γ, measured relative to a horizontal reference line. The draft angle β and/or the secondary draft angle γ improve the retention of the first sealing leg within the first pocket as the sliding ring rotates in the groove of the stationary thrust plate.

In one embodiment, an axial outward facing upper surface of the second sealing leg and an axial inward facing lower surface of the second sealing leg both terminate at a radial inward facing engagement surface and at least a portion of the axial outward facing upper surface and/or the axial inward facing lower surface is oriented at a draft angle α measured relative to a horizontal reference line. The draft angle α improves retention of the second sealing leg within the second pocket during rotation of the face seal ring.

In one embodiment, the second pocket is defined by a radially outward-opening C-shaped cross section having an axial inward facing upper sliding surface, an axial outward facing lower sliding surface and a radial outward facing second pocket surface extending between. The axial inward facing upper sliding surface and/or the axial outward facing lower sliding surface is oriented at a draft angle β measured relative to a horizontal reference line. The draft angle β improves retention of the second sealing leg within the pocket during rotation of the face seal ring.

DETAILED DESCRIPTION OF THE INVENTION

Figure 1:
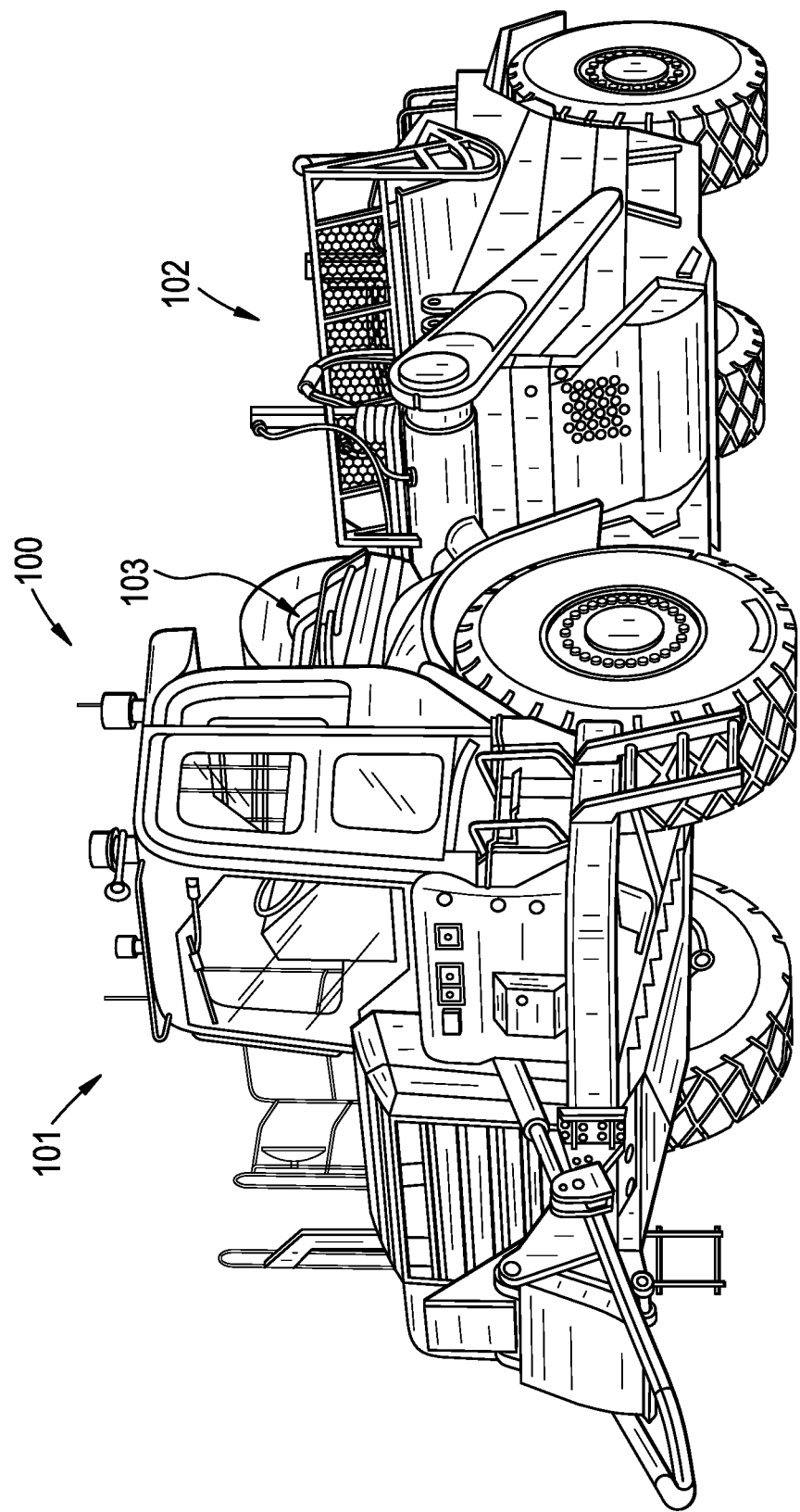
FIG. 1 is a perspective view of a hitch pull scraper vehicle.
Figure 2:
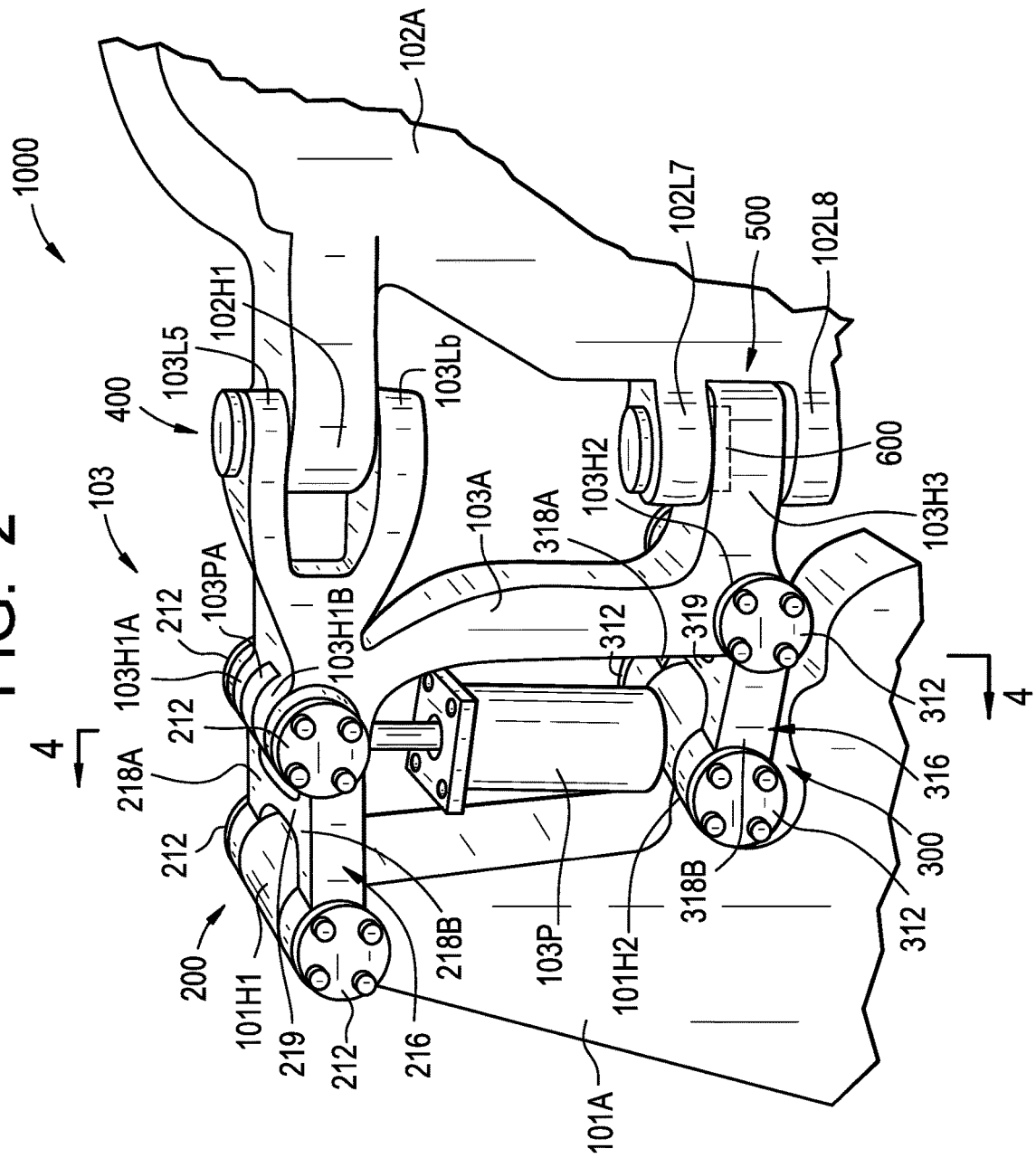
FIG. 2 is an enlarged view of the hitch area of a hitch pull scraper as shown in FIG. 1.

Referring to FIG. 2, a bearing system for a hitch assembly for a heavy load capacity vehicle (e.g., a scraper bowl 102 hitched (via the hitch assembly 103) to and pulled by a diesel engine power cabin or cab 100, as shown in FIG. 1) is generally designated by the number 1000. The bearing system 1000 includes a linkage structure having three links, for example: 1) a cabin support link 101A (e.g., a support structure) extending from the cabin 101; 2) a bowl support link 102A (e.g., a support structure); and 3) a connector link 103A (e.g., a support structure) that moveably couples the cabin support link 101A to the bowl support link 102A to allow rotational movement in two or more axes of rotation (e.g., horizontal and vertical). In one embodiment, a piston cylinder assembly 103P is coupled to the cabin support link 101A and the connector link 103A.

As shown in FIG. 2 the bearing system includes: 1) a first journal bearing assembly 200 that is moveably secured to the cabin support link 101A and the connector link 103A; 2) a second journal bearing assembly 300 is moveably secured to the cabin support link 101A and the connector link 103A; 3) a third journal bearing assembly 400 moveably secured to the connector link 103A and the bowl support link 102A; 4) a fourth journal bearing assembly 500 moveably secured to the connector link 103A and the bowl support link 102A; and 5) a thrust bearing assembly 600 disposed above the fourth journal bearing assembly 500 and between the connector link 103A and the bowl support link 102A. In one embodiment, one or more seals, as described herein, are disposed in one or more of the first journal bearing assembly 200, the second journal bearing assembly 300, the third journal bearing assembly 400, the fourth journal bearing assembly 500 and the thrust bearing assembly 600.

Figure 3:
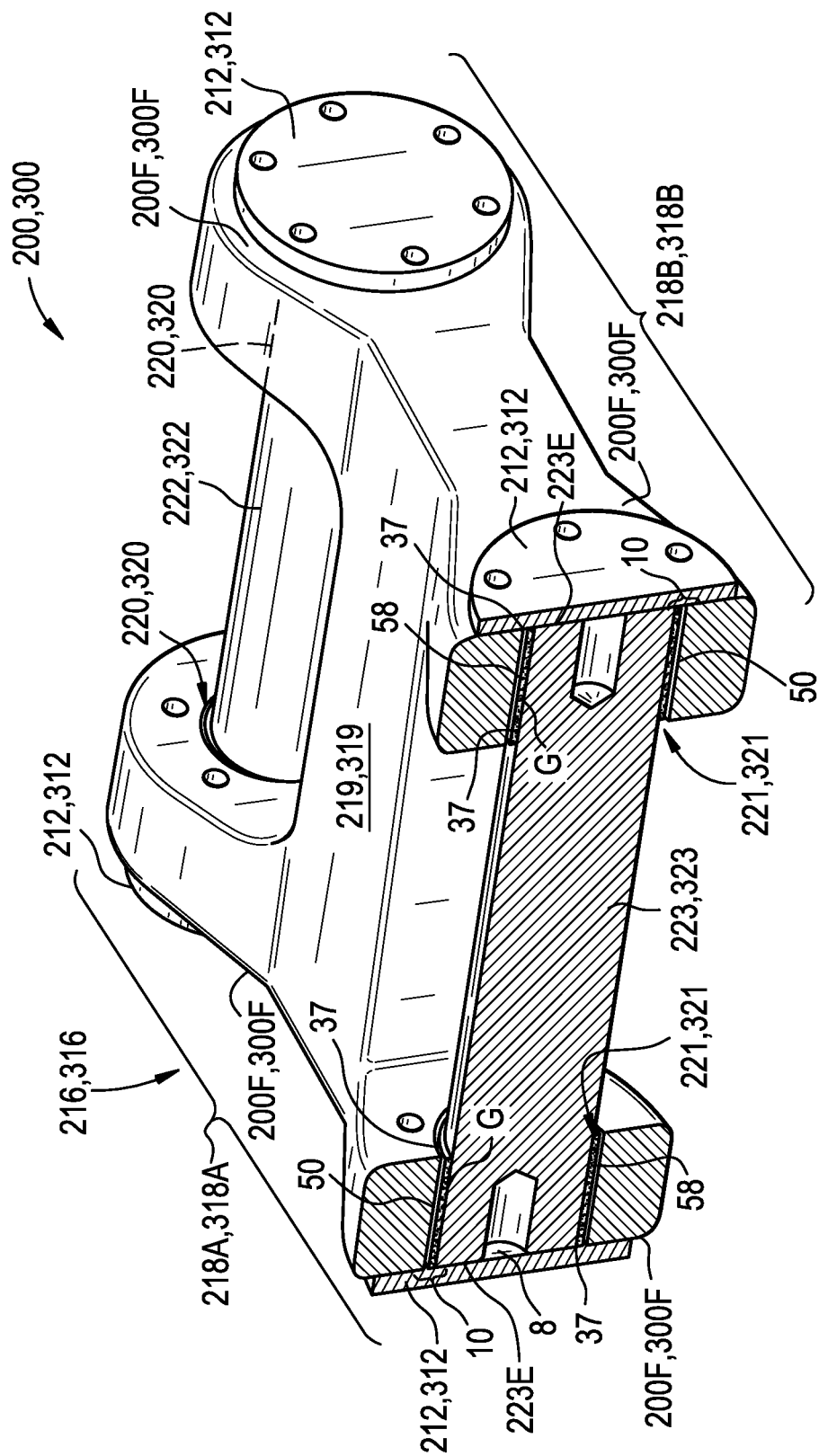
FIG. 3 is a perspective and partial cross sectional view of one of the H-links of FIG. 2, taken across line 4-4 and having a bearing with a self-lubricating sleeve, of the present invention disposed therein.

As shown in FIG. 2 the first journal bearing assembly is generally designated by the number 200. The first journal bearing assembly 200 (e.g., an H-link assembly as shown in FIG. 3) includes four self-lubricating sleeve assemblies 10 (see FIG. 5) disposed therein and an end cap (212, 12 in FIG. 6) positioned on an axial end of each of four positions on the first journal bearing assembly 200. The thrust bearing end caps 212 each have a self-lubricating pad 8 (See FIG. 6) disposed on an axially inward facing surface thereof. While the thrust bearing end caps are shown and described herein, the present invention is not limited in this regard, as other configurations may apply, including, but not limited to, those with integrally sealed or welded ends, or with no end caps or partial end caps.

As shown in FIGS. 3, 4, 5, 7, 8, 10, 11, 13, 15, 17, 20, 22, 23, 25, 28 and 29, each of the self-lubricating sleeve assemblies 10 includes an outer sleeve 50 with a self-lubricating sleeve 58 secured (e.g., via an adhesive such as epoxy or phenolic resin) to an interior surface of the outer sleeve 50, as described further herein.

As shown in FIG. 2 the second journal bearing assembly is generally designated by the number 300. The second journal bearing assembly 300 (e.g., an H-link assembly as shown in FIG. 3) includes four of the self-lubricating sleeve assemblies 10 (see FIG. 5) disposed therein and one of the end caps (312, 12 in FIG. 6) positioned on an axial end of each of four positions on the second journal bearing assembly 300. The end caps 312 each have one of the self-lubricating pads 8 (see FIG. 6) disposed on the axially inward facing surface thereof.

The third journal bearing assembly 400 includes one of the self-lubricating sleeve assemblies 10 (see FIG. 5) disposed therein.

The fourth journal bearing assembly 500 includes one of the self-lubricating sleeve assemblies 10 (see FIG. 5) disposed therein. The thrust bearing assembly 600 is disposed around the fourth journal bearing assembly 500 and includes a self-lubricating cartridge 14 (see FIG. 10) disposed on at least one axially facing surface thereof.

As shown in FIG. 3, the first journal bearing assembly 200 is mounted in a first housing 216 (e.g., a body portion of the H-link). The first housing 216 includes a first leg 218A and a second leg 218B spaced apart from and centrally coupled to one another by a joint 219.

As shown in FIG. 3, a first bore 220 extends through the first leg 218A and the second leg 218B. One of the self-lubricating sleeve assemblies 10 (see FIG. 5) is secured in the first bore 220 of each of the first leg 218A and the second leg 218B. A first shaft 222 extends into and rotatingly engages a radially inward facing surface of each of the self-lubricating sleeves 58 in the first bore 220 of each of the first leg 218A and the second leg 218B. The first shaft 222 is configured to receive a first hub 101H1 (as shown in FIG. 2) therearound and between the first leg 218A and the second leg 218B. The first hub 101H1 extends from the cabin support link 101A. A thrust bearing end cap 212 is removeably secured (e.g., via bolting) to an axially outward facing surface 200F of each the first housing 216 outside of the first bore 220 of the each of the first leg 218A and the second leg 218B. As shown in FIG. 6, each of the end caps 212 includes a self-lubricating pad 8 secured thereto for sliding engagement with a respective axial end of the first shaft 222. The self-lubricating pad 8 is centrally located between a circular pattern of bolt holes 8H, as shown in FIG. 6.

Figure 4:
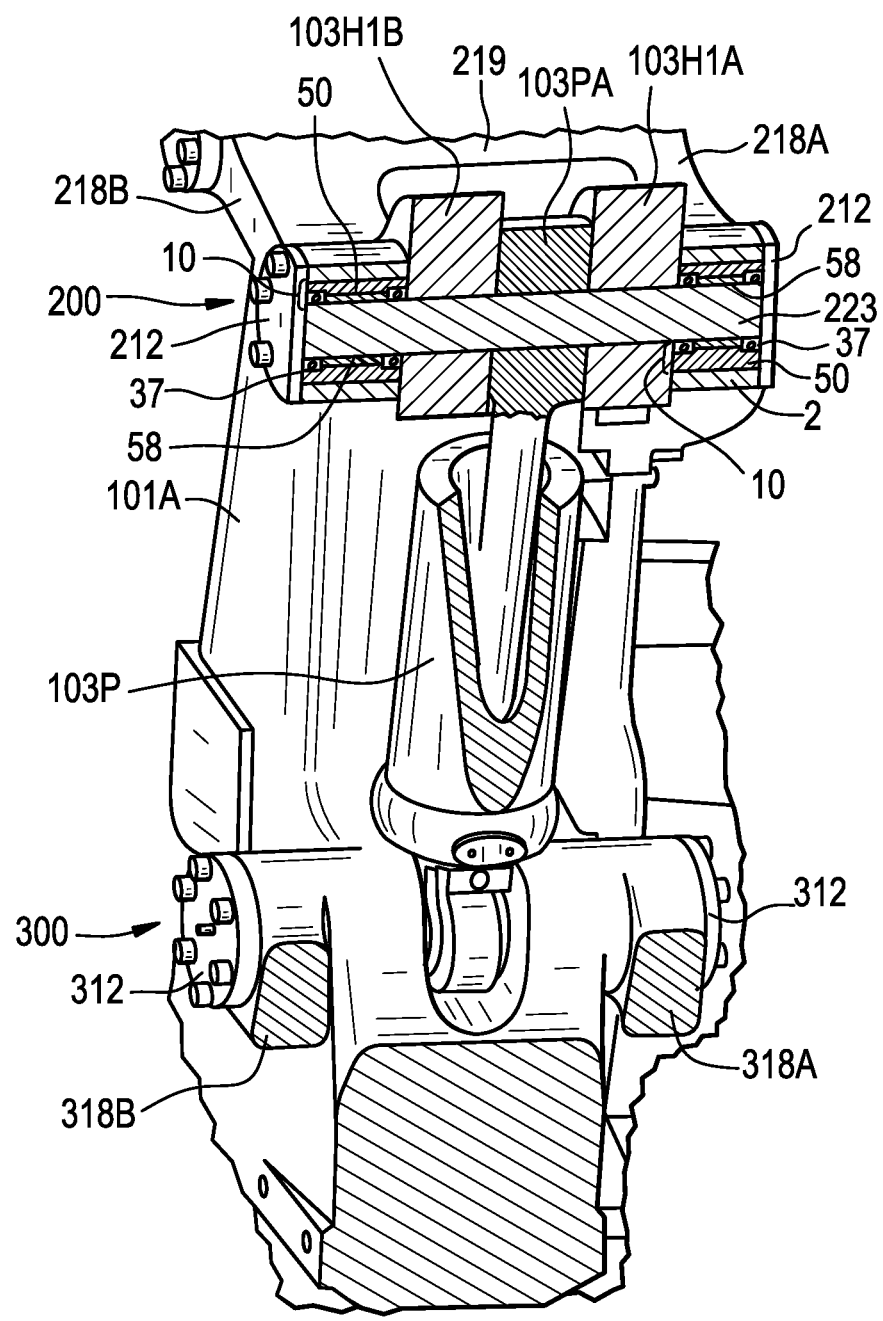
FIG. 4 is a cross sectional view of a portion of the hitch of FIG. 2 taken across line 4-4.

As shown in FIG. 3, a second bore 221 extends through the first leg 218A and the second leg 218B. One of the self-lubricating sleeve assemblies 10 (see FIG. 5) is secured in the second bore 221 of each of the first leg 218A and the second leg 218B. A second shaft 223 extends into and rotatingly engages an axially inward facing surface of each of the self-lubricating pads 8 in the first bore 220 of each of the first leg 218A and the second leg 218B. The second shaft 223 is configured to receive a pair of second hubs 103H1A and 103H1B therearound (as shown in FIG. 2) and between the first leg 218A and the second leg 218B. The pair of second hubs 103H1A and 103H1B extend from the connector link 103A. A thrust bearing end cap 212 is removeably secured (e.g., via bolting) to an axially outward facing surface 200F of each the first housing 216 outside of the second bore 221 of the each of the first leg 218A and the second leg 218B. As shown in FIG. 6, each of the end caps 212 includes a self-lubricating pad 8 secured thereto for sliding engagement with a respective axial end 223E of the first shaft 223, as shown in FIG. 3. The self-lubricating pad 8 is centrally located between a circular pattern of bolt holes 8H. In one embodiment, a piston hub 103PA extends from the piston cylinder assembly 103P and has a bore therein in which the shaft 223 extends. The piston hub 103PA is positioned between the pair of second hubs 103H1A and 103H1B, as shown in FIG. 4.

As shown in FIG. 3, the second journal bearing assembly 300 is mounted in a second housing 316 (e.g., a body portion of the H-link). The second housing 316 includes a first leg 318A and a second leg 318B spaced apart from and centrally coupled to one another by a joint 319.

As shown in FIG. 3, a third bore 320 extends through the first leg 318A and the second leg 318B. One of the self-lubricating sleeves 10 (see FIG. 5) is secured in the third bore 320 of each of the first leg 318A and the second leg 318B. A third shaft 322 extends into and rotatingly engages a radially inward facing surface of each of the self-lubricating sleeves 58 in the third bore 320 of each of the first leg 318A and the second leg 318B. The third shaft 322 is configured to receive a third hub 101H2 therearound and between the first leg 318A and the second leg 318B. The third hub 101H2 extends from the cabin support link 101A. A thrust bearing end cap 312 is removeably secured (e.g., via bolting) to an axially outward facing surface 300F of the second housing 316 outside of the third bore 320 of the each of the first leg 318A and the second leg 318B. As shown in FIG. 6, each of the end caps 312 includes a self-lubricating pad 8 secured thereto for sliding engagement with a respective axial end 322E of the third shaft 322. The self-lubricating pad 8 is centrally located between a circular pattern of bolt holes 8H.

As shown in FIG. 3, a fourth bore 321 extends through the first leg 318A and the second leg 318B. One of the self-lubricating sleeves 10 (see FIG. 5) is secured in the fourth bore 321 of each of the first leg 318A and the second leg 318B. A fourth shaft 323 extends into and rotatingly engages a radially inward facing surface of each of the self-lubricating sleeves 58 in the first bore 320 of each of the first leg 318A and the second leg 318B. The fourth shaft 323 is configured to receive a fourth hub 103H2 therearound and between the first leg 318A and the second leg 318B. The fourth hub 103H2 extends from the connector link 103A. A thrust bearing end cap 312 is removeably secured (e.g., via bolting) to an axially outward facing surface 300F of each the second housing 316 outside of the fourth bore 321 of the each of the first leg 318A and the second leg 318B. As shown in FIG. 6, each of the end caps 312 includes a self-lubricating pad 8 secured thereto for sliding engagement with a respective axial end 322E of the fourth shaft 323. The self-lubricating pad 8 is centrally located between a circular pattern of bolt holes 8H.

Figure 7:
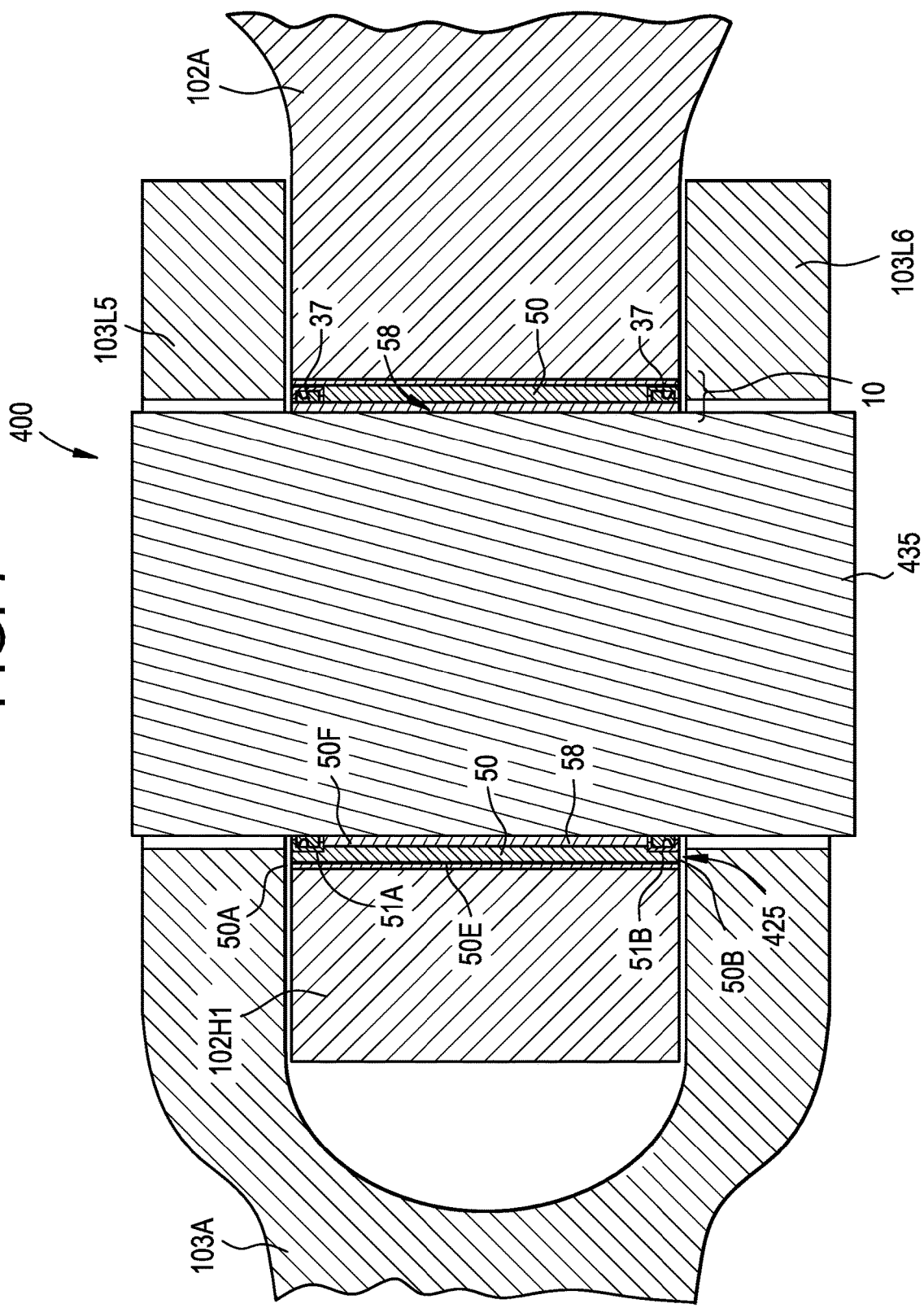
FIG. 7 is a cross sectional view of the journal bearing assembly of FIG. 2 shown with the journal bearing of FIG. 5 therein.

As shown in FIG. 7, a third journal bearing assembly 400 (e.g., a vertical journal bearing assembly) is mounted in a third housing 102H1. The third housing 102H1 extends from the bowl support link 102A and is positioned between a fifth leg 103L5 and a sixth leg 103L6 each extending from the connector link 103A. As shown in FIG. 7, a fifth bore 425 extends through the third housing 102H1, the fifth leg 103L5 and the sixth leg 103L6. One of the self-lubricating sleeves 58 is secured in the fifth bore 425. A fifth shaft 435 extends into and rotatingly engages a radially inward facing surface of the self-lubricating sleeve 58.

Figure 10:
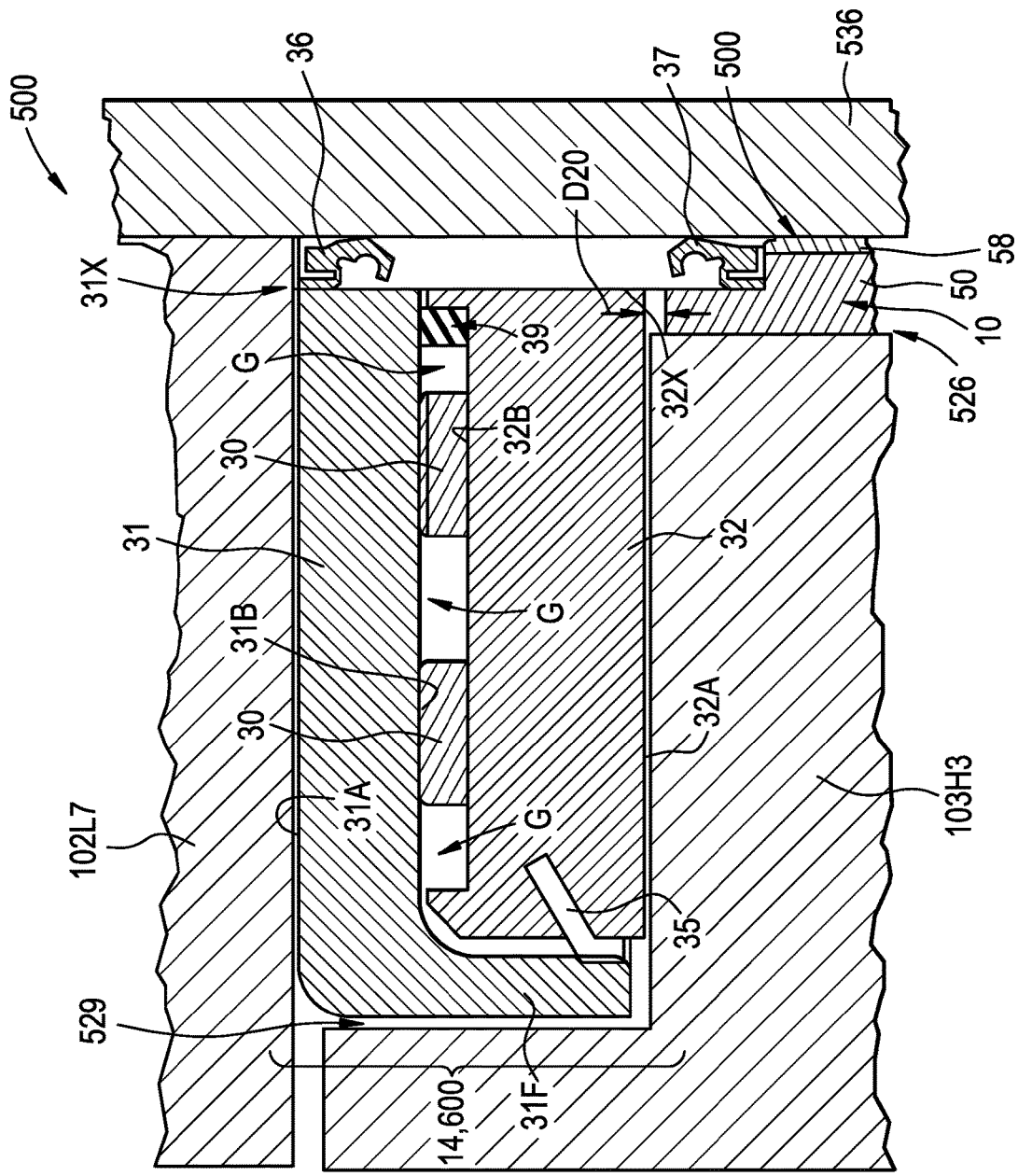
FIG. 10 is a cross sectional view of a first embodiment of a thrust bearing of the present invention.
Figure 11:
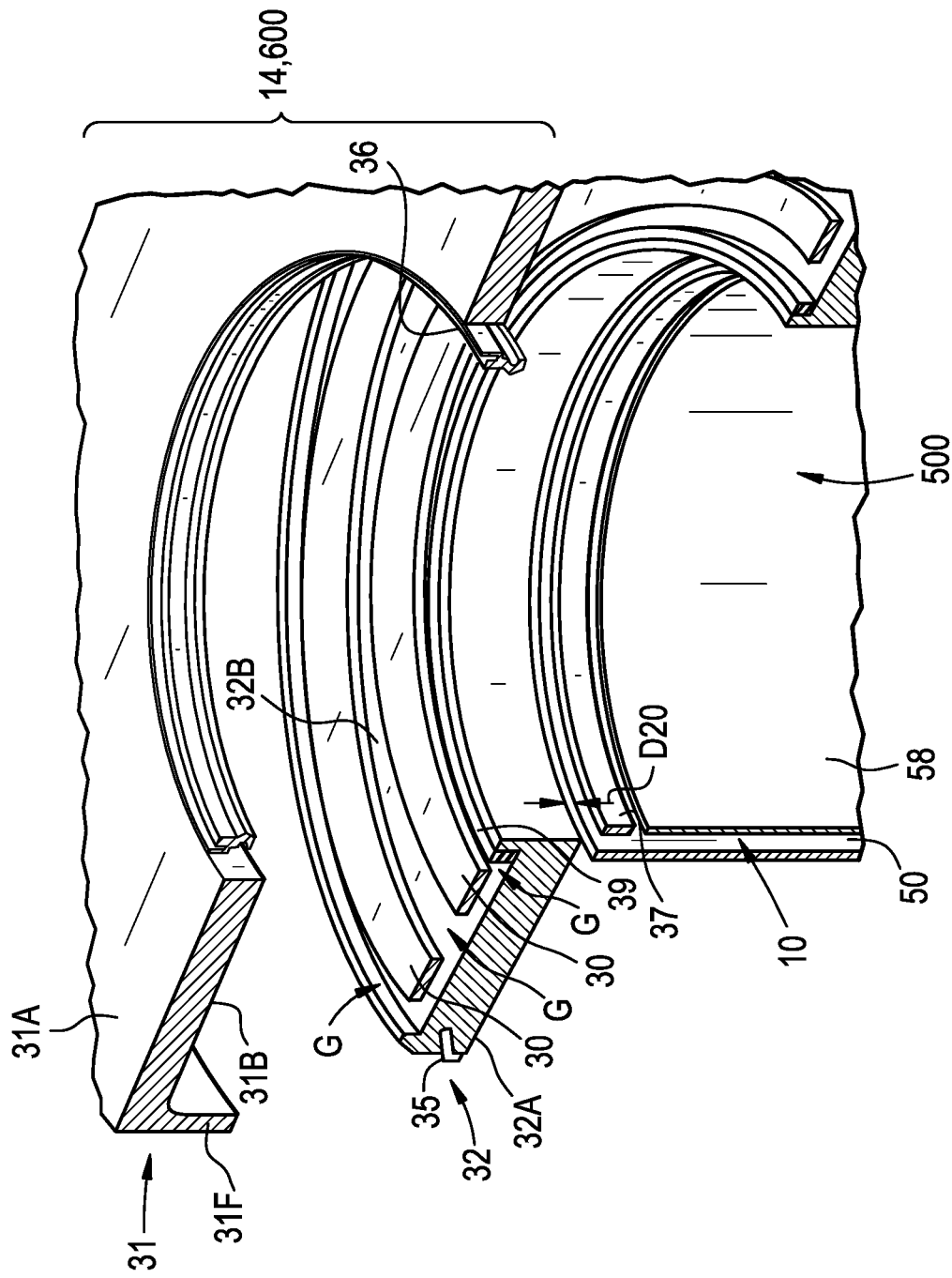
FIG. 11 an exploded perspective view of the thrust bearing of FIG. 10.
Figure 12:
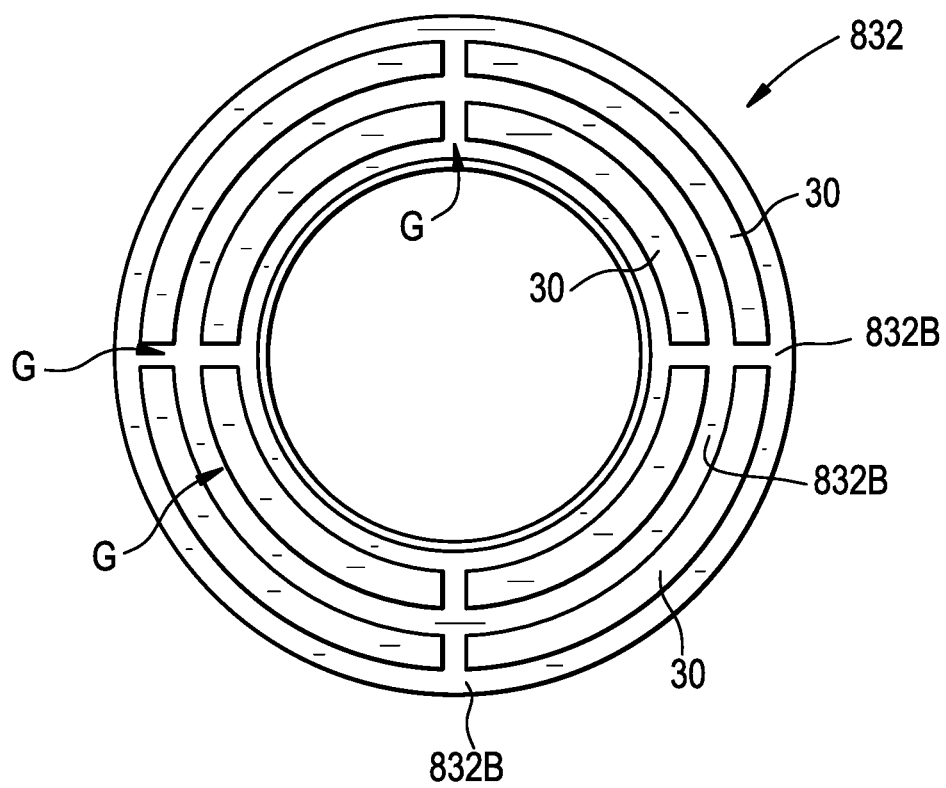
FIG. 12 is a top view of the thrust pad of the thrust bearing of FIG. 10.

As shown in FIG. 10, a fourth journal bearing assembly 500 (e.g., a vertical journal bearing assembly) is mounted in a fourth housing 103H3. The fourth housing 103H3 extends from the connector link 103A and is positioned between a seventh leg 102L7 and an eighth leg 102L8 each extending from the bowl support link 102A. As shown in FIG. 10, a sixth bore 526 extends through the fourth housing 103H3, the seventh leg 102L7 and the eighth leg 102L8. One of the self-lubricating sleeve assemblies 10 is secured in the fifth bore 435. A sixth shaft 536 extends into and rotatingly engages a radially inward facing surface of the self-lubricating sleeve 58. The fourth housing 103H3 has an annular recess 529 formed therein.

As shown in FIG. 10, a thrust bearing cartridge 14 is positioned in the annular recess 529, between the seventh leg 102L7 and the fourth housing 103H3. The thrust bearing cartridge 14 includes one or more self-lubricating pads 30 therein. The thrust bearing cartridge 14 is positioned above and spaced apart from the fourth journal bearing assembly 500 by a distance D20.

As shown in FIG. 10, the thrust bearing cartridge 14 includes a first thrust plate 31 having a first axially outwardly facing surface 31A and a first axially inwardly facing surface 31B. The thrust bearing cartridge 14 includes a second thrust plate 32 having a second axially outwardly facing 32A surface and a second axially inwardly facing surface 32B. The first axially inwardly facing surface 31B and the second axially inwardly facing surface 32B arranged to face one another. A self-lubricating pad 30 (e.g., liner or annular pads) is secured to the second axially inwardly facing surface 32B, wherein a portion of the self-lubricating liner slidingly engages the first axially inwardly facing surface 31B.

As shown in FIG. 10, the thrust bearing cartridge 14 includes an annular flange 31F extending from a first radially outer portion of the first thrust plate 31 and over a second outer portion of the second thrust plate 32. In one embodiment, a bearing seal 35 (e.g., an annular lip seal) extends between the annular flange 31F and the second thrust plate 32. The seal 35 is moveable with respect to the first thrust plate 31 and/or the second thrust plate 32. In one embodiment, another annular seal 39 extends between and sealingly engages radially inward portions of the first thrust plate 31 and/or the second thrust plate 32.

In one embodiment, the first axially facing surface 31B has a surface roughness of Ra 16 to Ra 8.

In one embodiment, the first thrust plate 31 has a first central opening 31X extending therethrough and the second thrust plate 32 has a second central opening 32X extending therethrough.

In one embodiment, an annular shaft seal 36 is disposed in the first central opening 31X and/or the second central opening 32X and engages the sixth shaft 536. In one embodiment, one annular shaft seal 36 (e.g., bearing seal) is disposed on radially inner portions of the first thrust plate 31 and/or the second thrust plate 32.

In one embodiment, the self-lubricating pad 30 has one or more grooves G (e.g., three grooves shown) formed therein for collection of debris.

Figure 13:
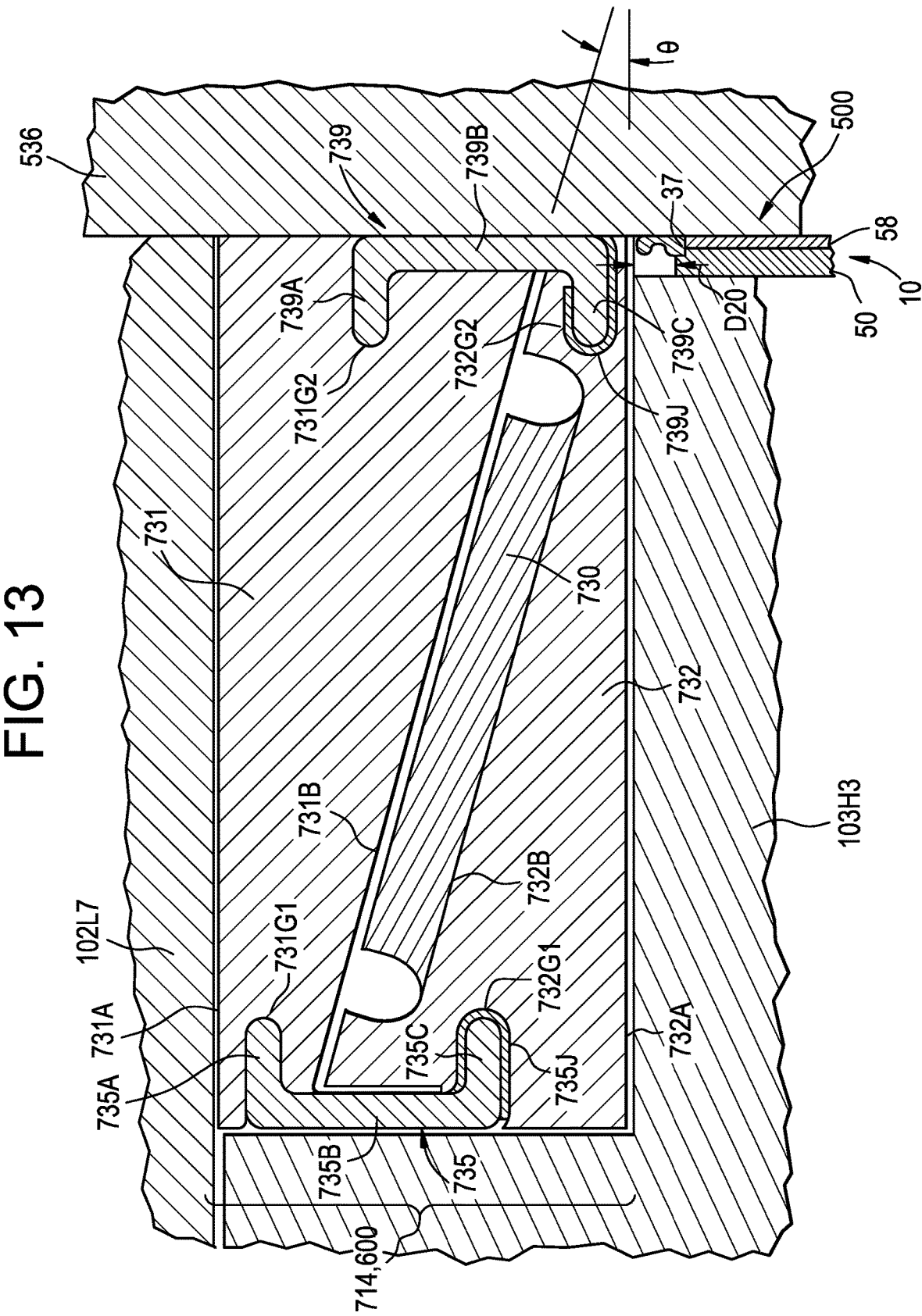
FIG. 13 is a cross sectional view of a second embodiment of a thrust bearing of the present invention.
Figure 14:
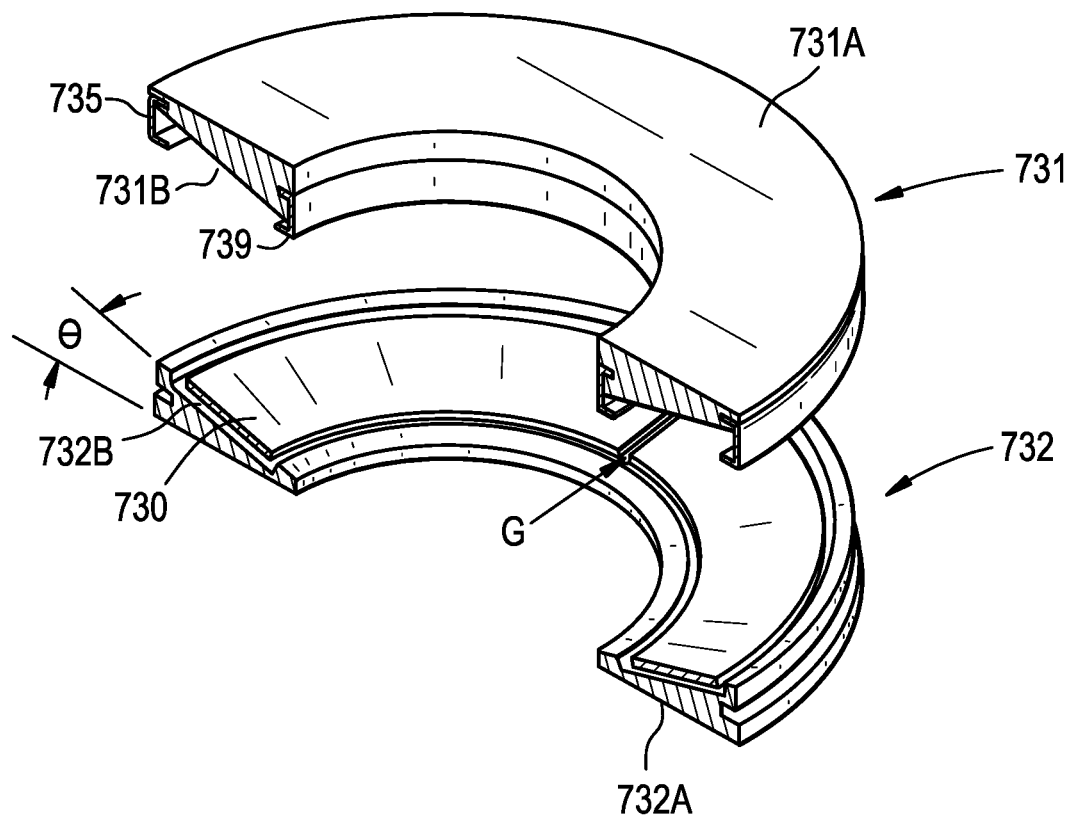
FIG. 14 is an exploded and cross sectional view of the thrust bearing of FIG. 13.

As shown in FIGS. 13 and 14, the thrust bearing cartridge 714 is similar to the thrust bearing cartridge 14 of FIG. 10. Thus, similar elements are assigned similar reference characters preceded by the numeral 7. The first thrust plate 731 has a decreasing taper (e.g., angle β in a radially outward direction) and the second thrust plate 732 has in increasing taper in the radially outward direction. A self-lubricating liner 730 is disposed between the first thrust plate 731 and the second thrust plate 732, similar to that described above for the thrust bearing cartridge 14. The thrust bearing cartridge 714 has a C-shaped annular seal 735 extending between and slidingly engaging the first thrust plate 731 and the second thrust plate 732, on radially outward portions thereof. The thrust bearing cartridge 714 has a C-shaped annular seal 739 extending between and slidingly engaging the first thrust plate 731 and the second thrust plate 732, on a radially inward portion thereof.

As shown in FIG. 13, the C-shaped annular seal 735 includes a first leg 735A extending radially inward from one end of a base portion 735B and a second leg 735C extending radially inward from a second end of the base portion 735B. In one embodiment, a J-shaped cup 735J is secured over the second leg 735C. The J-shaped cup is manufactured from a lubricious material such as a plastic. The J-shaped cup 735J is seated in and slidingly engages a second groove 732G1 formed in the second thrust plate 732. The first leg 735A is secured in a first groove 731G1 formed in the first thrust plate 731. While the J-shaped cup is shown and described as being secured over the second leg 735C, the present invention is not limited in this regard as one of the J-shaped cups may be secured to the first leg 735A in addition to or in the alternative to being secured to the second leg 735C.

As shown in FIG. 13, the C-shaped annular seal 739 includes a first leg 739A extending radially outward from one end of a base portion 739B and a second leg 739C extending radially outward from a second end of the base portion 739B. In one embodiment, a J-shaped cup 739J is secured over the second leg 739C. The J-shaped cup is manufactured from a lubricious material such as a plastic. The J-shaped cup 739J is seated in and slidingly engages a second groove 732G2 formed in the second thrust plate 732. The first leg 739A is secured in a first groove 731G2 formed in the first thrust plate 731. While the J-shaped cup is shown and described as being secured over the second leg 739C, the present invention is not limited in this regard as one of the J-shaped cups may be secured to the first leg 739A in addition to or in the alternative to being secured to the second leg 739C.

Figure 8:
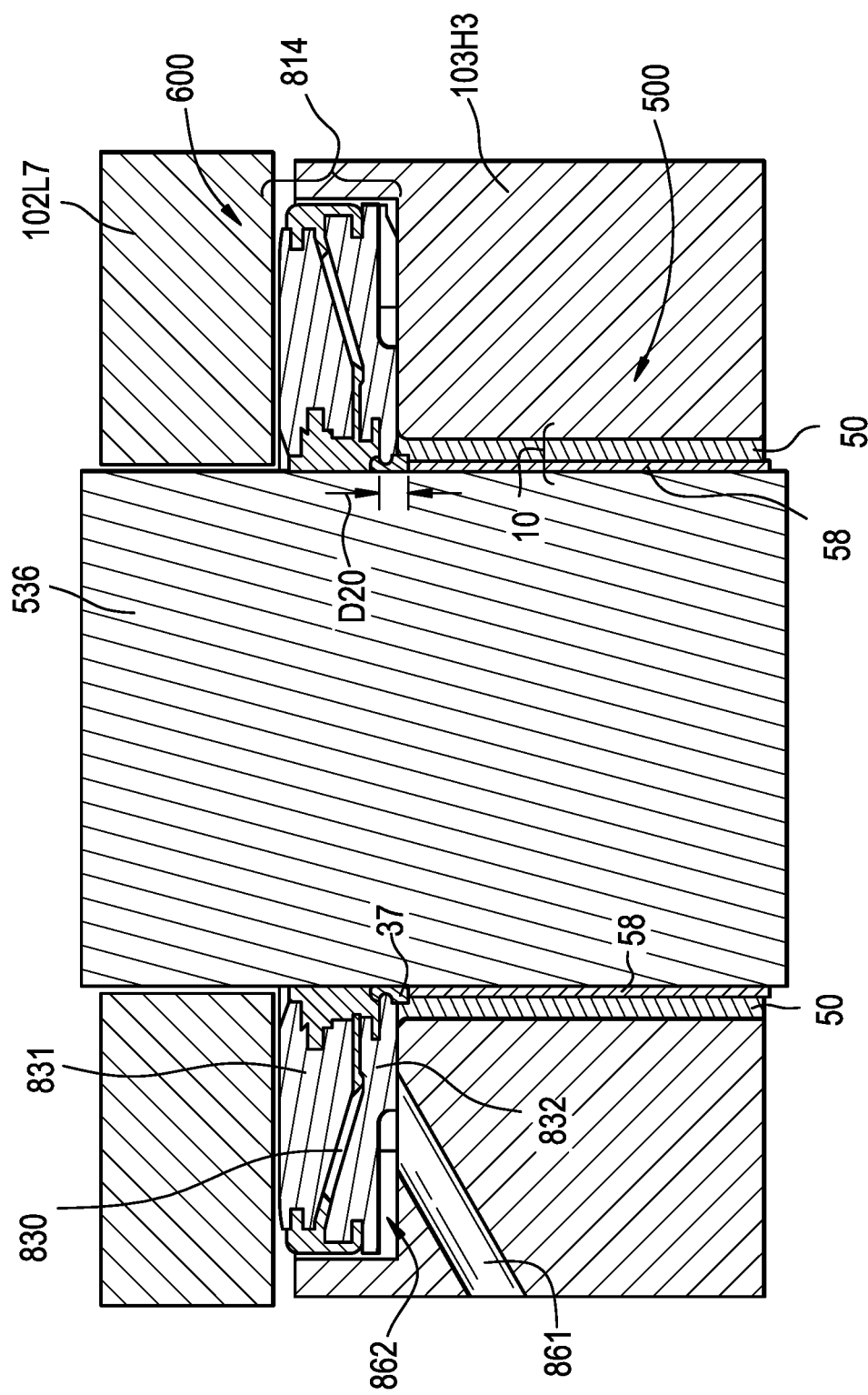
FIG. 8 is a cross sectional view of a thrust bearing of the present invention installed in a journal bearing assembly.
Figure 9:
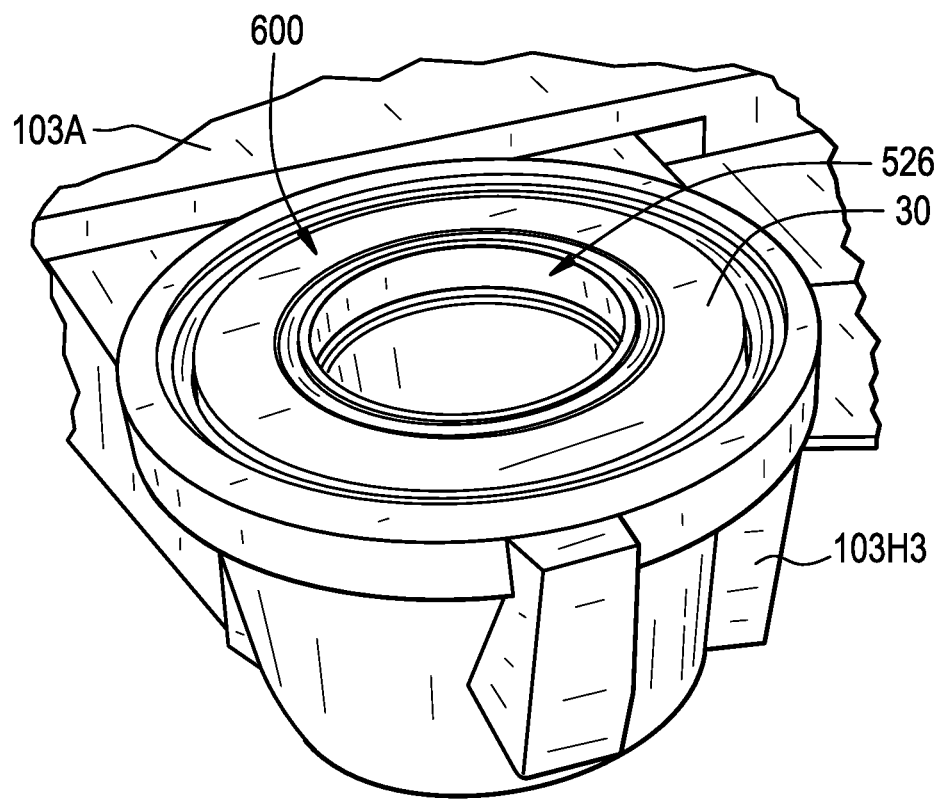
FIG. 9 is a perspective and enlarged view of a cup portion of the journal bearing assembly of FIG. 8 shown with the thrust bearing therein.
Figure 15:
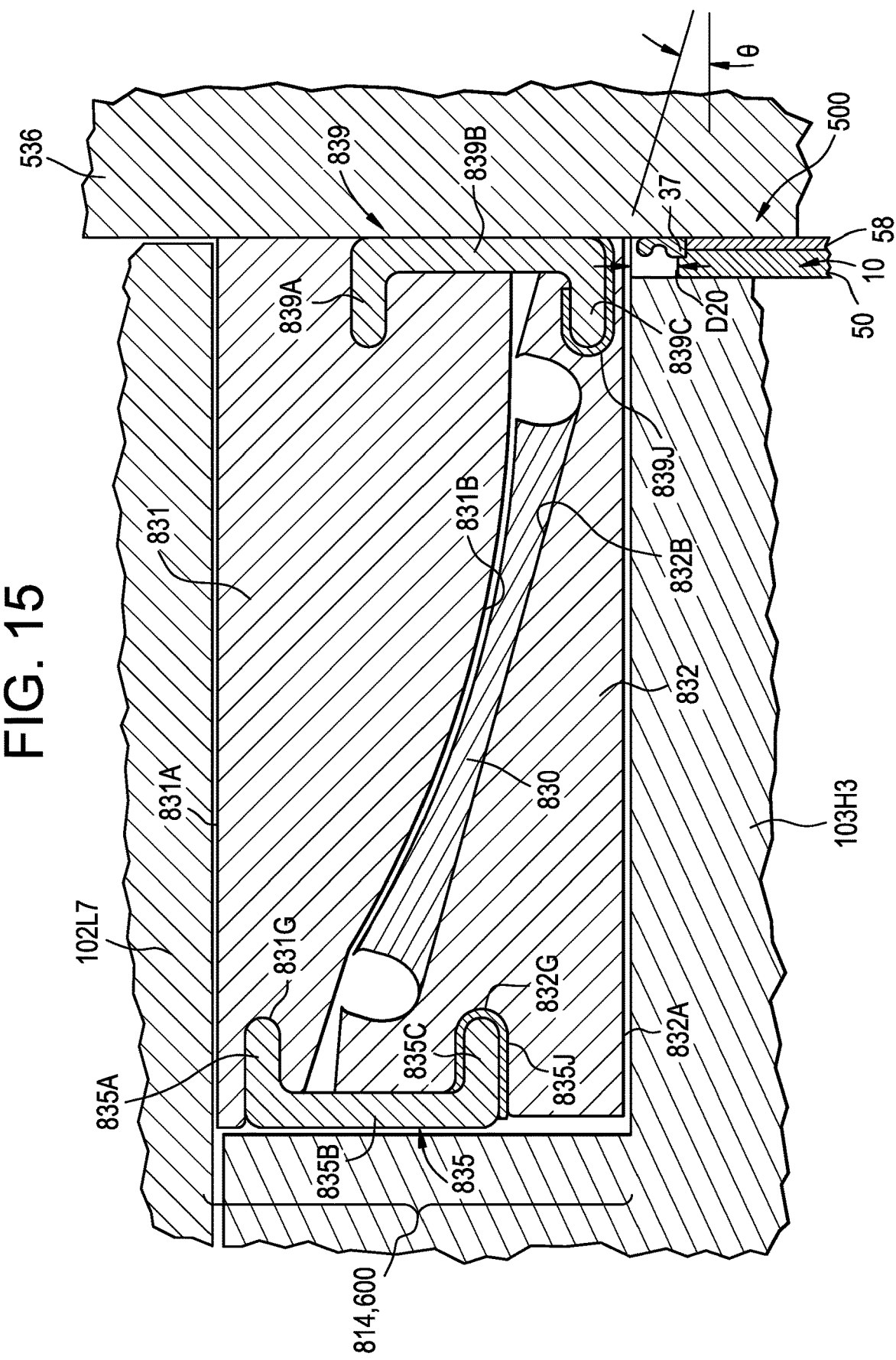
FIG. 15 is a cross sectional view of a third embodiment of a thrust bearing of the present invention.
Figure 16:
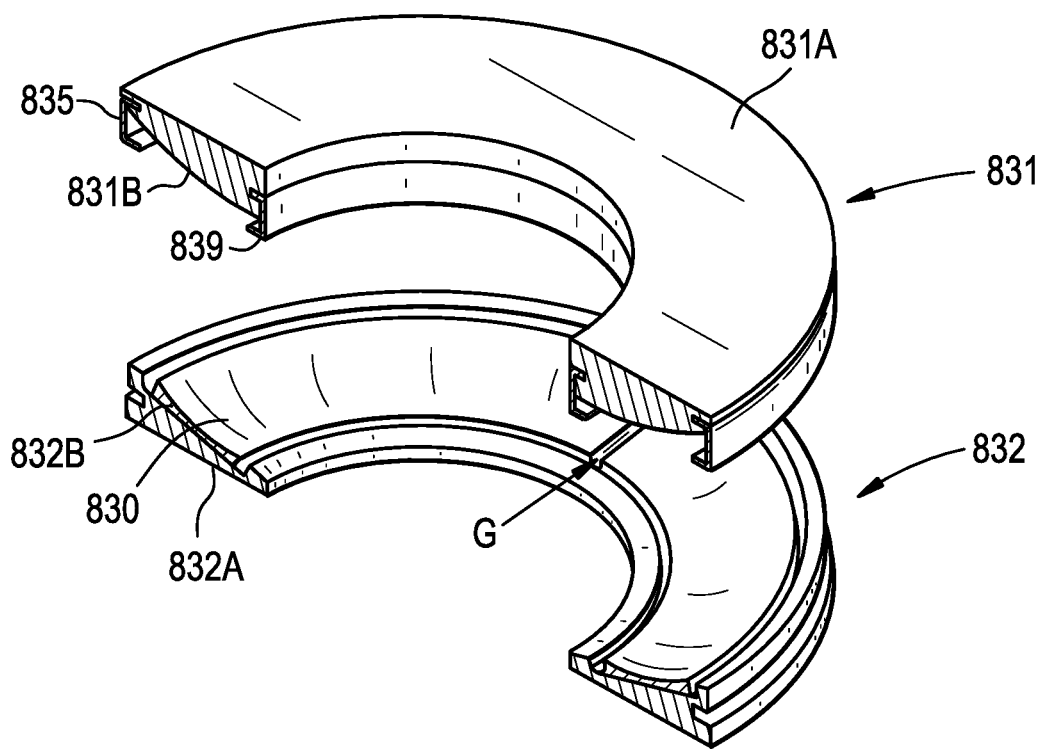
FIG. 16 is an exploded and cross sectional view of the thrust bearing of FIG. 15.

As shown in FIGS. 8, 15 and 16, the thrust bearing cartridge 814 is similar to the thrust bearing cartridge 714 of FIGS. 13 and 14. Thus, similar elements are assigned similar reference characters with the leading numeral 7 replaced with the numeral 8. The first inwardly facing surface 831B has an arcuate contour, for example a spherical contour.

Figure 17:
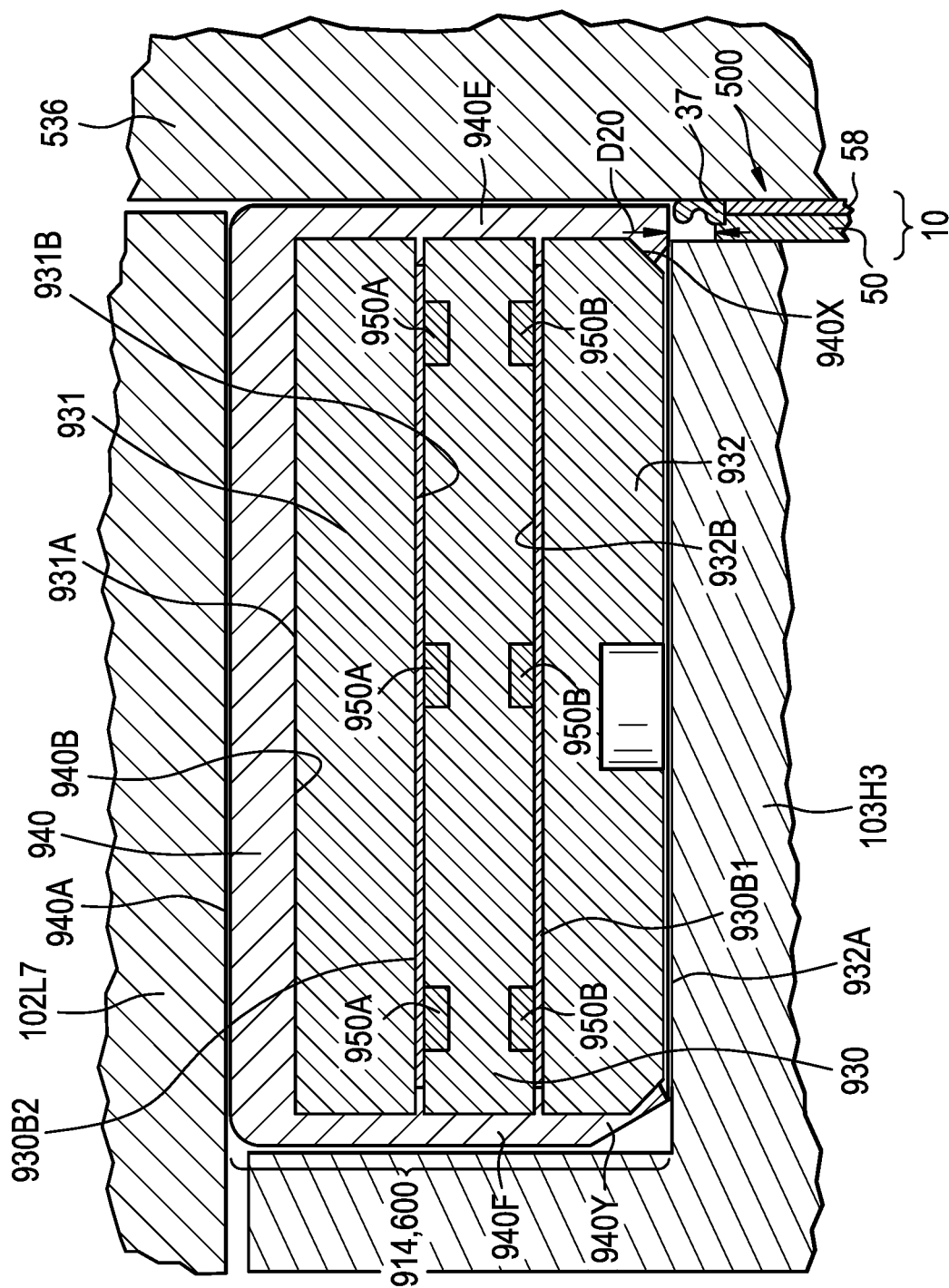
FIG. 17 is a cross sectional view of a fourth embodiment of a thrust bearing of the present invention.
Figure 18:
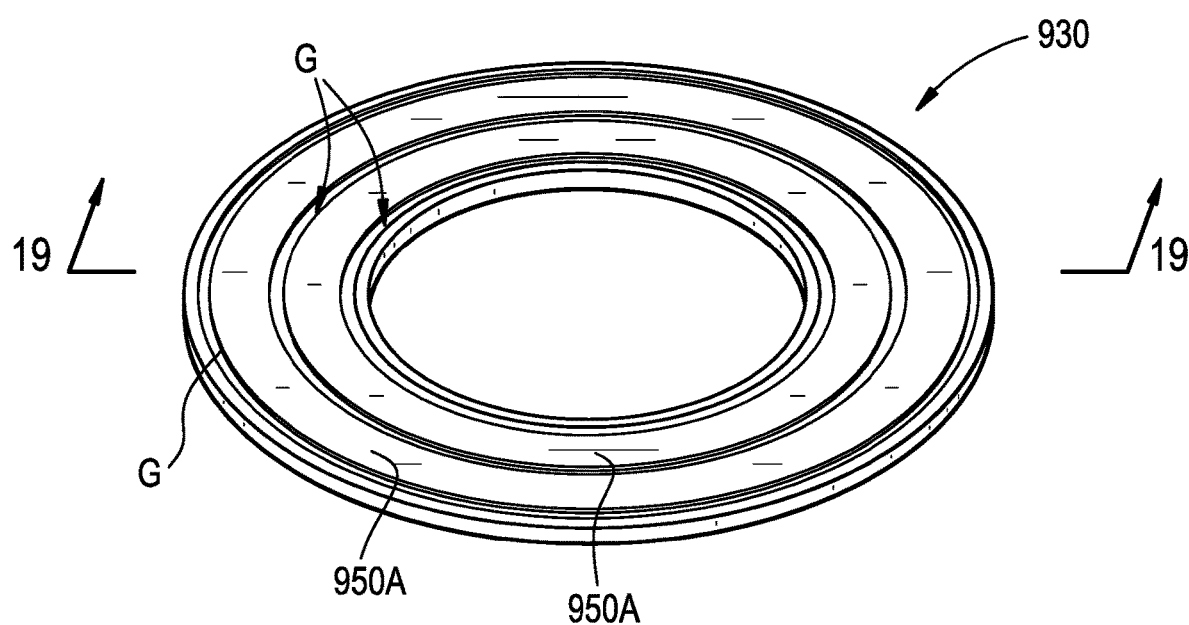
FIG. 18 is a top perspective view of the thrust plate of the thrust bearing of FIG. 17.
Figure 19:
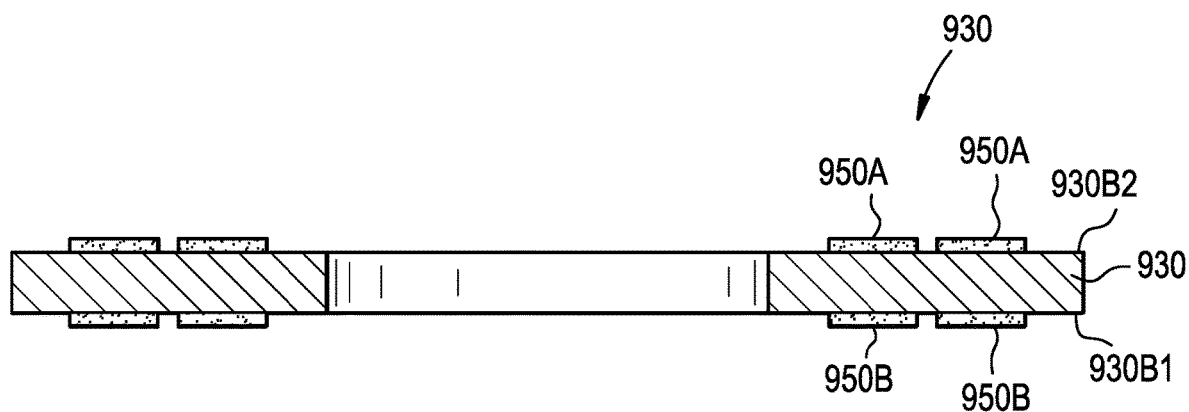
FIG. 19 is a cross sectional view of the thrust plate of FIG. 18 taken across line 19-19.

As shown in FIGS. 17, 18 and 19, the thrust bearing cartridge 914 is similar to the thrust bearing cartridge 14 of FIG. 10. Thus, similar elements are assigned similar reference characters preceded by the numeral 9. The thrust bearing cartridge 914 includes a first thrust plate 931 having a first axially outwardly facing surface 931A and a first axially inwardly facing surface 931B. The thrust bearing cartridge 914 includes a second thrust plate 932 having a second axially outwardly facing surface 931A and a second axially inwardly facing surface 932B. The first axially inwardly facing surface 931B and the second axially inwardly facing surface 932B arranged to face one another. The thrust bearing cartridge 914 includes a third thrust plate 930 having two third axially outward facing surfaces 930B1 and 930B2. The third thrust plate 930 is positioned between the first thrust plate 931 and the second thrust plate 932. A self-lubricating liner 950A is secured to the third axially outwardly facing surface 930B2 and a self-lubricating liner 950B is secured to the third axially outwardly facing surface 930B1. A portion of the self-lubricating liner 950B slidingly engages the first axially inwardly facing surface 931B and a portion of the self-lubricating liner 950A slidingly engages the second axially inward facing surface 932B. In one embodiment the thrust bearing cartridge 914 includes a C-shaped cover 940 that has a radially outward flange 940F and a radially inward flange 940E that extend axially over the first thrust plate 931, second thrust plate 932 and the third thrust plate 930. The C-shaped cover 940 covers the first axially outward surface 931A. The C-shaped cover 940 has a radially inward facing lip 940Y swaged over a radially outer portion of the second axially outward facing surface 932A. The C-shaped cover 940 has a radially outward facing lip 940X swaged over a radially inner portion of the second axially outward facing surface 932A.

Figure 21:
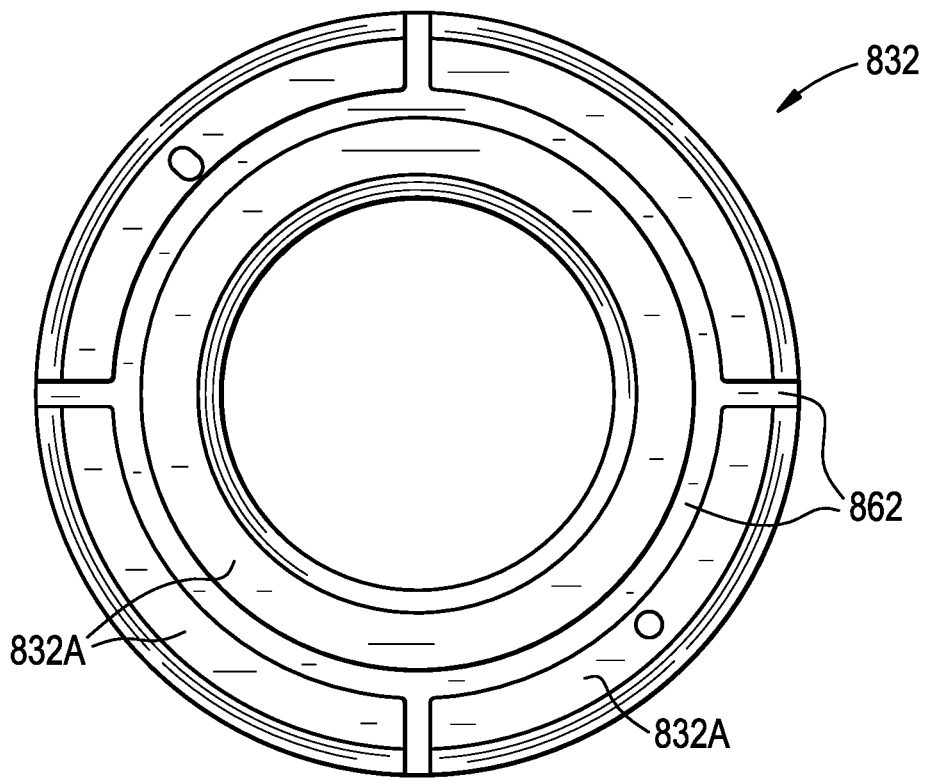
FIG. 21 is a bottom view of an embodiment of any of the thrust bearings of FIGS. 8, 10, 13, 15 and 17.

Referring to FIG. 21, in one embodiment the second thrust plate 32, 732, 832 and 932 has grooves 862 formed in the second axially outward facing surface 832A. The grooves 862 provide a flow path for liquids such as water to flow through and discharge through a channel 861 (see FIG. 8) formed in the fourth hub 103H2.

Figure 25:
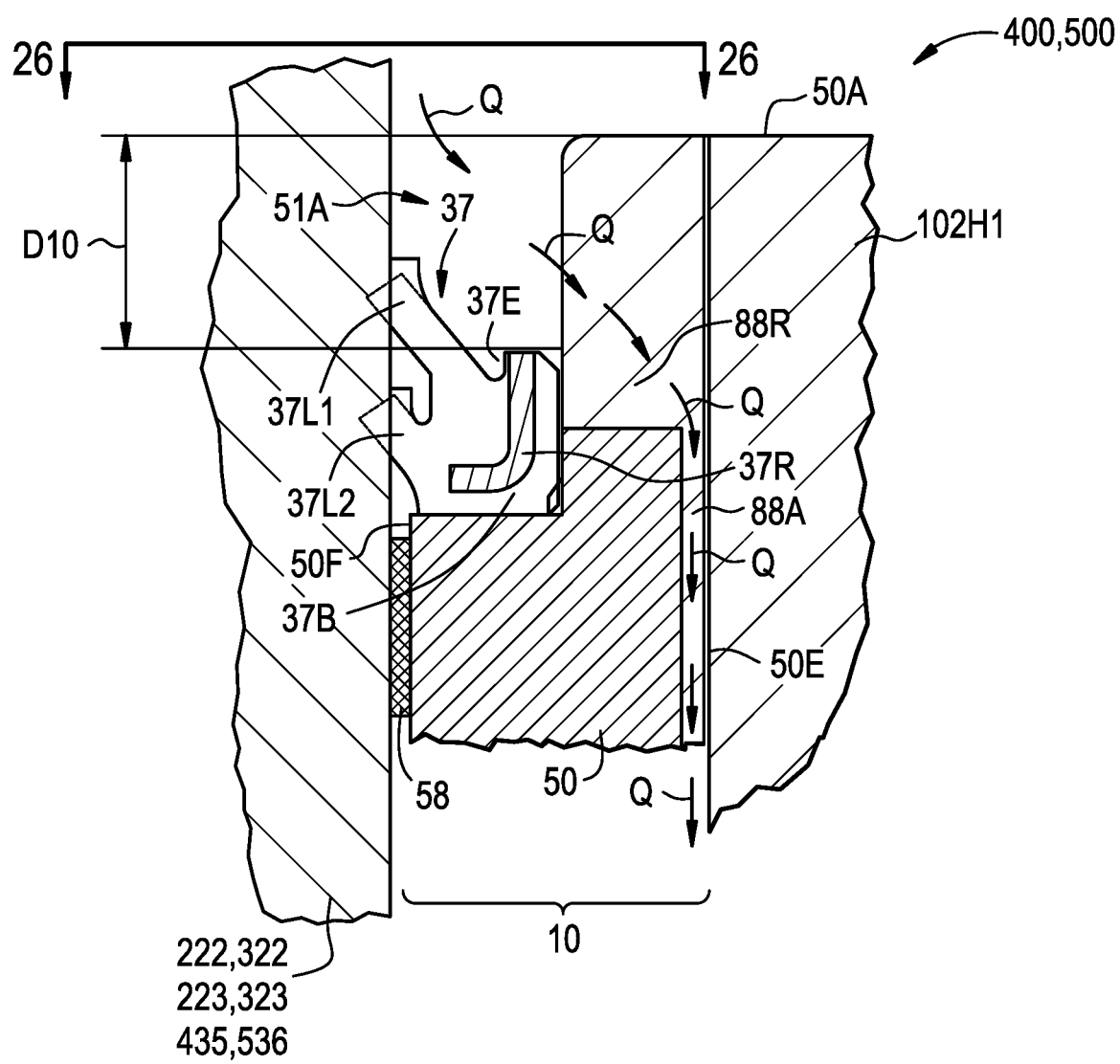
FIG. 25 is a cross sectional view another embodiment of the bearing and seal of FIG. 22 in which the bearing has radial and axial slots formed therein.
Figure 26:
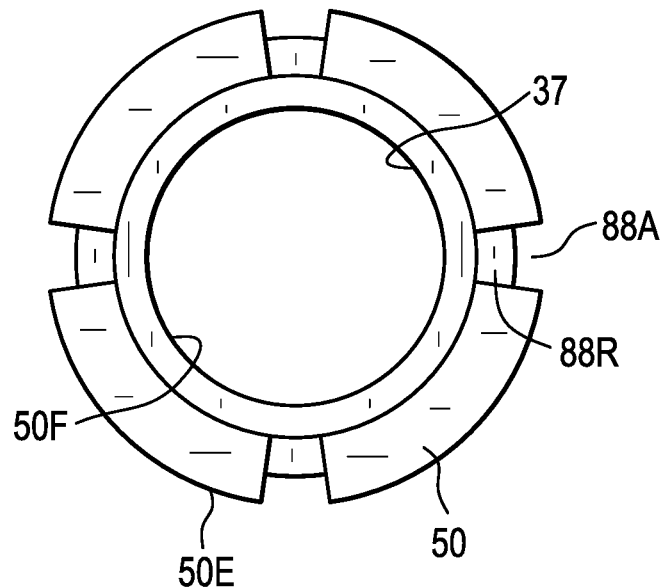
FIG. 26 is an end view of the bearing and seal of FIG. 25 taken from the viewpoint of line 26-26.

As shown in FIGS. 25 and 26, for the journal bearing assemblies 400 and 500 where the shaft 435, 536 axis is vertical, there are axial slots 88A extending axially along the exterior surface 50E of the outer sleeve 50. The axial slots 88A transition into a radial slot 88R at the first end 50A of the outer sleeve 50. The axial slots 88A have a depth sufficient to allow water to flow down and out of the outer sleeve 50 as indicated by the arrows Q, in order to prevent water collection above the annular seal 37. The radial slots 88R extend an axial distance D10 from the first end 50A (i.e., top end) to a plane aligned with a top edge 37E of the annular seal 37. The radial slots 88R extend radially through (i.e., entirely) the outer sleeve 50 along the axial length D10.

Figure 27:
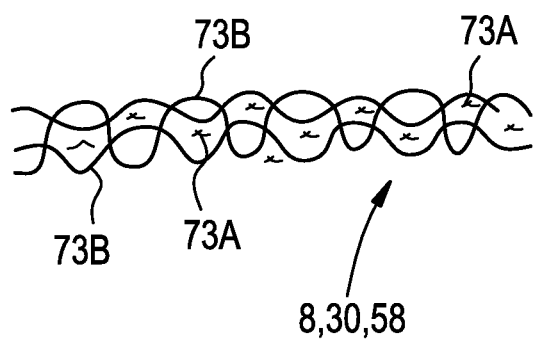
FIG. 27 is a schematic cross sectional view of a self-lubricating pad and sleeve of the present invention.

As shown in FIG. 27, the self-lubricating pads 8 and 30 and the self-lubricating sleeve 58 are manufactured from a self-lubricating material and liners, such as but not limited to polytetrafluoroethylene (PTFE) materials and liner systems with resins including, phenolic resins, polyimid resins and polyimid resins in conjunction with fiber weaves, fabrics or matrix materials, including but not limited to polyester, meta-aramids (e.g., NOMEX), PTFE and glass. In one embodiment, the self-lubricating material and liners are a homogeneous entity or are a molded nearly homogenous system without a weave, fabric or matrix and are manufactured from one or more acrylates, as described further herein with respect to FIG. 27. In one embodiment, the self-lubricating material and liners are ceramic materials and metals. In one embodiment, the self-lubricating material is disposed on a metal substrate as described herein such as the end cap 212, 312 of FIG. 6 and the outer sleeve 50 of FIG. 7. The self-lubricating material has properties and characteristics sufficient to withstand high loads with insignificant wear. The use of the self-lubricating material in the manufacture of the self-lubricating pads 8, 30 and the self-lubricating sleeve 58 allows lubricious properties of the self-lubricating material to be maintained without addition of a lubricating agent such as oil or grease.

In one embodiment, as shown, for example, in FIG. 10, the self-lubricating pad 8 and 30 and/or the self-lubricating sleeve 58 are manufactured from a self-lubricating woven fabric 73. The woven fabric 73 includes a plurality of fibers 73B interwoven with one another and polytetrafluoroethylene (PTFE) 73A interwoven therewith. The fibers 73B include, for example, a polyester material, a stainless steel material and/or glass material. The fibers 73B interwoven with the PTFE enhance bondability of the self-lubricating pad 8 and 30 and/or the self-lubricating sleeve 58 to a substrate. In one embodiment, the interface (e.g., the shaft 222, 223, 322, 323, 435, 536) opposing self-lubricating sleeve 58 the liner or opposing (e.g., axial end the shaft 222, 223, 322, 323, 435, 536 or the first axially inwardly facing surface 31B) the self-lubricating pads 8 and 30 is coated to enhance lubrication. This coating is chosen so as not to degrade the performance of the sliding bearing. The coating is chosen to prevent corrosion of the surface mated with the self-lubricating liner system. In another embodiment the shafts can be made of a stainless steel such as CRES or CREN steels of sufficient hardness to prevent galling of the steel surface when rubbing against the self-lubricated liner material.

Figure 5:
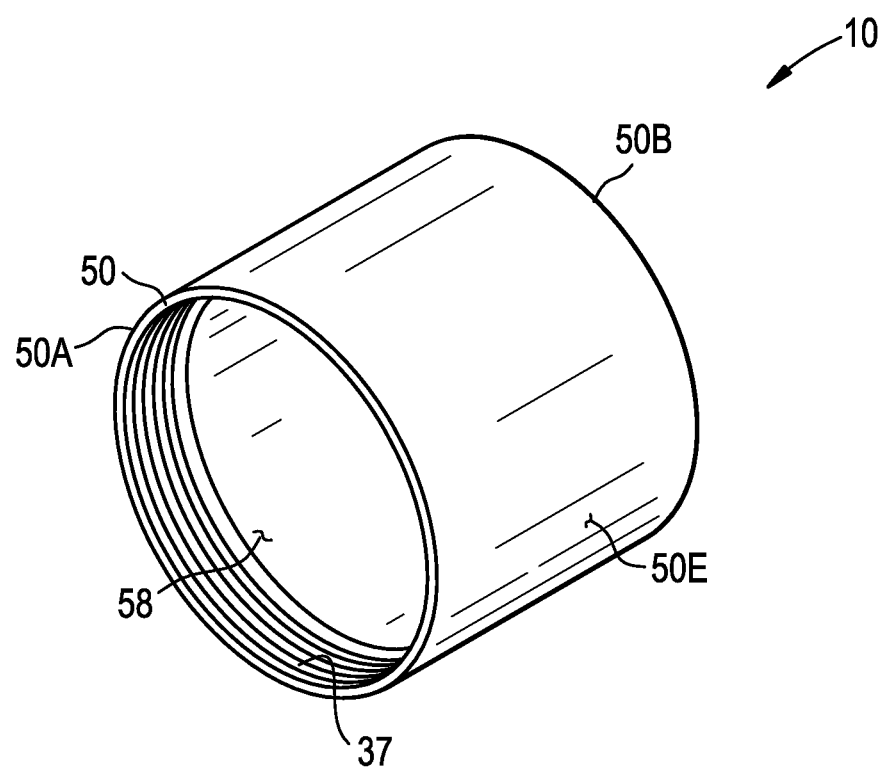
FIG. 5 is a perspective view of a journal bearing of the present invention.
Figure 6:
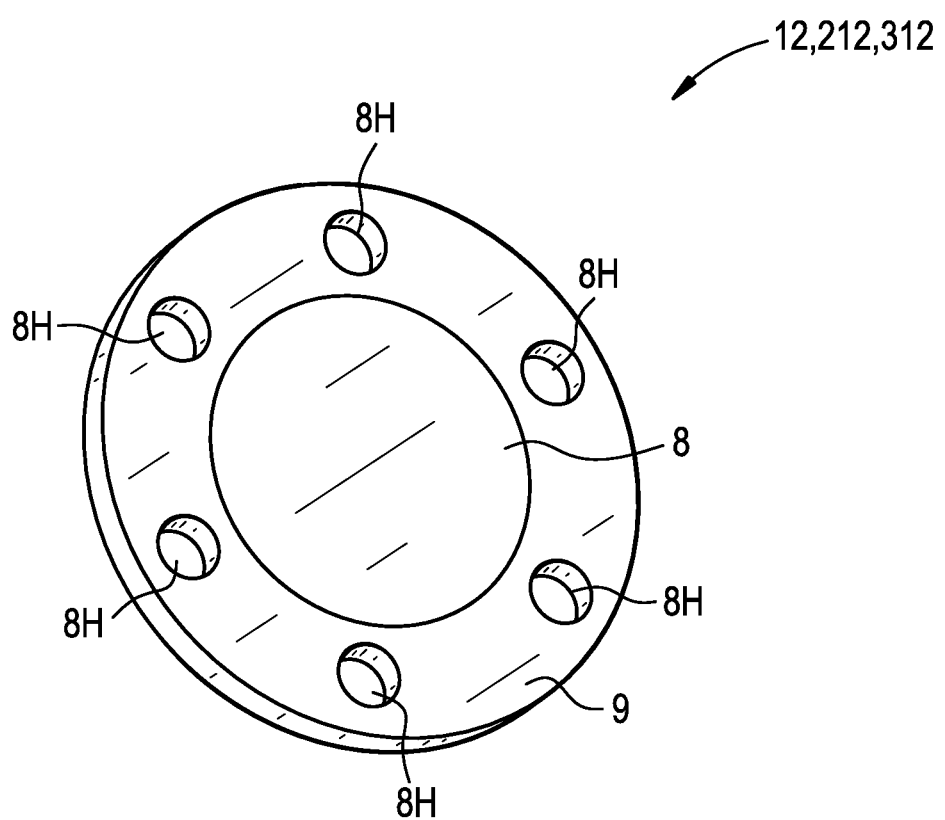
FIG. 6 is an inside perspective view of an end cap of the H-Link of FIG. 3.

As shown in FIGS. 3, 4, 5, 7, 8, 22, 23 and 25, the self-lubricating journal bearing assemblies 200, 300, includes four of the of the self-lubricating sleeve assemblies 10 therein and each of the self-lubricating journal bearing assemblies 400 and 500 includes one of the self-lubricating sleeve assemblies 10 therein. Each of the self-lubricating sleeve assemblies 10 includes an outer sleeve 50 (e.g., a metallic sleeve) extending from a first axial end 50A to a second axial end 50B thereof (FIGS. 5 & 7). As shown in FIG. 7, the outer sleeve 50 has an exterior surface 50E and an interior surface 50F. The interior surface 50F has a first recess 51A formed therein. The first recess 51A extends axially inward from the first axial end 50A and radially outward from the interior surface 50F. The interior surface 50F has a second recess 51B formed therein. The second recess 51B extends axially inward from the second axial end 50B and radially outward from the interior surface 50F. A self-lubricating sleeve 58 is secured (e.g., adhered to via an adhesive such as an epoxy or phenolic resin) to the interior surface 50F between the first recess 51A and the second recess 51B. In one embodiment, a first annular seal 37 is disposed in the first recess 51A and a second annular seal 37 disposed in the second recess 51B. In one embodiment, the self-lubricating sleeve 58 comprises PTFE as described further herein with respect to FIG. 27. It is contemplated that more than one first annular seal can be disposed in the first recess and more than one second annular seal can be disposed in the second recess.

Figure 20:
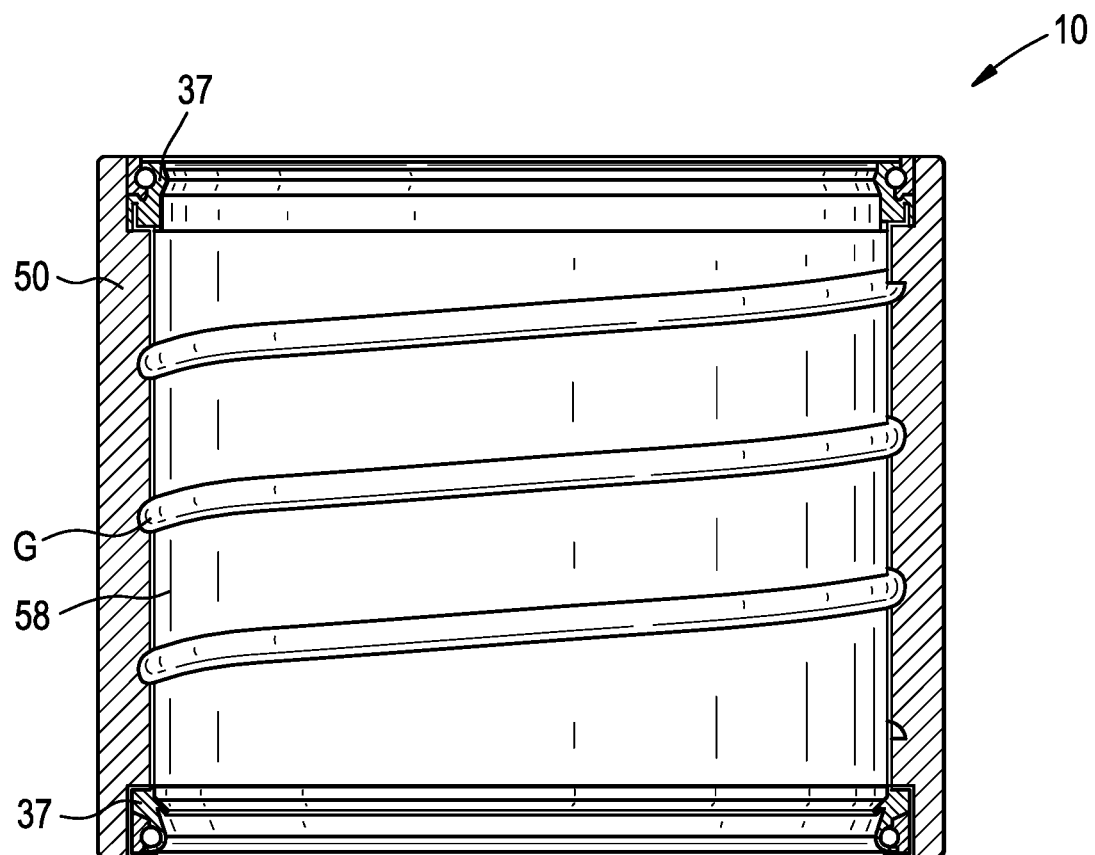
FIG. 20 is a cross sectional view of on an embodiment of a journal bearing with spiral grooves formed therein.

As shown in FIG. 3, the self-lubricating sleeve 58 comprises at least one groove G therein. As shown in FIG. 20, in one embodiment, the grooves G have a spiral configuration. In another embodiment, the grooves have a circumferential configuration. In one embodiment, the least one groove G extends into the outer sleeve 50.

Figure 22:
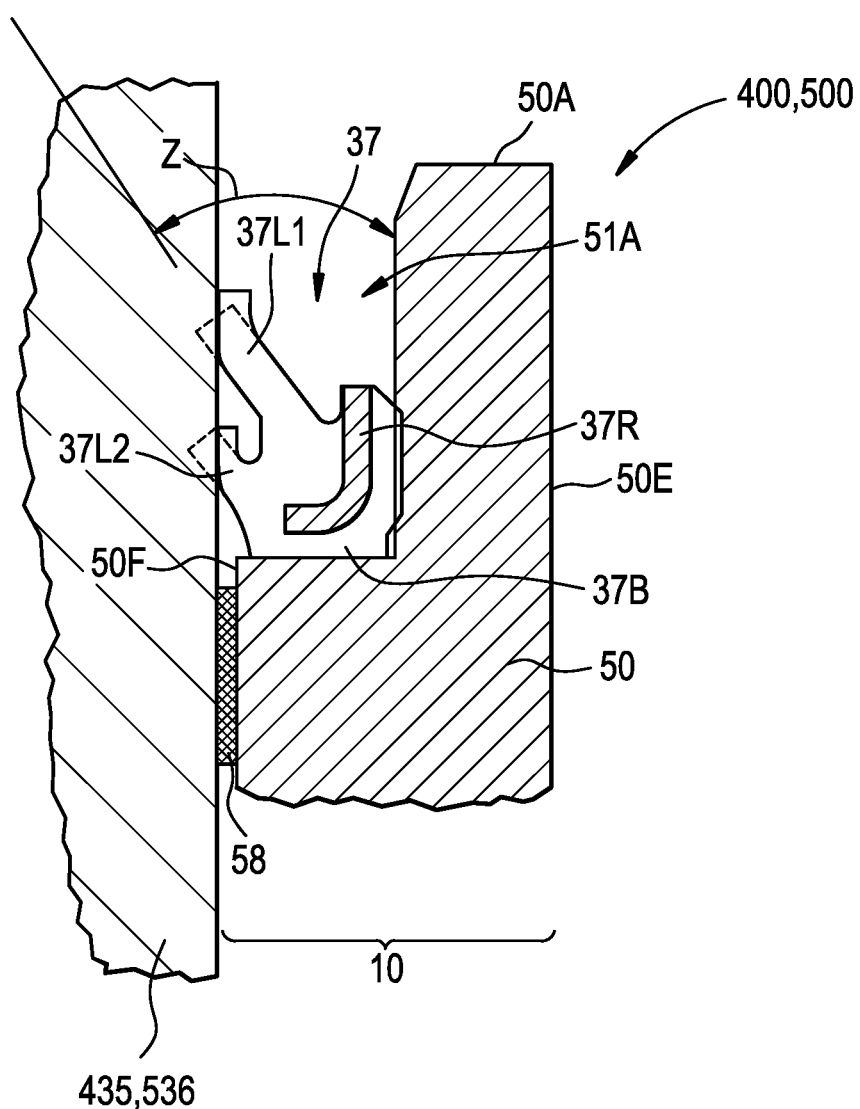
FIG. 22 is a cross sectional view of a portion of the journal bearing of FIGS. 5 and 7 illustrating one embodiment of a seal of the present invention.
Figure 23:
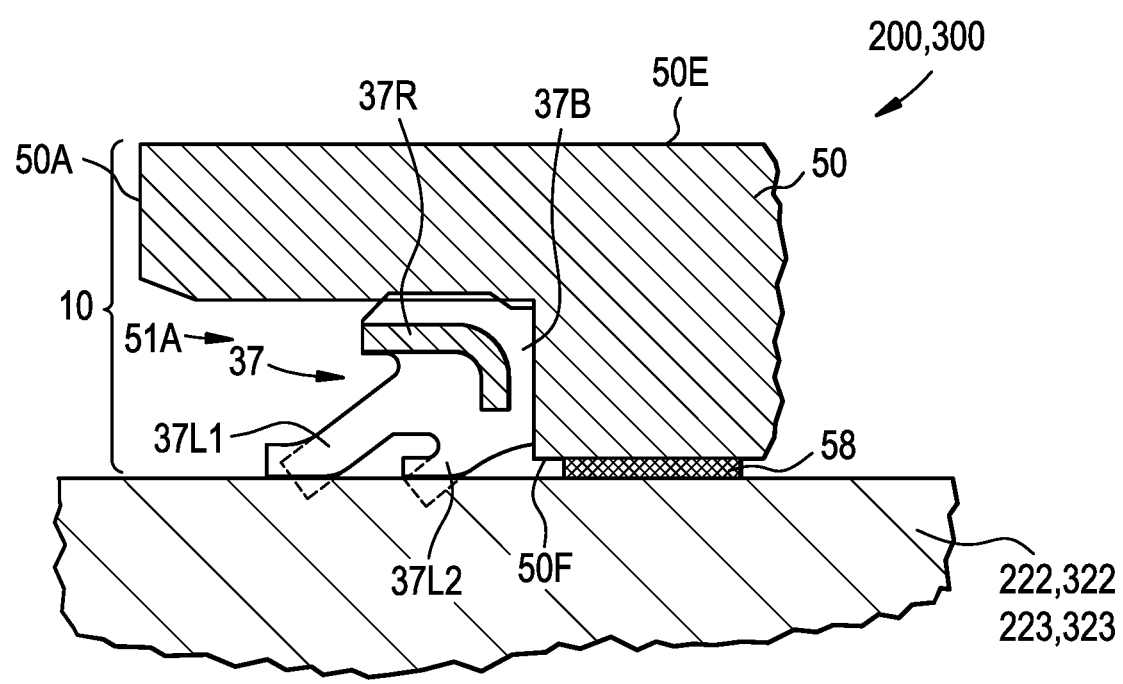
FIG. 23 is a cross sectional view of a portion of the journal bearing of FIG. 3 illustrating one embodiment of a seal of the present invention.

As shown in FIGS. 22 and 23, the annular seal 37 includes a base portion 37B with a first leg 37L1 and a second leg 37L2 extending outward therefrom at an angle Z relative to an interior surface of the recess 51A. In one embodiment, the annular seal 37 has an L-shaped metallic retainer 37R embedded in the base 37B. The base 37B of the annular seal 37 is biased radially outward to frictionally secure the annular seal 37 into the recess 51A. The first leg 37L1 and the second leg 37L2 are flexible and urged radially outward from a relaxed state (shown by dashed lines) by contact with the shaft 222, 223, 322, 323, 435, 536. In one embodiment, the second leg 37L2 is shorter that the first leg 37L1.

Figure 24:
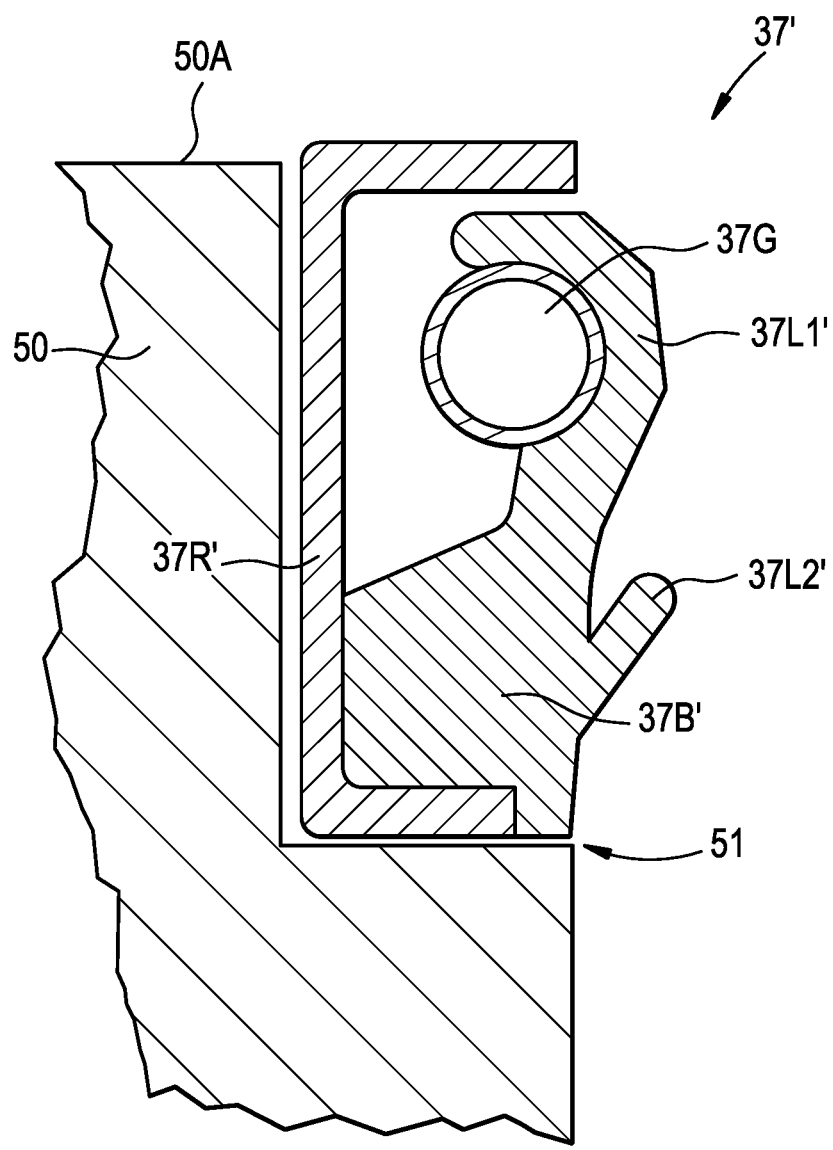
FIG. 24 is a cross sectional view of a portion of any of the journal bearings of FIGS. 3, 5 and 7 illustrating another embodiment of a seal of the present invention.

As shown in FIG. 24, the seal 37' includes a base portion 37B' with a first leg 37L1' and a second leg 37L2' extending outward therefrom. The annular seal 37' has a C-shaped metallic retainer 37R' secured to the base 37B and axially enveloping the annular seal 37'. The C-shaped retainer 37R' is press fit into the recess 51A to secure the annular seal 37' therein.

Figure 28:
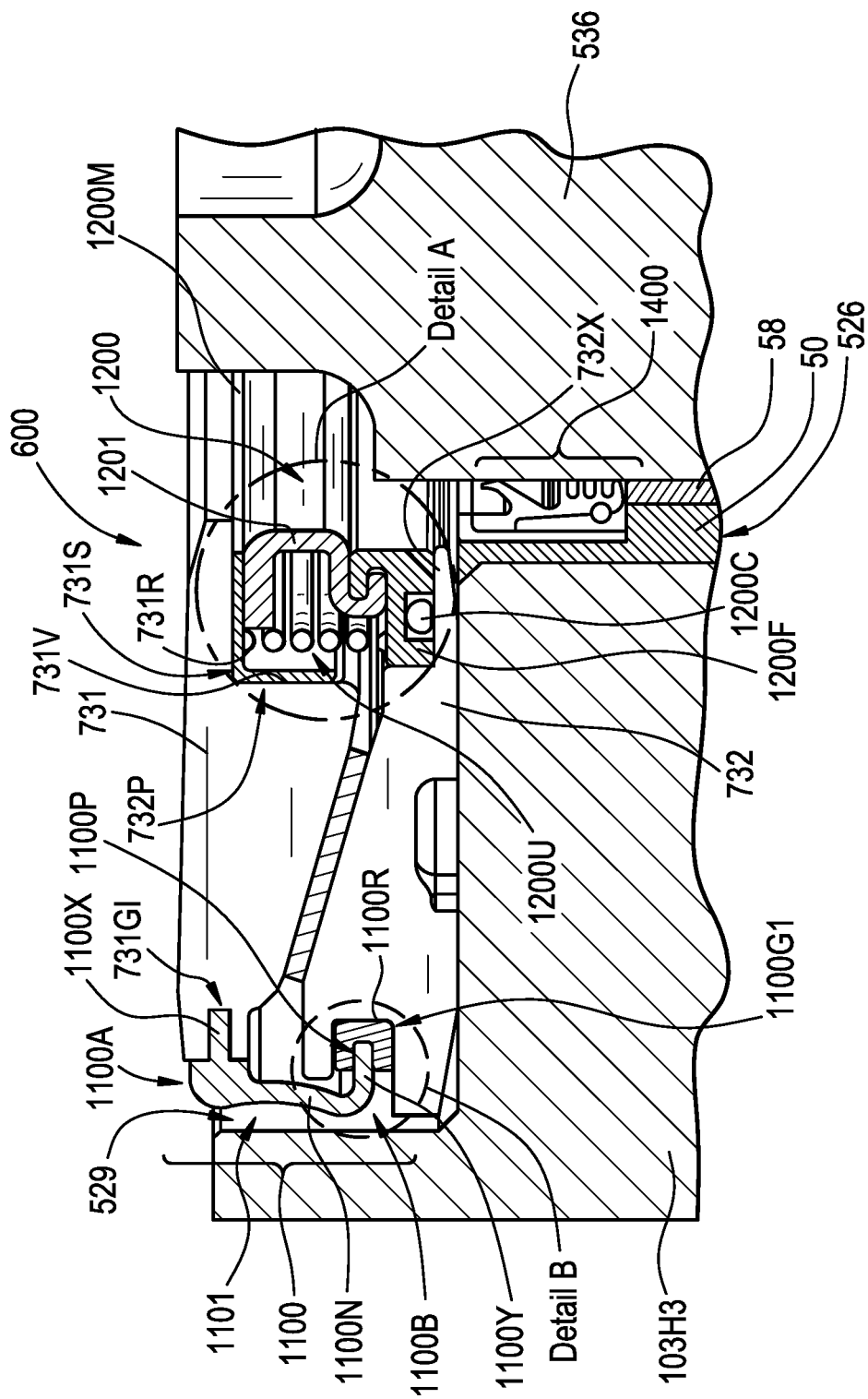
FIG. 28 is a cross sectional view of a thrust bearing shown with an outer seal, an inner seal and a shaft seal.
Figure 29:
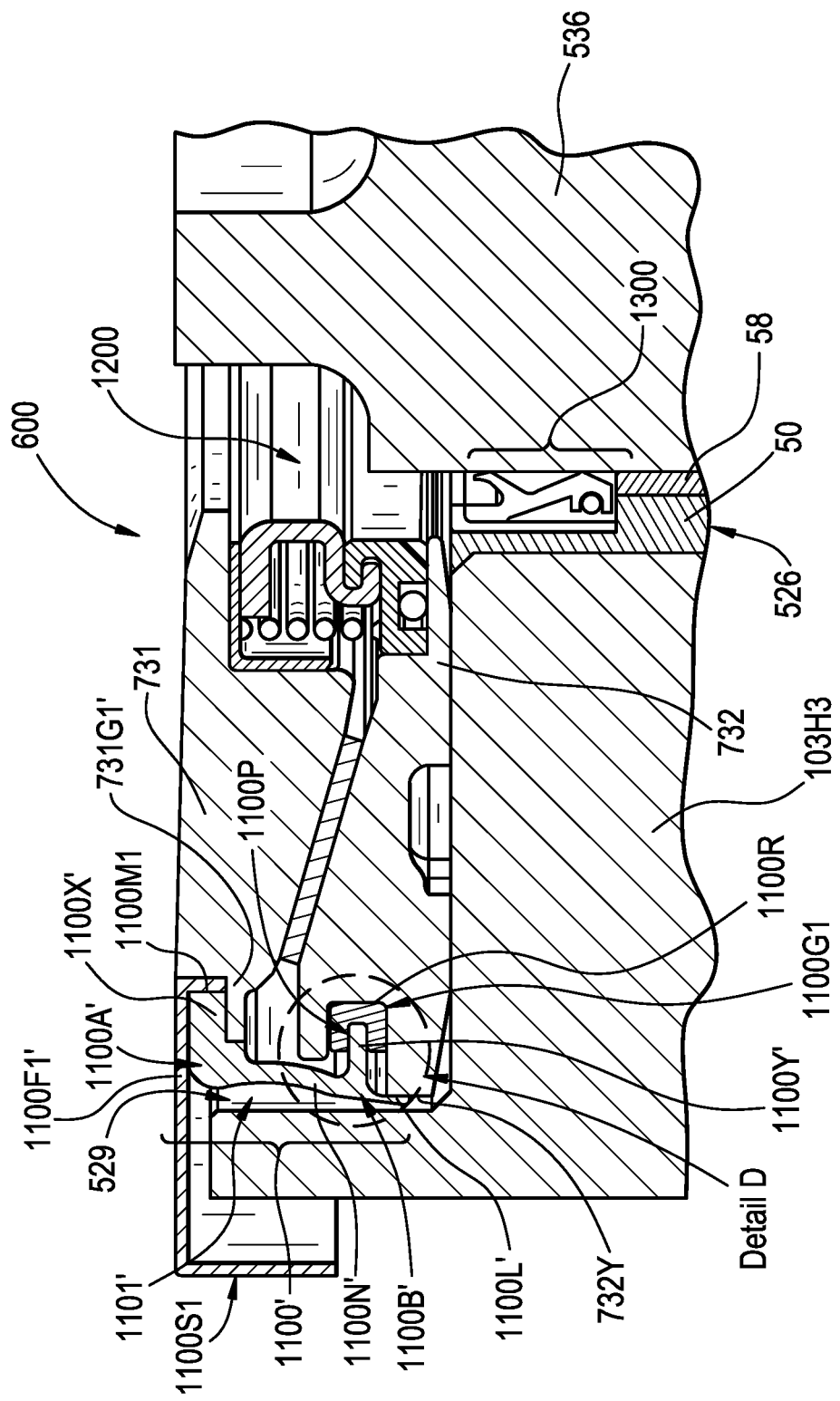
FIG. 29 is a cross sectional view of a thrust bearing shown with another outer seal embodiment and having a shield, an inner seal and a shaft seal.
Figure 30:
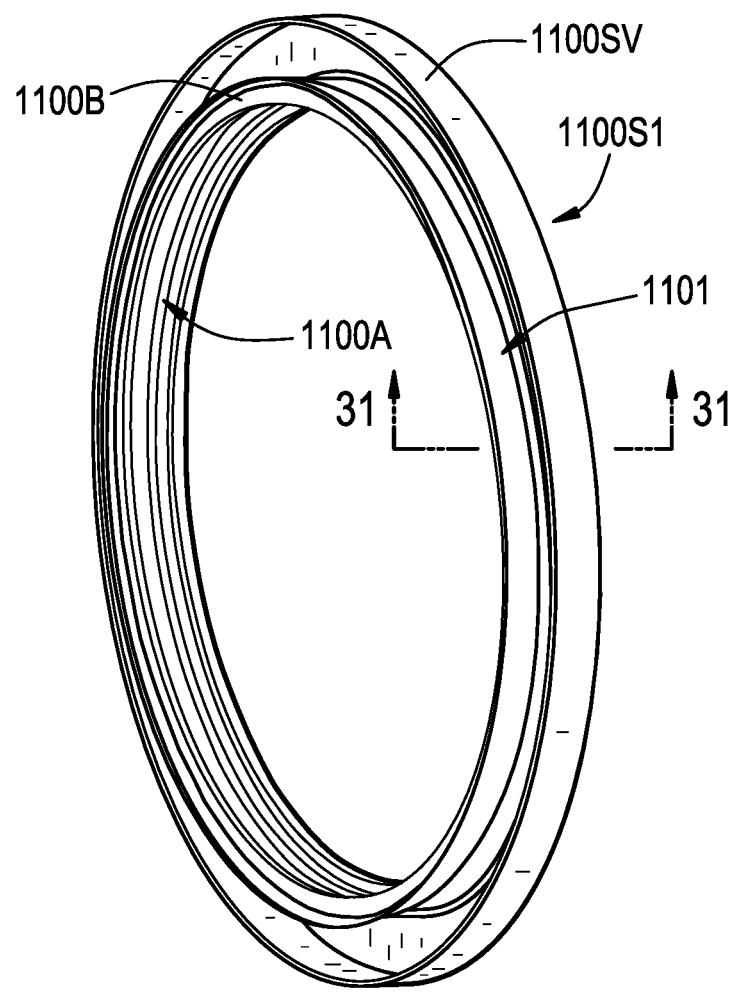
FIG. 30 is a perspective view of the outer seal of FIG. 29.

As shown in FIGS. 28 and 29 an outer seal assembly 1100, 1100' for the thrust bearing assembly 600 is disposed on and seals against radially exterior areas of a rotatable thrust plate 731 and a stationary thrust plate 732. A self-lubricating liner 730 is disposed between the rotatable thrust plate 731 and the stationary thrust plate 732. In one embodiment, the liner 730 is fixed to the stationary thrust plate 732 and has a thickness T1 of approximately 0.06 inches. The rotatable thrust plate 731 carries vertical loads and is rotatable with respect to the stationary thrust plate 732. The outer seal assembly 1100, 1100' has a flexible outer annular ring 1101, 1101' extending between a first outer end 1100A, 1100A' and a second outer end 1100B, 1100B'. The first outer end 1100A, 1100A' is proximate to the rotatable thrust plate 731 and the second outer end 1100B, 1100B' is proximate to the stationary thrust plate 732. A radially inward-opening C-shaped cross section of the outer seal assembly 1100, 1100' is formed by an anchor leg 1100X, 1100X', a sealing leg 1100Y, 1100Y' and a flexible neck 1100N, 1100N' extending therebetween. The anchor leg 1100X, 1100X' extends radially inward, proximate to the first outer end 1100A, 1100A'. The anchor leg 1100X, 1100X' is configured to secure the outer annular ring 1101, 1101' to an outer receiving area 731G1, 731G1' of the rotatable thrust plate 731.

The anchor leg 1100X depicted in FIG. 28 elastically biases in the radially inward direction, towards the rotating thrust plate 731, into the outer receiving area 731G1. During installation, the anchor leg 1100X radially stretches over the rotating thrust plate 731 to engage the receiving area 731G1. The flexible neck 1100N, 1100N' extends between the first outer end 1100A, 1100A' and the second outer end 1100B, 1100B'. The sealing leg 1100Y, 1100Y' extends radially inward proximate to the second outer end 1100B, 1100B'. A sliding ring 1100R is slidingly retained within the stationary thrust plate 732 and has a pocket 1100P formed therein. The sliding ring 1100R is defined by a radially outward-opening C-shaped cross-section. The sliding ring 1100R is made from a lubricious material and slidingly engages a groove 1100G1 (e.g., a radially outward facing C-shaped groove) formed in the stationary thrust plate 732 of the thrust bearing assembly 600. Referring to FIGS. 28 and 29, the sealing leg 1100Y, 1100Y' is elastically biased radially inward, toward the stationary thrust plate 732, into the pocket 1100P. During installation, the sealing leg 1100Y, 1100Y' radially stretches over the stationary thrust plate 732 to engage the pocket 1100P of the sliding ring 1100R.

Referring to FIG. 28, the outer ring 1101 stretches 10-20% from a relaxed diameter to an engaged diameter when the anchor leg 1100X engages outer receiving area 731G1 and the sealing leg 1100Y engages the pocket 1100P. Stretching the outer seal assembly 1100 in this manner ensures that the anchor leg 1100X is retained in the outer receiving area 731G1 and that the sealing leg 1100Y is retained in the pocket 1100P.

Figure 36A:
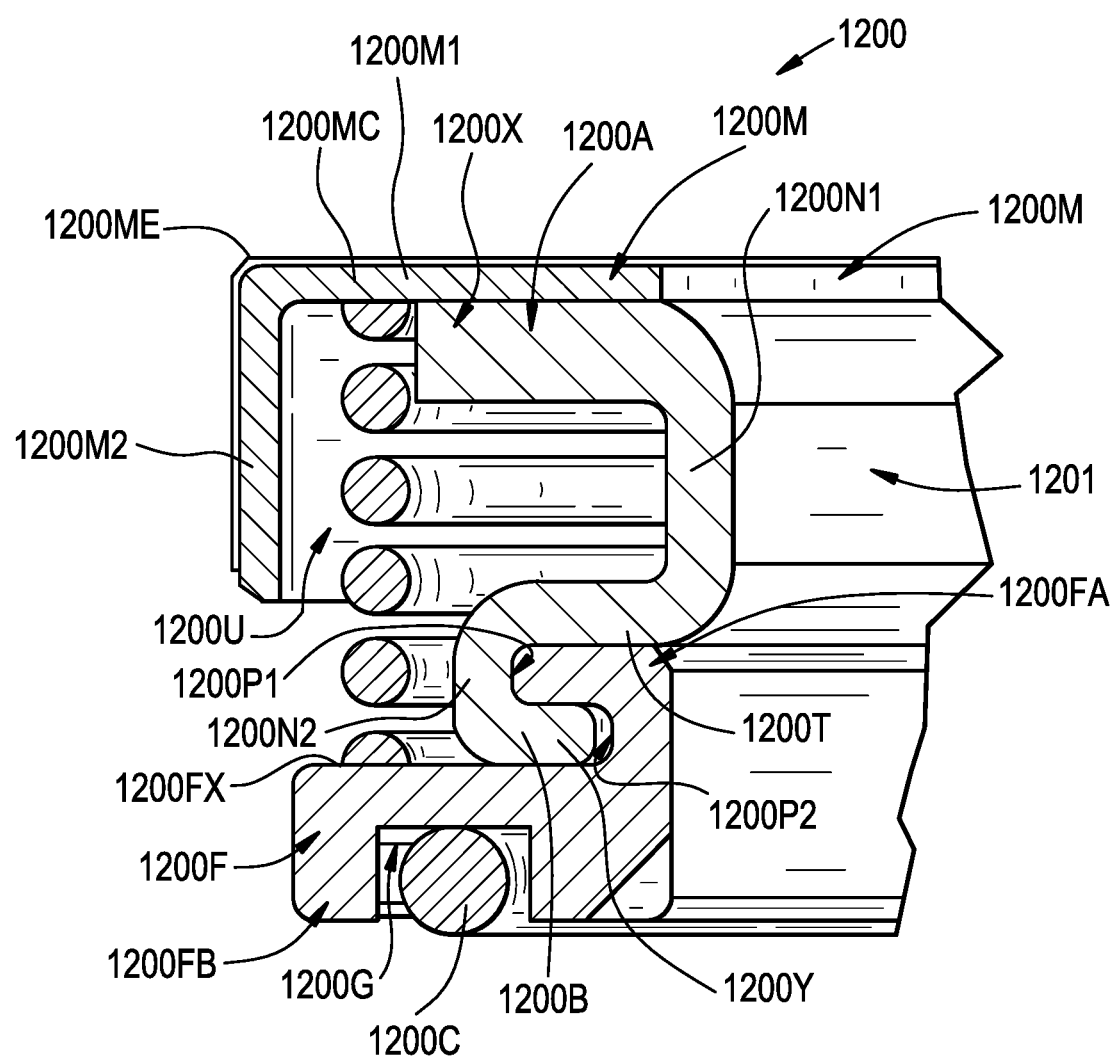
FIG. 36A is a cross sectional view of detail A of the inner seal of FIG. 28.
Figure 36B:
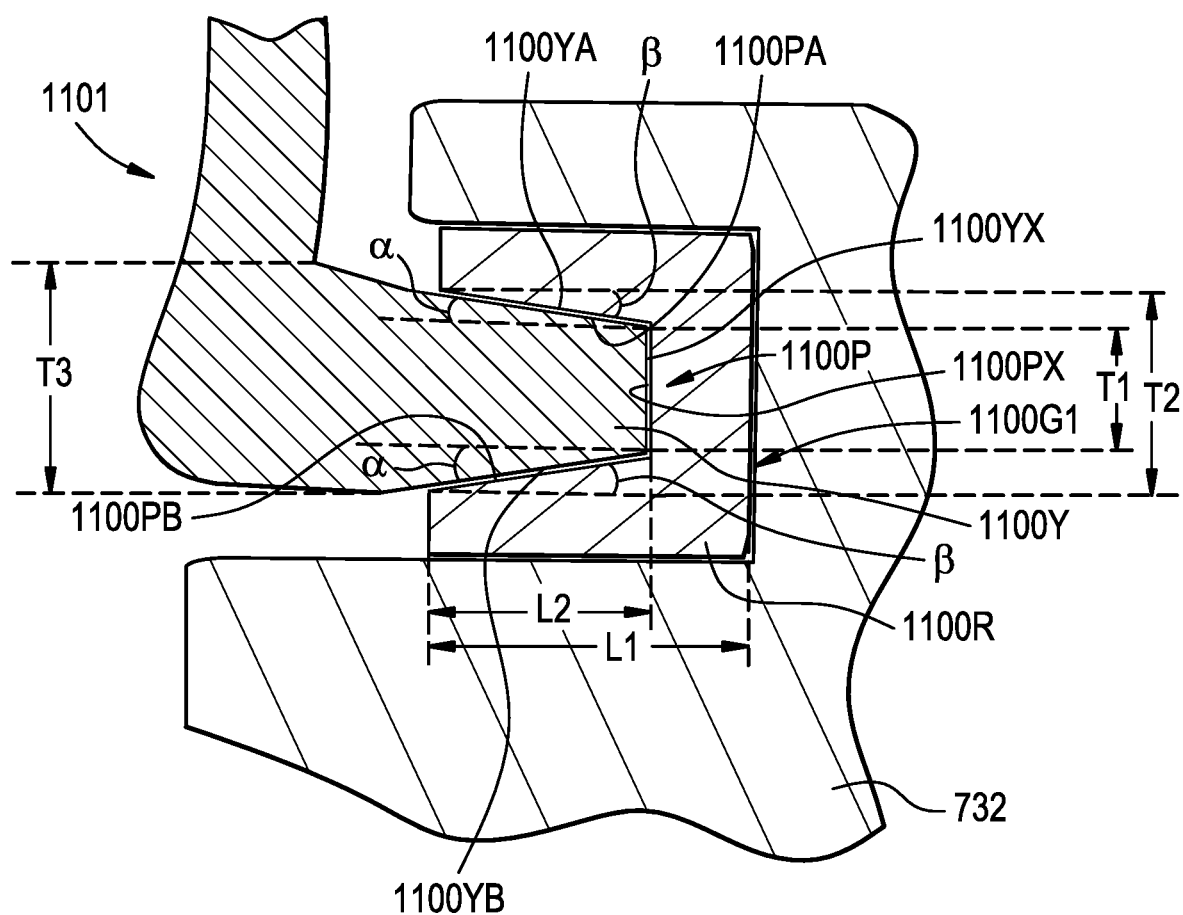
FIG. 36B is a cross sectional view of detail B of the outer seal of FIG. 28.

In the embodiment depicted in FIG. 36B, the sealing leg 1100Y and the pocket 1100P of the sliding ring 1100R each have complementary tapered edges to aid retention of the sealing leg 1100Y within the pocket 1100P during rotation of the sliding ring 1100R within the stationary thrust plate 732 and to allow for easier assembly of the sealing leg 1100Y in the sliding ring 1100R. Referring to FIG. 36B, an upper surface 1100YA of the sealing leg 1100Y and a lower surface 1100YB of the sealing leg 1100Y terminate at a radially inward engagement surface 1100YX. The upper surface 1100YA and the lower surface 1100YB are each oriented a draft angle α measured relative to a horizontal reference line. In one embodiment, the draft angle α of the upper surface 1100YA is not equivalent to the draft angle α of the lower surface 100YB. The draft angle α is configured to improve retention of the sealing leg 1100Y within the pocket 1100P as the sliding ring 1100R rotates in the groove 1100G1 of the stationary thrust plate 732. In the embodiment depicted in FIG. 36B, the pocket 1100P is defined by a radially outward-opening C-shaped cross section having an upper sliding surface 1100PA, a lower sliding surface 1100PB and a radially inward pocket surface 1100PX extending therebetween. The upper sliding surface 1100PA and the lower sliding surface 1100PB are each oriented a draft angle β measured relative to a horizontal reference line. The draft angle β improves the retention of the sealing leg 1100Y within the pocket 1100P as the sliding ring 1100R rotates in the groove 1100G1 of the stationary thrust plate 732. In one embodiment, the draft angle β of the upper sliding surface 1100PA is not equivalent to the draft angle β of the lower sliding surface 1100PB.

Referring to FIG. 36B, the sliding ring 1100R defines a first length L1 measuring the total radial length of the sliding ring 1100R and a second length L2 measuring the total radial depth of the pocket 1100P. In the embodiment depicted in FIG. 36B, the ratio of L1 to L2 (i.e., L1 divided by L2) is approximately 1.5, but a ratio of L1 to L2 of between 0.5 and 2.0 does not depart from the invention disclosed herein. The sealing leg 1100Y defines a minimum thickness or a first thickness T1 at the radially inward engagement surface 1100YX and a maximum thickness or a third thickness T3 at an opposite end of the sealing leg 1100Y. The sliding ring 1100R defines a maximum thickness or a second thickness T2. In the embodiment depicted in FIG. 36B, the ratio of T1 to T2 (i.e., T1 divided by T2) is approximately 0.63 and the ratio of T1 to T3 (i.e., T1 divided by T3) is approximately 0.56. The ratio of T1 to T2 and/or the ratio of T1 to T3 of between 0.25 and 1.00 do not depart from the invention disclosed herein.

Figure 36C:
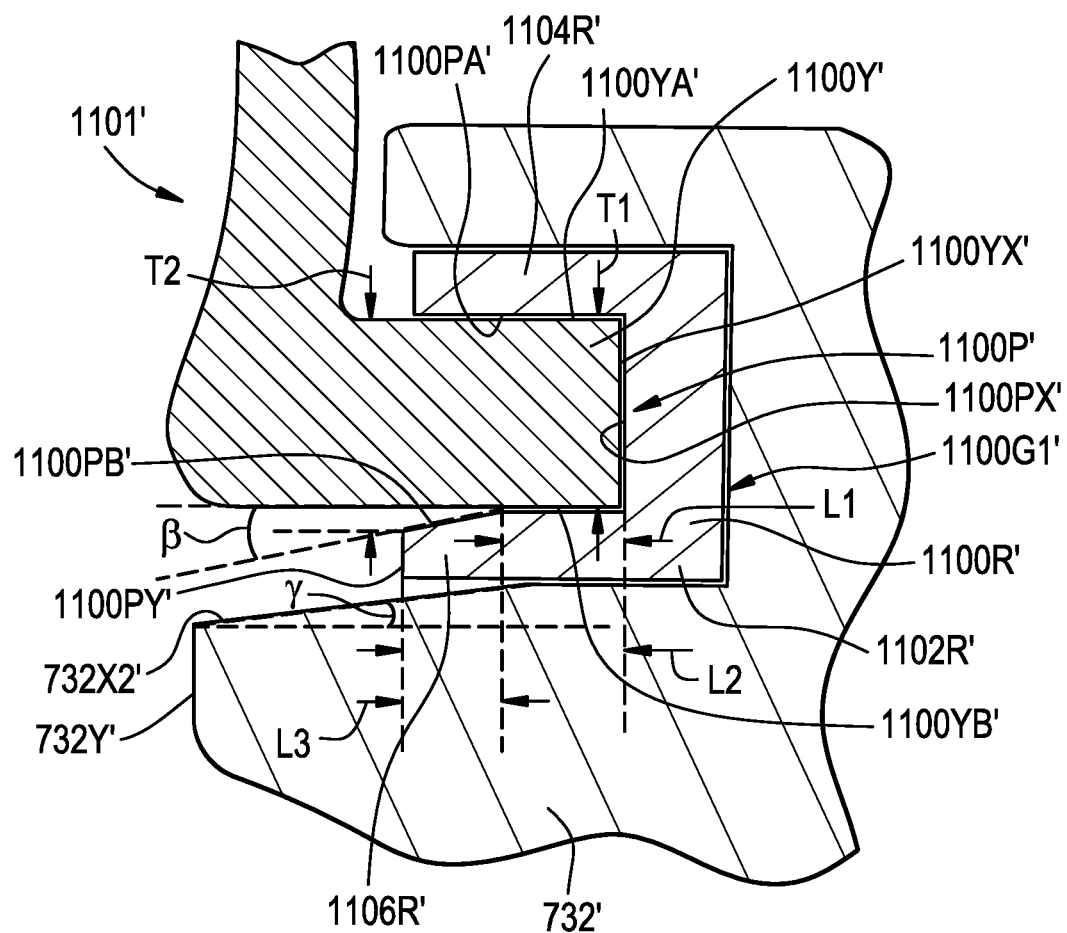
FIG. 36C is a cross sectional view of detail B of FIG. 28 with an alternate embodiment of the outer seal.

In the embodiment depicted in FIG. 36C, the pocket 1100P' has a radially outward-opening C-shaped cross section with an upper sliding surface 1100PA', a lower sliding surface 1100PB' and a radially inward pocket surface 1100PX' extending therebetween. A portion of the lower sliding surface 1100PB' is oriented a draft angle β measured relative to a horizontal reference line. The draft angle β improves the retention of the sealing leg 1100Y' within the pocket 1100P' as the sliding ring 1100R' rotates in the groove 1100G1' of the stationary thrust plate 732'. The sliding ring 1100R' rotates against an axial facing surface 732X2' of the stationary thrust plate 732'. The axial facing surface 732X2' is oriented a secondary draft angle γ, measured relative to a horizontal reference line. The draft angle β and the secondary draft angle γ improve the retention of the sealing leg 1100Y' within the pocket 1100P' as the sliding ring 1100R' rotates in the groove 1100G1' of the stationary thrust plate 732'. The draft angle α and/or the draft angle β allow for easier assembly of the sealing leg 1100Y, 1100Y' within the pocket 1100P, 1100P'. The tapered edge encourages the proper alignment and mounting of the sealing leg 1100Y, 1100Y' within the groove 1100G1, 1100G1'.

Referring to FIG. 36C, the pocket 1100P' defines a minimum width T1 proximate to the radially inward pocket surface 1100PX' and a maximum pocket width T2 proximate to a radially outward edge 1100PY'. In the embodiment depicted in FIG. 36C, the ratio of T1 to T2 (i.e., T1 divided by T2) is approximately 0.92, but a ratio of T1 to T2 of between 0.50 and 1.00 does not depart from the invention disclosed herein. The pocket 1100P' defines a first length L1 measuring the radial length of the lower sliding surface 1100PB' that is not oriented at the draft angle β and a second length L2 measuring the total radial length of the pocket 1100P'. The sliding ring 1100R' has an axial inner end 1102R' and an axial outer end 1104R'. A portion 1106R' of the axial inner end 1102R' extends away from the angled axial facing surface 732X2'. The portion 1106R' of the axial inner end 1102R' is defined by a third length L3 measured in the radial direction. In the embodiment depicted in FIG. 36C, the ratio of L1 to L2 (i.e., L1 divided by L2) is approximately 0.56, but ratios of L1 to L2 of between 0.25 and 1.00 do not depart from the invention disclosed herein. In the embodiment depicted in FIG. 36C, the ratio of L1 to L3 (i.e., L1 divided by L3) is approximately 1.00, but ratios of L1 to L3 of between 0.50 and 1.50 do not depart from the invention disclosed herein.

Figure 36D:
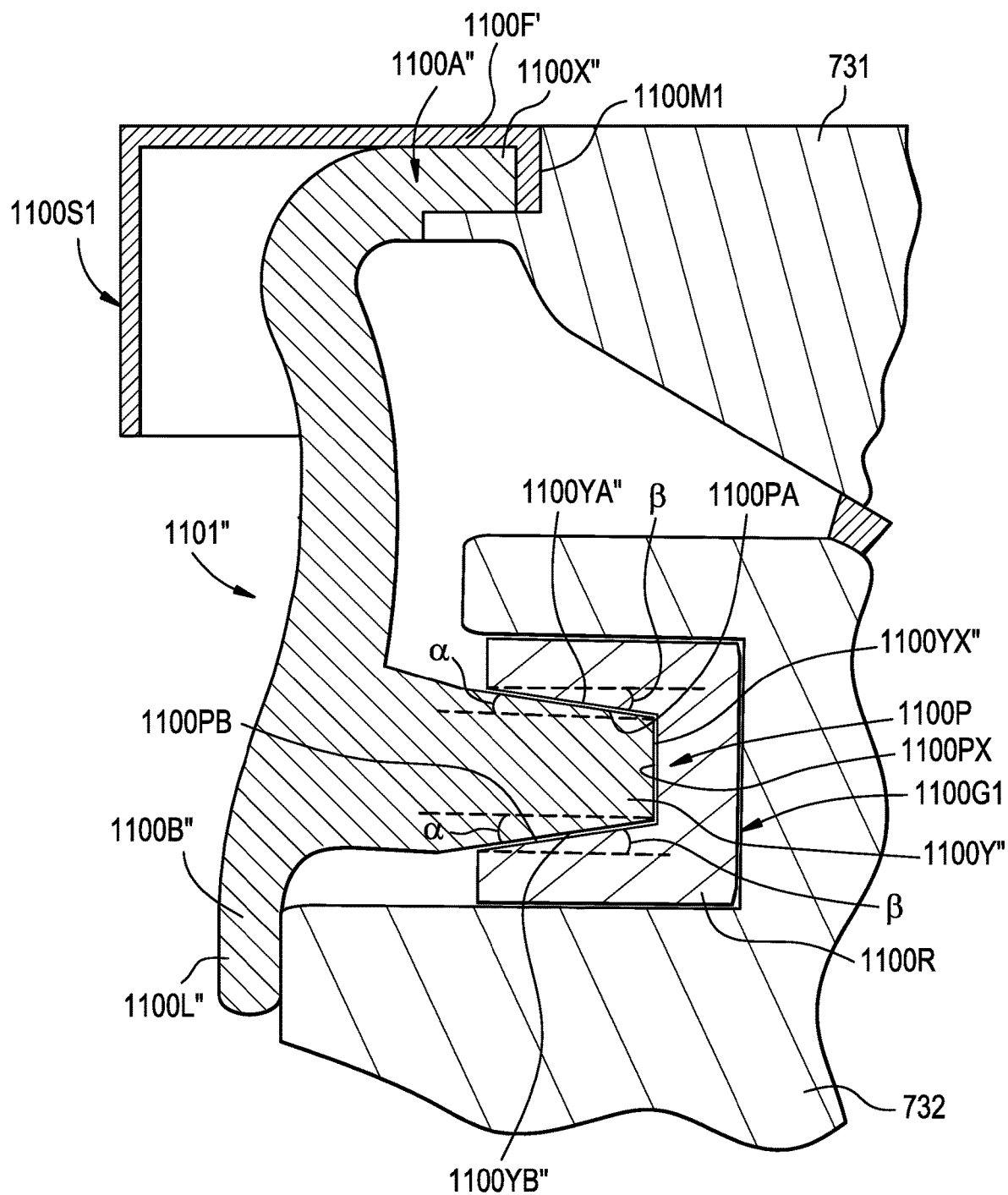
FIG. 36D is a cross sectional view of detail D of the outer seal of FIG. 29.

FIG. 36D depicts an alternate embodiment of the outer ring 1101" that incorporates a lip 1100L" extending axially away from the second outer end 1100B" and a sealing leg 1100Y" with an upper surface 1100YA" and a lower surface 1100YB" that are each canted a draft angle α measured relative to a horizontal reference line. Referring to FIG. 36D, the sliding ring 1100R has an upper sliding surface 1100PA and a lower sliding surface 1100PB that are each canted a draft angle β measured relative to a horizontal reference line.

Figure 36E:
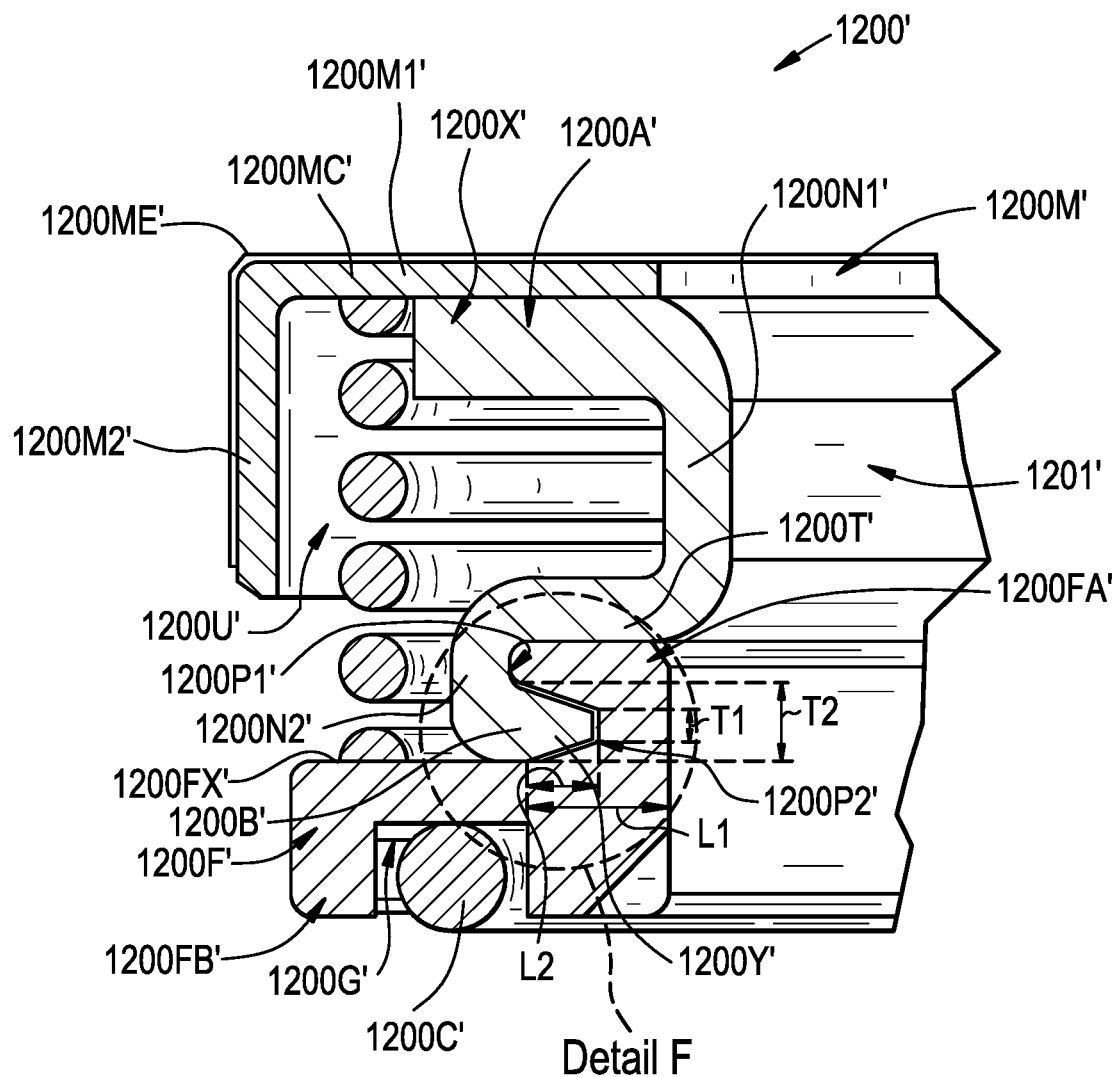
FIG. 36E is a cross sectional view of detail B of FIG. 28 with an alternate embodiment of the inner seal.

In the embodiment depicted in FIGS. 36E and 36F a tapered configuration, similar to that described with reference to FIGS. 36B-36D above, is incorporated into the inner seal assembly 1200'. Specifically, the sealing leg 1200Y' is defined by axial outward facing upper surface 1200YA' and axial inward facing lower surface 1200YB' that each are canted a draft angle α measured relative to horizontal reference lines. In one embodiment, the draft angle α of the upper surface 1200YA' is not equivalent to the draft angle α of the lower surface 1200YB'. The upper surface 1200YA' and the lower surface 1200YB' terminate at a radial inward facing engagement surface 1200YX'. The tapered sealing leg 1200Y' engages complementary tapered surfaces in the radially outward facing pocket 1200P2' of the face seal ring 1200F'. The radially outward facing pocket 1200P2' is tapered and defines a radially outward facing pocket surface 1200PX' that extends between an axial inward facing tapered upper surface 1200PA' and axial outward facing tapered lower surface 1200PB' of the radially outward facing pocket 1200P2'. Each of the upper surface 1200PA' and lower surface 1200PB' are canted at a draft angle β measured relative to horizontal reference lines to form the tapered configuration. In one embodiment, the draft angle β of the upper surface 1200PA' is not equivalent to the draft angle β of the lower surface 1200PB'. The tapered configuration of the engagement surface of the sealing leg 1200Y' and the radially outward facing pocket 1200P2' improves the retention of the sealing leg 1200Y' within the radially outward facing pocket 1200P2' during rotation of the face seal ring 1200F relative to the stationary thrust plate 732 and eases assembly of the inner annular ring 1201' and the face seal ring 1200F' of the inner seal assembly 1200'.

Figure 36F:
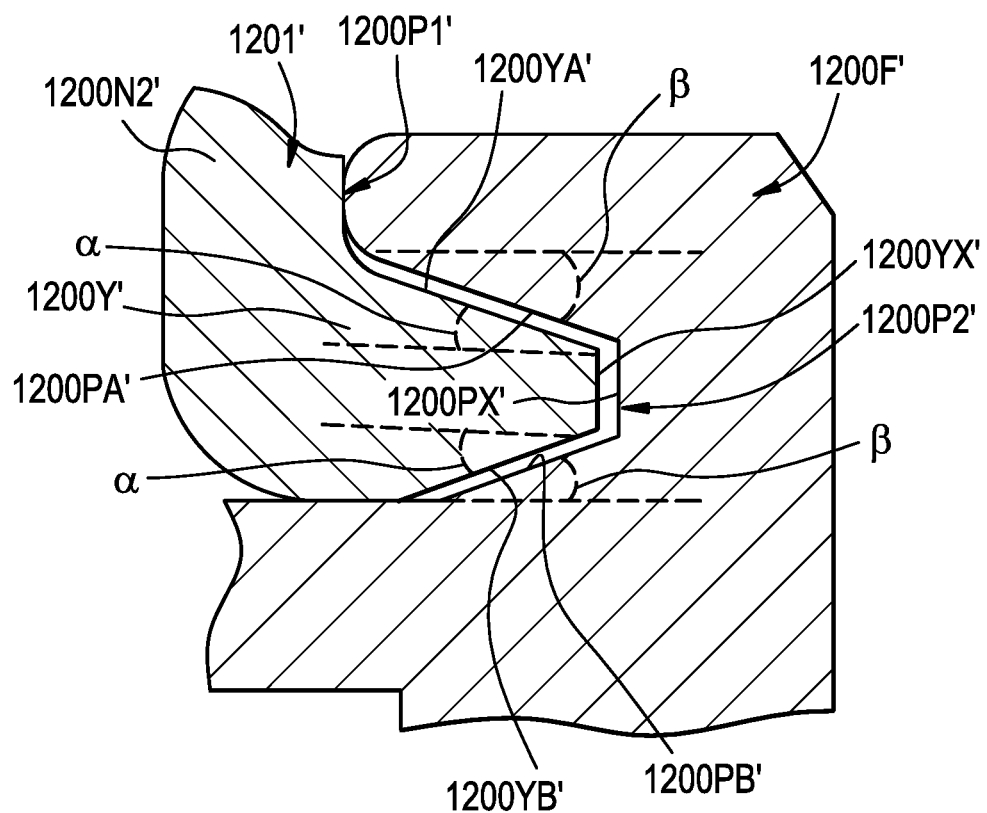
FIG. 36F is a cross sectional view of detail F of the inner seal of FIG. 36E.

In the embodiments depicted in FIGS. 36B and 36F the draft angle α and the draft angle β are each approximately ten degrees. In the embodiment depicted in FIG. 36C, the draft angle β is approximately fifteen degrees and the secondary draft angle γ is approximately ten degrees. Draft angles α, β and a secondary draft angle γ of between zero degrees and twenty degrees do not depart from the invention disclosed herein. In some embodiments, the tapered configuration has a "loose fit" in which β>α or a "tight fit" in which α>β.

As shown in FIG. 29, the outer ring 1101' has a metallic retaining ring 1100F1' secured to the first outer end 1100A' (e.g. the first outer end 1100A' is adhered or molded to the metallic retaining ring 1100F1'). The retaining ring 1100F1' has a mounting portion 1100M1' thereon (e.g., extending axially inward from the mounting portion 1100M1') and is press fit into the receiving area 731G1'. A lip 1100L' extends axially away from the second outer end 1100B' of the outer seal assembly 1100'. The lip 1100L' is configured to sealingly and slidingly engage a portion of the stationary thrust plate 732 (e.g., radially outer circumferential edge 732Y, as shown in FIG. 29). In the embodiment depicted in FIG. 29, a shield 1100S1 (e.g., metallic) extends radially outward from the metallic retaining ring 1100F1'.

Figure 31:
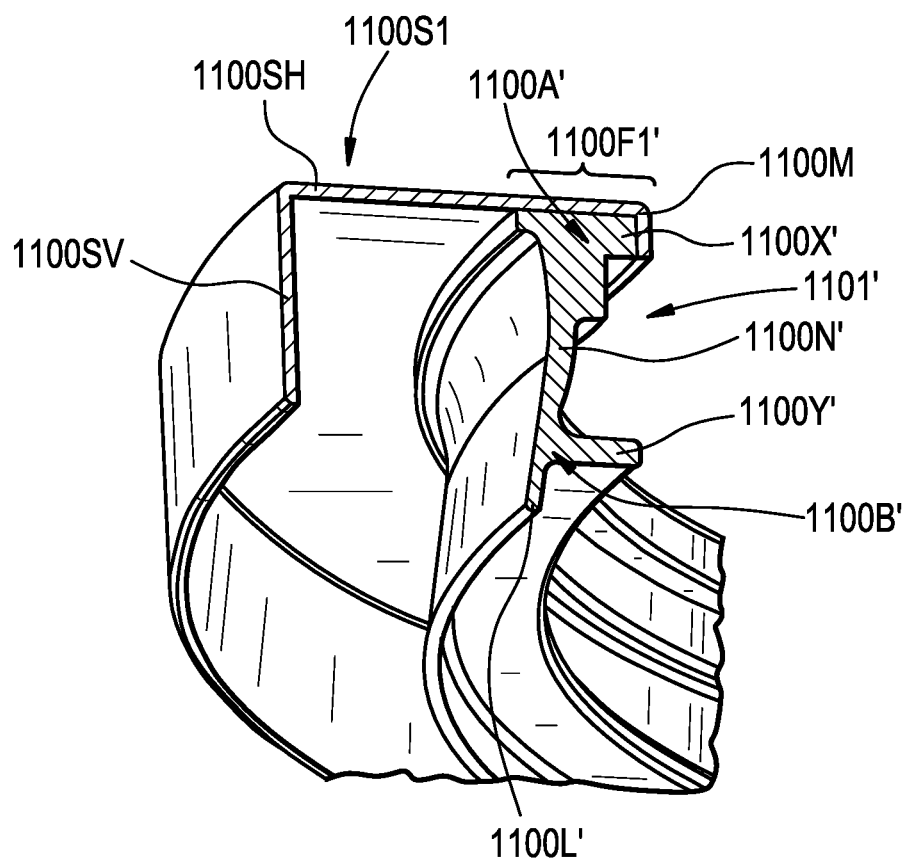
FIG. 31 is a cross sectional perspective view of the outer seal of FIG. 30 taken across section 31-31.
Figure 32:
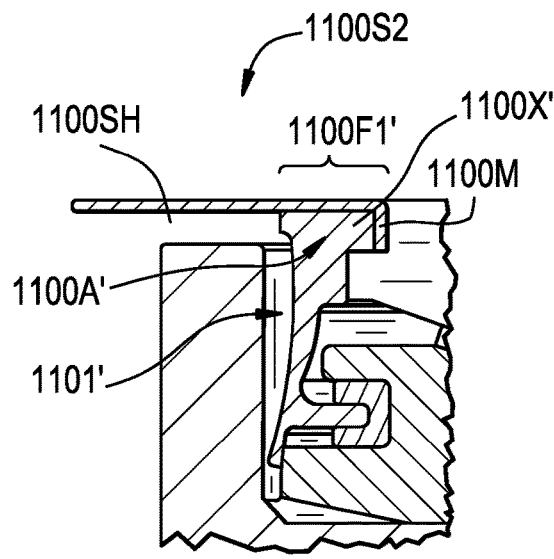
FIG. 32 is a cross sectional view of the outer seal of FIG. 29 with another embodiment of a shield.
Figure 33:
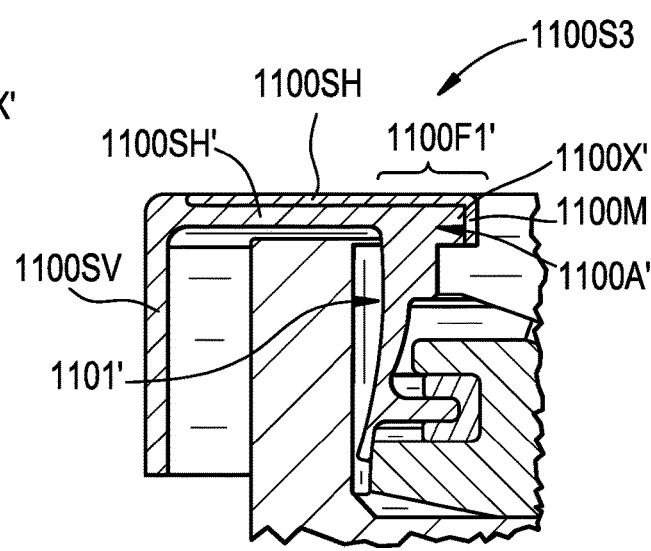
FIG. 33 is a cross sectional view of the outer seal of FIG. 29 with another embodiment of a shield.
Figure 34:
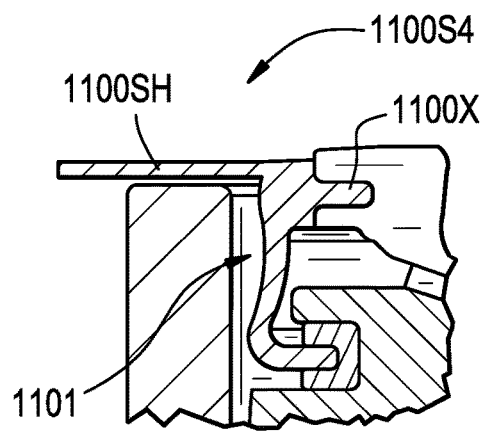
FIG. 34 is a cross sectional view of the outer seal of FIG. 28 with another embodiment of a shield.
Figure 35:
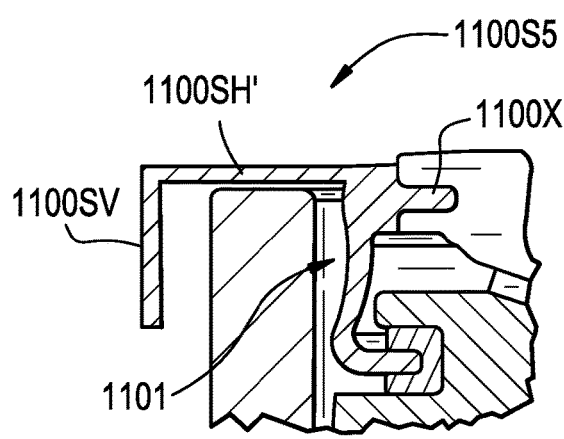
FIG. 35 is a cross sectional view of the outer seal of FIG. 28 with another embodiment of a shield.

As shown in FIGS. 30-35, the outer ring 1101, 1101' has a shield 1100S1, 1100S2, 1100S3, 1100S4, 1100S5 extending radially outward, away from the anchor leg 1100X, 1100X'. FIG. 31 depicts the shield 1100S1 in the form of a metallic ring with a retaining ring 1100F1' integrated into a shield radial extending portion 1100SH proximate to the first outer end 1100A'. The shield radial extending portion 1100SH of the shield 1100S1 extends radially outward from the mounting portion 1100M proximate to the first outer end 1100A, 1100A' to a radially outward shield axial extending portion 1100SV. The shield axial extending portion 1100SV extends axially from the shield radial extending portion 1100SH concentric with the mounting portion 1100M. The shield 1100S2, as depicted in FIG. 32, is made from a metallic material with a shield radial extending portion 1100SH extending from the mounting portion 1100M. The shield 1100S2 omits a shield axial extending portion. Referring to FIG. 33, a portion of the shield 1100S3 forms a unitary member with the outer ring 1101'. A first shield radial extending portion 1100SH extends from the mounting portion 1100M and a second shield radial extending portion 1100SH' extends from the first outer end 1100A of the outer ring 1101'. A shield axial extending portion 1100SV extends from the second shield radial extending portion 1100SH'. The first shield radial extending portion 1100SH and the mounting portion 1100M are made from a metallic material. The second shield radial extending portion 1100SH' and the shield axial extending portion 1100SV are made from the same material (e.g. a metal, polymer or combinations thereof) as the outer ring 1101'. The retaining ring 1100F1' depicted in FIGS. 32 and 33 forms a portion of the metallic shield radial extending portion 1100SH. The retaining ring 1100F' extends radially outward from the mounting portion 1100M and covers the first outer end 1100A' of the outer ring 1101'. The retaining ring 1100F1' is bonded to the first outer end 1100A' of the outer annular ring 1101'. In the shield 1100S4 depicted in FIG. 34, the shield radial extending portion 1100SH and the outer ring 1101 form a single unitary member. Referring to FIG. 35, the shield axial extending portion 1100SV, the shield radial extending portion 1100SH and the outer ring 1101 form a single unitary member. The shields 1100S4, 110055 as depicted in FIGS. 34 and 35, respectively, omit retaining rings as described with reference to FIGS. 32 and 33. The shields 1100S1, 1100S2, 1100S3, 1100S4, 1100S5 are made from metallic materials, polymeric materials, and combinations thereof.

As best shown in FIG. 36A, an inner seal assembly 1200 for the thrust bearing assembly 600 includes a flexible inner annular ring 1201, a face seal ring 1200F, a compression seal 1200C (e.g., an O-ring) and a biasing unit 1200U (e.g., a coil spring, a disc spring or a stack of disc springs). The flexible inner annular ring 1201 extends between a first inner end 1200A and a second inner end 1200B. The flexible inner annular ring 1201 has a serpentine shape with a radially outward-opening C-shaped cross section that transitions into a radially inward-opening C-Shaped cross section. The radially outward-opening C-shaped cross section has an anchor leg 1200X extending radially outward proximate to the first inner end 1200A, a radially extending transition leg 1200T and a first flexible neck 1200N1 extending therebetween. The anchor leg 1200X axially engages a retainer ring 1200M to secure the inner annular ring 1201 within a shoulder 731S of a rotatable thrust plate 731 of the thrust bearing assembly 600 (as depicted in FIG. 28). The first flexible neck 1200N1 extends between the anchor leg 1200X and the radially extending transition leg 1200T. The radially inward-opening C-Shaped cross section has a sealing leg 1200Y extending in the radially inward direction, proximate to the second inner end 1200B and a second flexible neck 1200N2 extending between the sealing leg 1200Y and the radially extending transition leg 1200T. The transition leg 1200T, the second flexible neck 1200N2 and the sealing leg 1200Y define a radially inward facing pocket 1200P1.

The face seal ring 1200F extends between a first end 1200FA and a second end 1200FB and defines a radially outward facing pocket 1200P2 proximate to the first end 1200FA. The sealing leg 1200Y engages the radially outward facing pocket 1200P2 and the first end 1200FA of the face seal ring 1200F engages the radially inward facing pocket 1200P1 formed by the radially inward opening C-shaped cross section of the inner annular ring 1201. The sealing leg 1200Y elastically biases, in the radially inward direction, into the radially outward facing pocket 1200P2 of the face seal ring 1200F. The face seal ring 1200F is made from a lubricious material (e.g., plastic, PTFE) that sealingly slides on the axial facing surface 732X of a stationary thrust plate 732 (as depicted in FIG. 28). The face seal ring 1200F has an axially facing groove 1200G, opening towards the axial facing surface 732X of the stationary thrust plate 732. The compression seal 1200C is disposed in the axially facing groove 1200G. The compression seal 1200C of the inner seal assembly 1200 is made from an elastic material and the compressed compression seal 1200C is compressed by 10% to 20% of a size of the compression seal 1200C in a relaxed state. The biasing unit 1200U axially engages an axial surface 1200FX of the face seal ring 1200F, urges the face seal ring 1200F axially away from the first inner end 1200A and compresses the compression seal 1200C against the axial facing surface 732X of the stationary thrust plate 732 as shown in FIG. 28.

As shown in FIG. 36A, the inner seal assembly 1200 has a retainer ring 1200M secured to the anchor leg 1200X. The retainer ring 1200M is configured to secure the flexible inner annular ring 1201 in a shoulder 731S formed in the rotatable thrust plate 731 of the thrust bearing assembly 600 (as depicted in FIG. 28). The biasing unit 1200U of the inner seal assembly 1200 surrounds the flexible inner annular ring 1201 and axially engages the retainer ring 1200M. The retainer ring 1200M has a metallic core 1200MC covered with an elastomeric layer 1200ME. The retainer ring 1200M has an L-shaped cross section with a radially extending portion 1200M1 and an axially extending portion 1200M2.

Referring to FIG. 28, the compression seal 1200C is shown sealing against the axial facing surface 732X of the stationary thrust plate 732. The biasing unit 1200U is compressed between the face seal ring 1200F and a receiving surface 731R of the rotatable thrust plate 731. The biasing unit 1200U urges the face seal ring 1200F towards the axial facing surface 732X of the stationary thrust plate 732 and thereby compresses the compression seal 1200C against the axial facing surface 732X for sealing and engagement with the stationary thrust plate 732. The face seal ring 1200F stretches the sealing leg 1200Y radially outwards, from a relaxed diameter to an engaged diameter that is 10% to 20% larger than the relaxed diameter.

As shown in FIGS. 37A-42, two axially spaced shaft seal assemblies 1300, 1300' and 1400, 1400' seal a shaft 536 in a bore 526. The shaft seal assembly 1300, 1301', 1400, 1401' includes a flexible annular ring 1301, 1301', 1401, 1401' extending in a generally longitudinal direction and a biasing unit 1330, 1430 that exerts a biasing force on the flexible annular ring 1301, 1301', 1401, 1401' in the radially inward direction. The flexible annular ring 1301, 1401 extends between an anchor end 1301A, 1401A and a distal end 1301B, 1401B thereof. The upper shaft seal assembly 1300, 1400 is installed in an orientation that is a mirror image with the lower shaft seal assembly 1300', 1400'. In other words, the distal end 1301B, 1401B of the upper shaft seal assembly 1300, 1400 axially faces the distal end 1301B', 1401B' of the lower shaft seal assembly 1300', 1400'.

Figure 38:
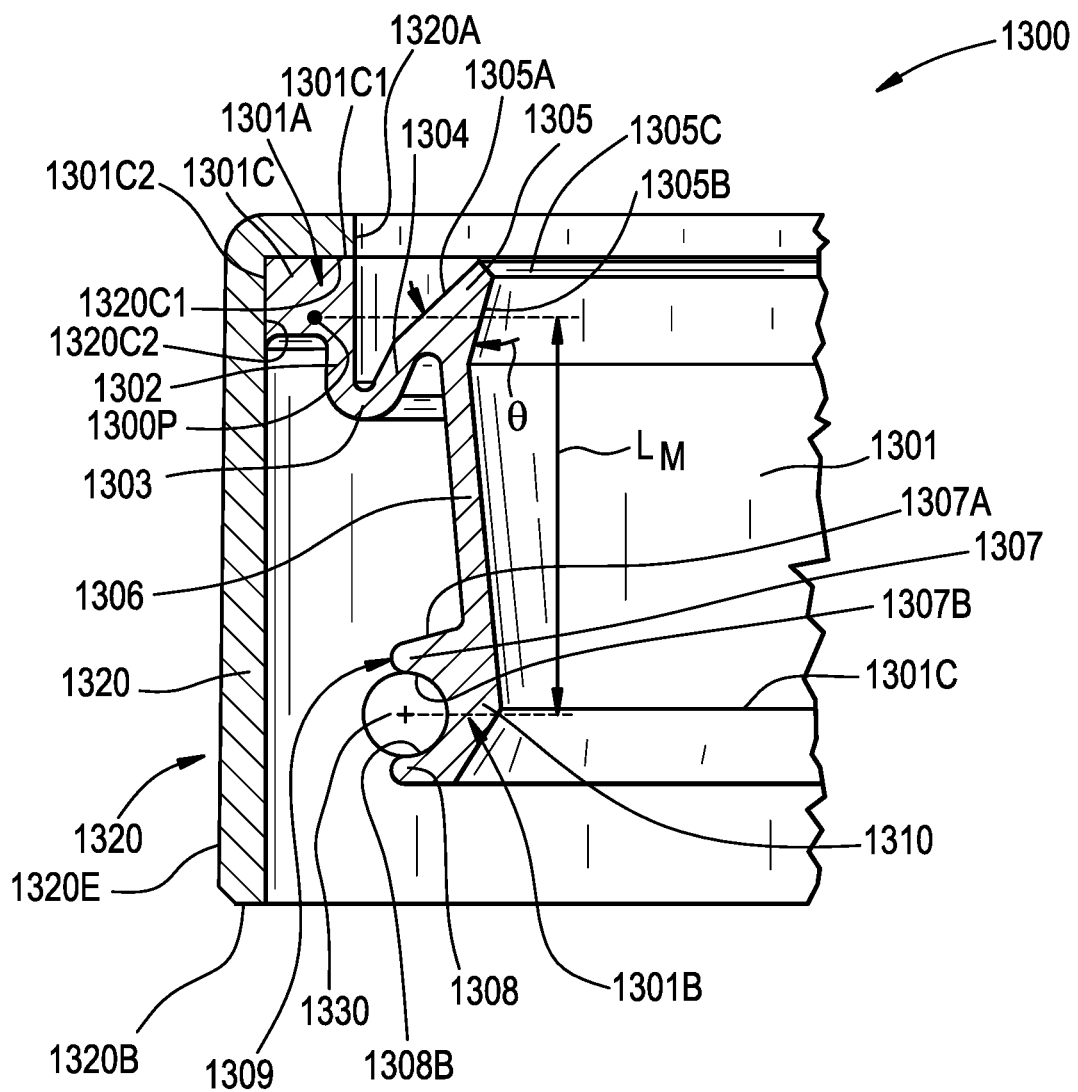
FIG. 38 is a cross sectional view of one of the shaft seals of FIG. 37A.
Figure 41A:
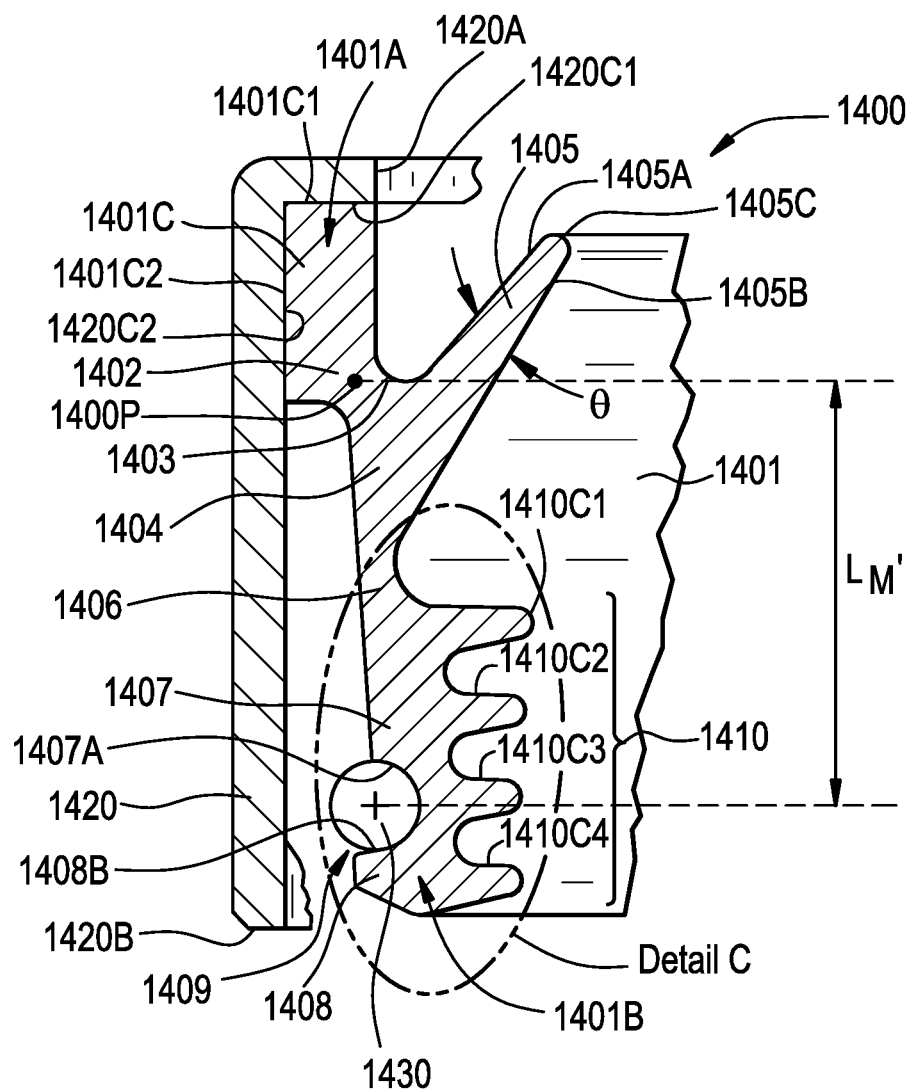
FIG. 41A is a cross sectional view of one of the shaft seals of FIG. 40.

Referring to FIGS. 38 and 41A, the flexible annular ring 1301, 1401 includes a connector leg 1302, 1402 extending longitudinally from the base 1301C, 1401C. The flexible annular ring 1301, 1401 includes a bend 1303, 1403 extending from the connector leg 1302, 1402 and a transition leg 1304, 1404 extending from the bend 1303, 1403. The connector leg 1302, 1402 is located radially inward from the connector leg 1302, 1402. The transition leg 1304, 1404 is positioned radially inward from the bend 1303, 1403. The lip seal 1305, 1405 extends from the transition leg 1304, 1404 and is located radially inward from the transition leg 1304, 1404. The biasing unit 1330, 1430 exerts a radially inward directed biasing force proximate the distal end 1301B, 1401B of the annular ring 1301, 1401 to move the compression seal 1310, 1410 radially inward. The compression seal 1310, 1410 has a receiving area 1309, 1409 on a radially outward side thereof. The biasing unit 1330, 1430 is disposed in the receiving area 1309, 1409, urging the compression seal 1310, 1410 radially inward for sealing against the shaft 536. The connector leg 1302, 1402, the bend 1303, 1403, and the transition leg 1304, 1404 accommodate wear of the self-lubricating sleeve 58 and accommodate radial displacement of the shaft 536, ensuring contact between the shaft seal assemblies 1300, 1300', 1400, 1400' and the shaft 536 and allowing radial movement of the shaft 536.

Figure 43:
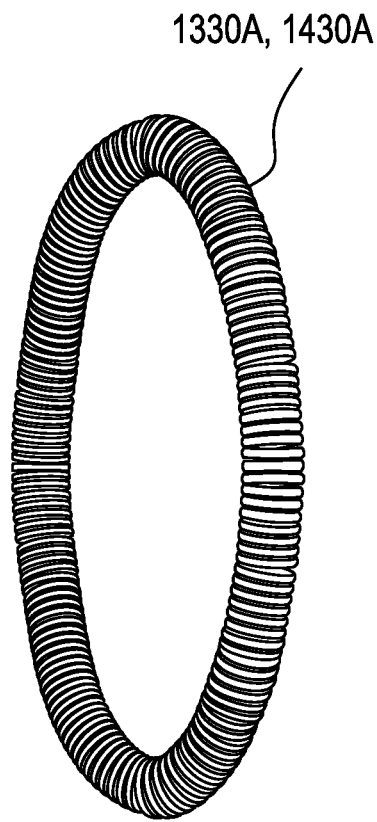
FIG. 43 is a perspective view of a garter spring employed with the shaft seals of FIGS. 37A and 40.
Figure 44:
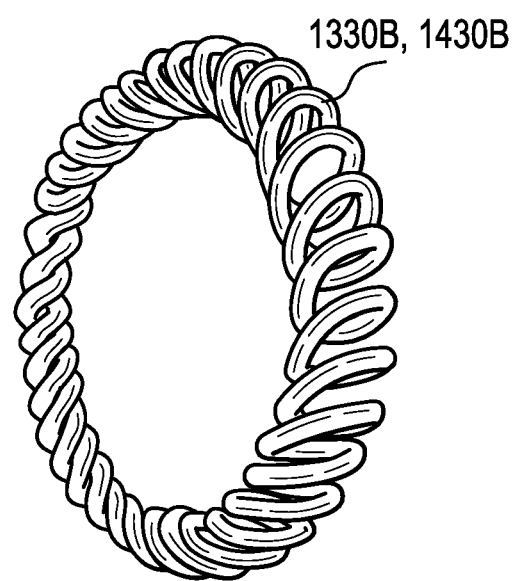
FIG. 44 is a perspective view of a canted garter spring within an annular ring, the canted garter spring employed with the shaft seals of FIGS. 37 and 40.
Figure 45:
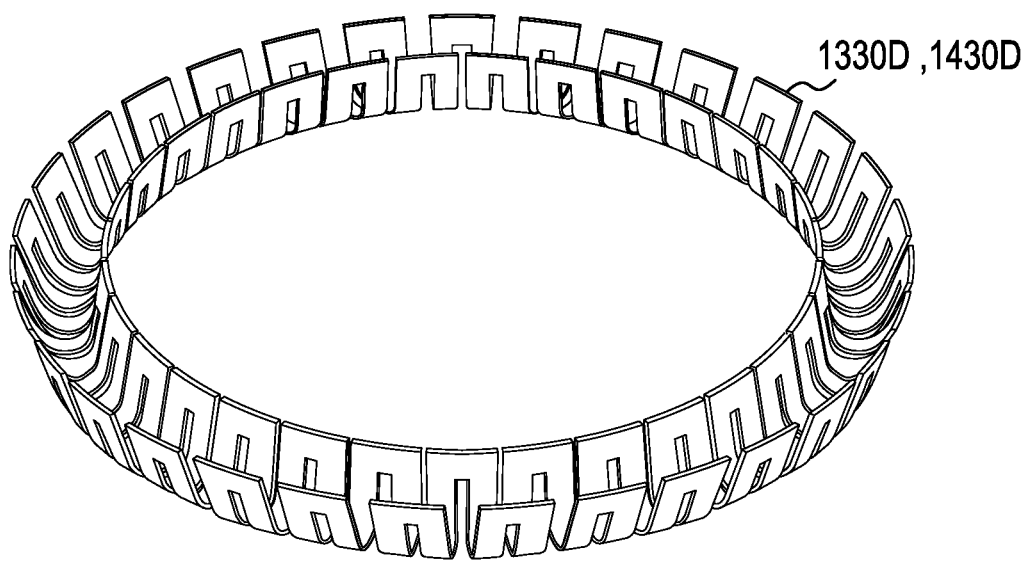
FIG. 45 is a perspective view of a garter spring with a U-Shaped cross section within an annular ring, the garter spring employed with the shaft seals of FIGS. 37 and 40.
Figure 46:
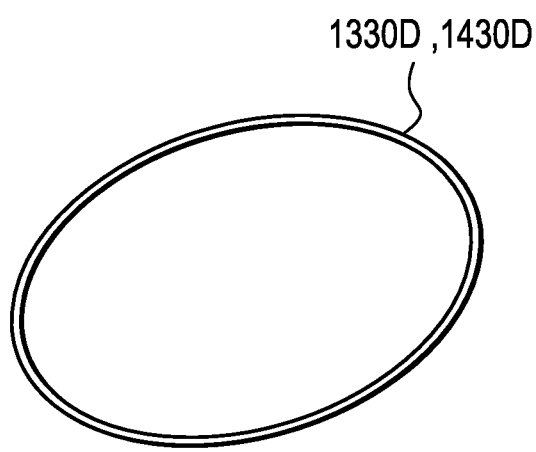
FIG. 46 is a perspective view of a solid ring employed with the shaft seals of FIGS. 37A and 40.

Referring to FIGS. 38 and 41A, the base 1301C, 1401C is located proximate to the anchor end 1301A, 1401A and has mounting surfaces 1301C1, 1301C2, 1401C1, 1401C2 thereon. Examples of the form of the biasing unit 1330, 1430 of the shaft seal assembly 1300, 1300', 1400, 1400', are depicted in FIGS. 43-46. FIG. 43 depicts the biasing unit 1330, 1430 in the form of a garter spring 1330A, 1430A. A garter spring is a coiled spring that is connected at each end to form an annular spring. The garter spring 1330A, 1430A is an extension garter spring that exerts a biasing force in the inward radial direction. FIG. 44 depicts the biasing unit 1330, 1430 in the form of a canted garter spring 1330B, 1430B. A canted garter spring is a coiled spring with each rotation of the spring angled relative to a line normal to a longitudinal axis centered within the coiled spring. This canted coil spring is connected at each end to form an annular spring. The canted garter spring 1330B, 1430B is an extension canted garter spring that exerts a biasing force in the inward radial direction. FIG. 45 depicts the biasing unit 1330, 1430 in the form of an annular meander spring 1330C, 1430C with a U-shaped cross-section. A meander spring has a flattened spring coil extending with abrupt alternating turns in opposing directions (i.e., forming a zigzag configuration). The meander spring 1330C, 1430C bends the flattened spring coil to form a substantially U-shaped cross-section. FIG. 46 depicts the biasing unit 1330, 1430 in the form of an O-ring 1330D, 1430D. The biasing unit 1330, 1430 depicted in FIG. 43 or 44 is preferred, but the thrust bearing assembly 600 disclosed herein also can employ the biasing units 1330, 1430 depicted in FIG. 45 or 46. In one embodiment, the biasing unit 1330, 1430 is a round snap ring made of a corrosion resistant material such as stainless steel, a plastic or an elastomer.

Figure 39:
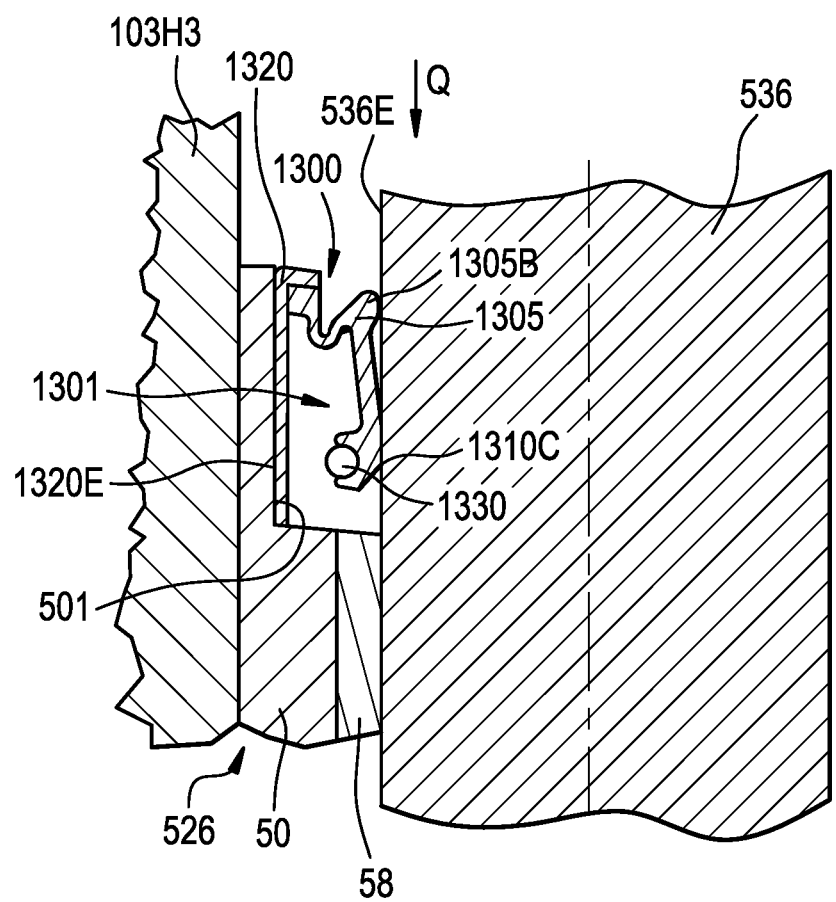
FIG. 39 is an enlarged perspective view of one of the shaft seals of FIG. 37A.
Figure 42:
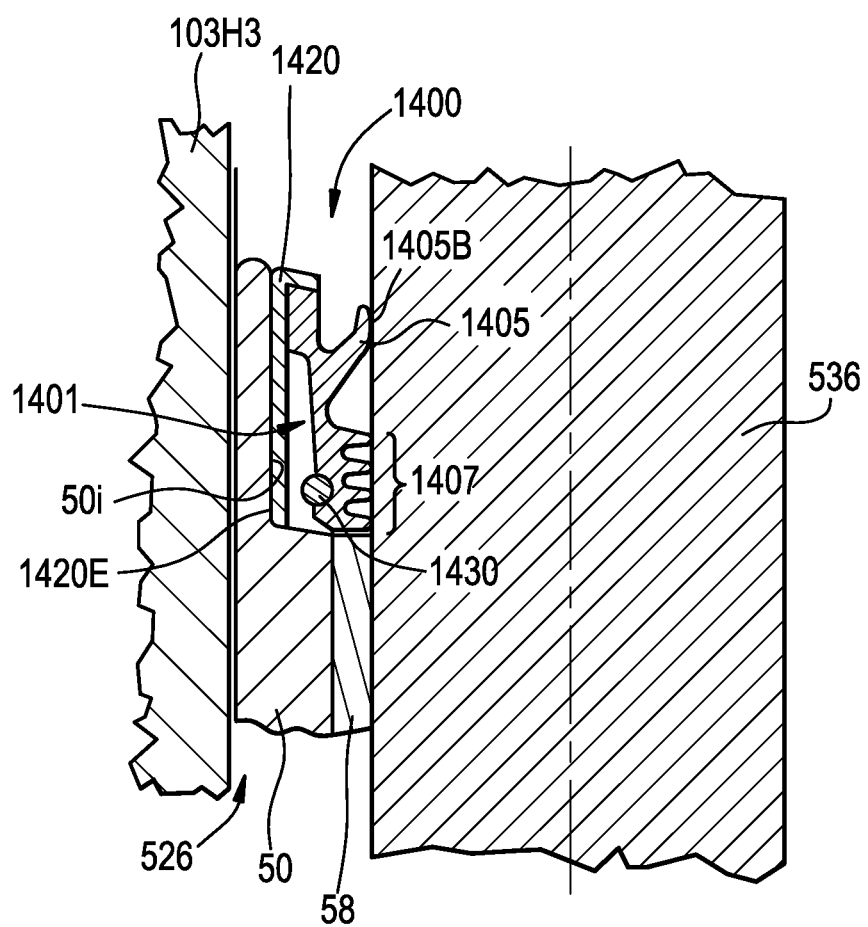
FIG. 42 is an enlarged perspective view of one of the shaft seals of FIG. 40.

Referring to FIGS. 38 and 41A, the shaft seal assembly 1300, 1400 also includes a retaining ring 1320, 1420. The retaining ring 1320, 1420 extends from a first end 1320A, 1420A to a second end 1320B, 1420B. Mounting surfaces 1320C1, 1320C2, 1420C1, 1420C2 of the retaining ring 1320, 1420 engage corresponding mounting surfaces 1301C1, 1301C2, 1401C1, 1401C2 on the shaft seal assembly 1300, 1400. Referring to FIGS. 39 and 42, an exterior surface 1320E, 1420E of the retaining ring 1320, 1420 radially engages an interior surface 50i of the outer sleeve 50. There is an interference fit of between 0.012 inches and 0.030 inches between the retaining ring 1320, 1420 and the interior surface 50i of the outer sleeve 50. The base 1301C, 1401C is secured to the retaining ring 1320, 1420.

Figure 37A:
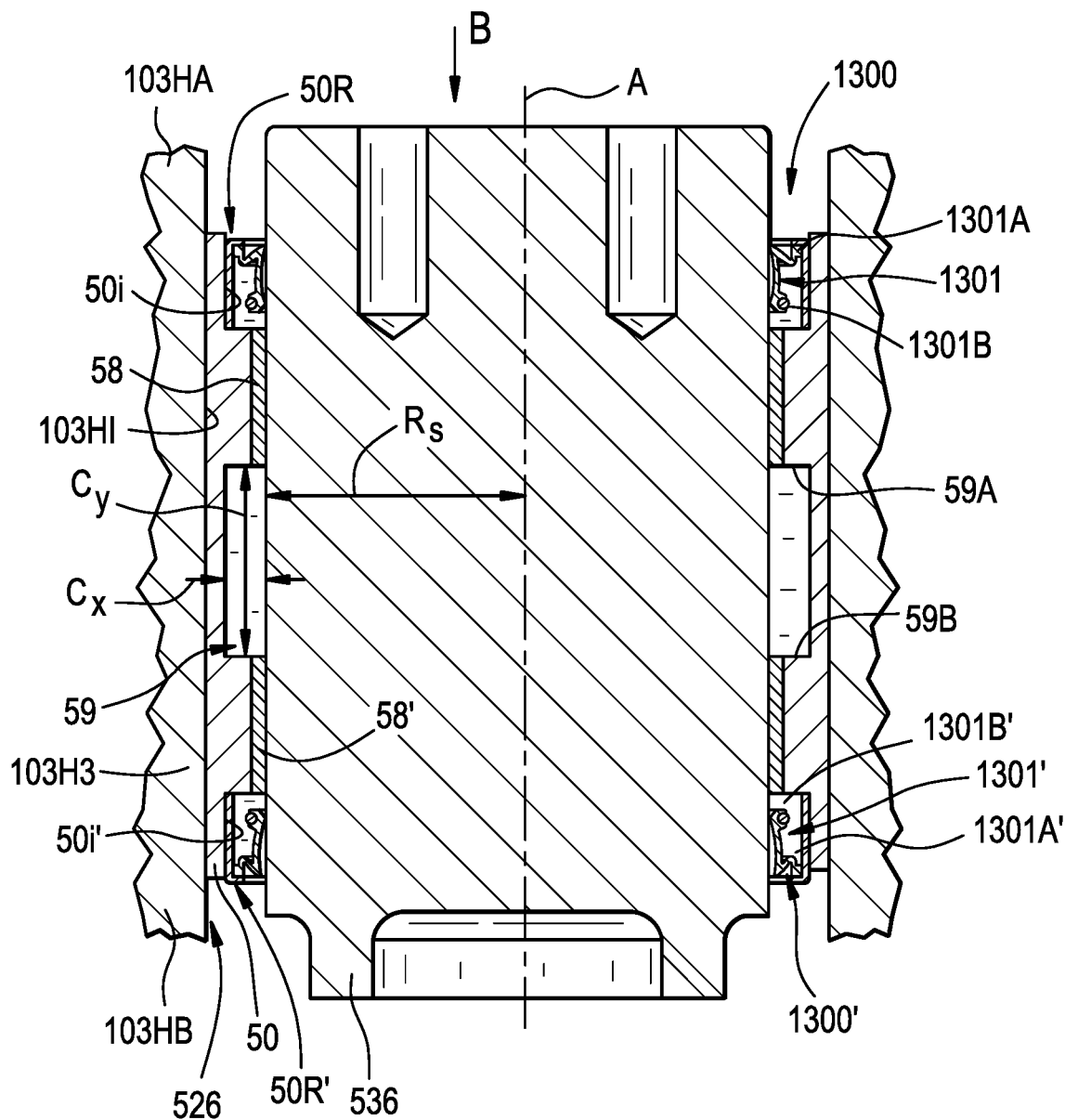
FIG. 37A is a cross sectional view of a shaft sealing system of the present invention.
Figure 40:
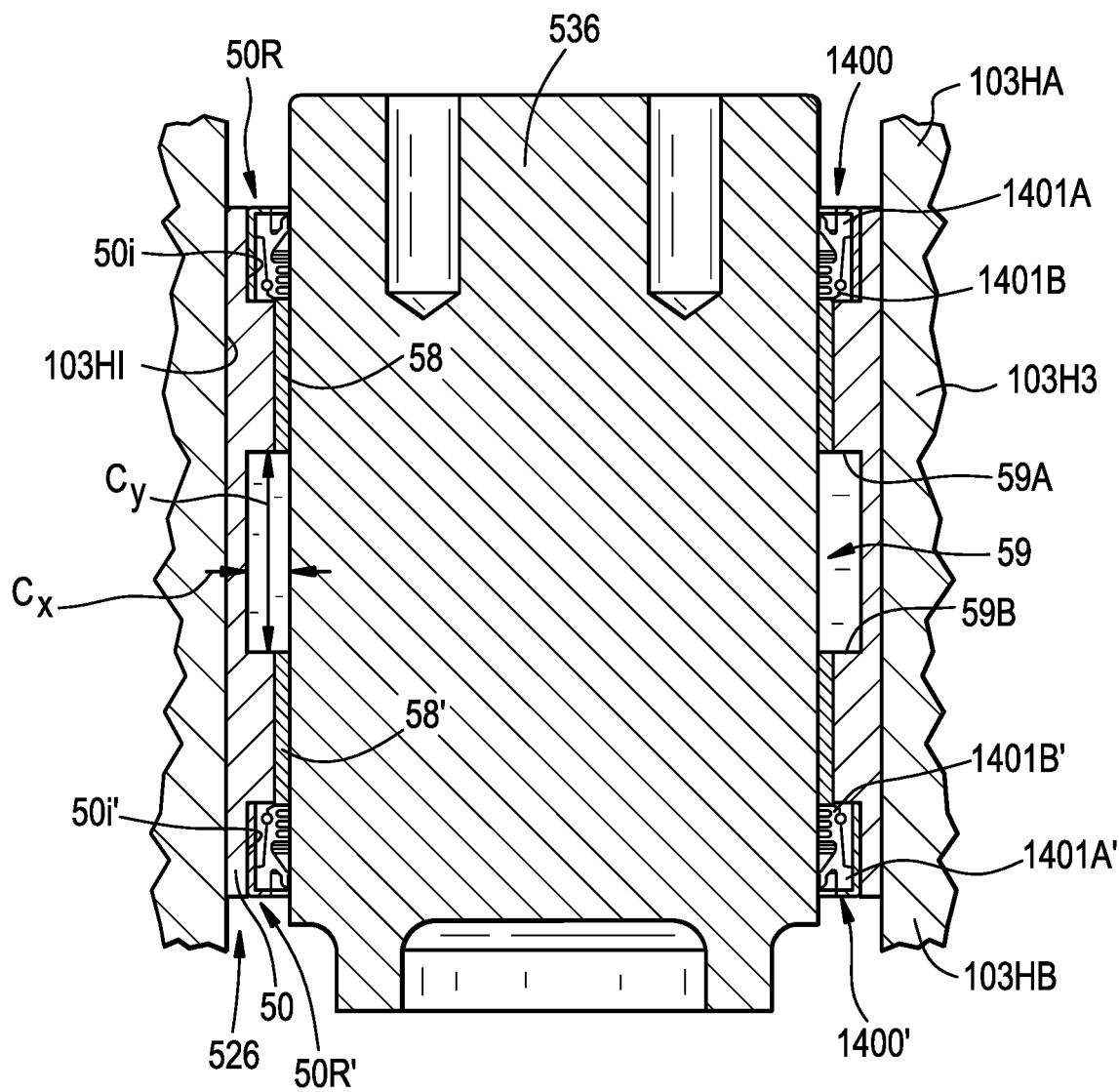
FIG. 40 is another embodiment of a shaft sealing system of the present invention.

Referring to FIGS. 38 and 41A, the lip seal 1305, 1405 of the shaft seal assembly 1300, 1400 has a first surface 1305A, 1405A and a second surface 1305B, 1405B that is oriented at an angle β from the first surface 1305A, 1405A. The angle β ensures adequate stiffness to prevent the lip seal 1305, 1405 from folding, especially during assembly. In other words, the lip seal 1305, 1405 is oriented in a specific manner to ensure that only the second surface 1305B, 1405B of the lip seal 1305, 1405 contacts and seals against the shaft 536 (as depicted in FIGS. 37A and 40). Each lip seal 1305, 1405 accommodates radial movement of 0.060 inches of the shaft 736 therein. The interference fit between the lip seal 1305, 1405 and the shaft 736 is between 0.007 inches and 0.060 inches and the interference fit between the compression seal 1410 and the shaft 736 is between 0.007 inches and 0.020 inches.

Figure 41B:
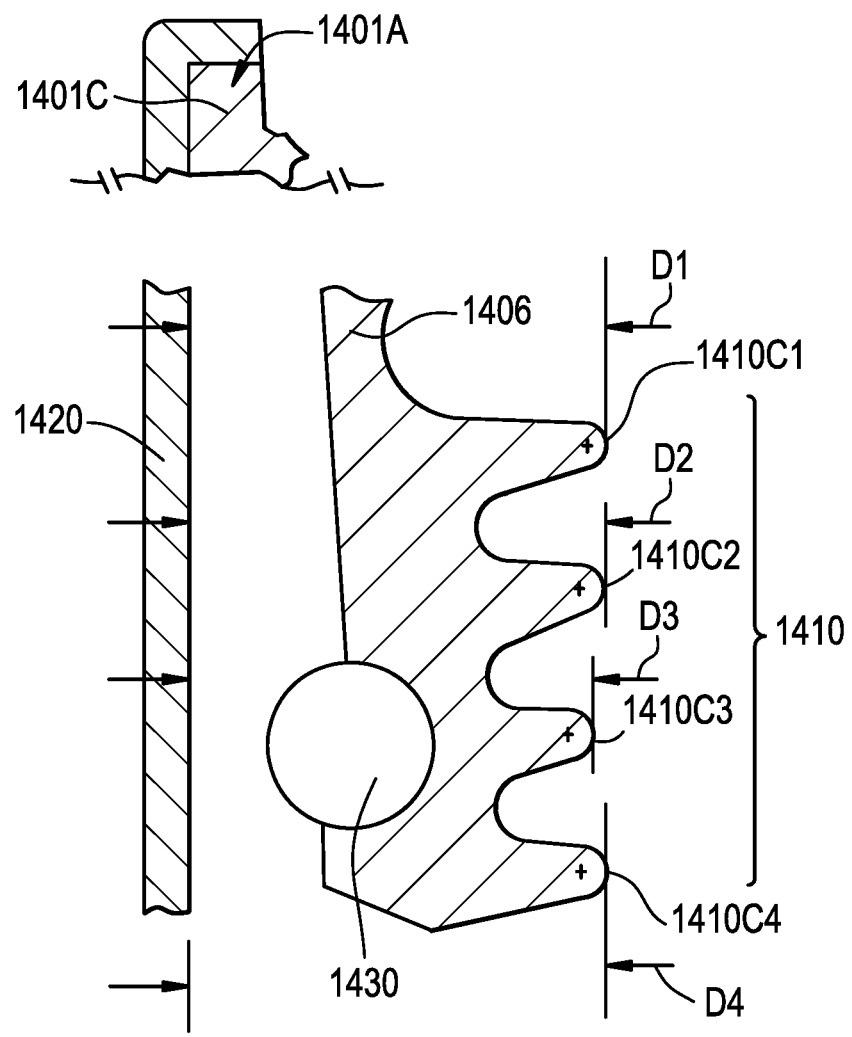
FIG. 41B is an enlarged view of the compression seal portion of Detail B of FIG. 41A.

Referring to FIG. 39, the shaft seal assembly 1300 has two sealing points of contact, namely the second surface 1305B and a sealing surface 1310C, provided by the compression seal 1310. As shown in FIGS. 41A and 41B, the compression seal 1410 of the shaft seal assembly 1400 includes a plurality of sealing surfaces 1405B, 1410C1, 1410C2, 1410C3, 1410C4. As shown in FIG. 41B, the plurality of sealing surfaces 1410C1, 1410C2, 1410C3, 1410C4 of the shaft seal assembly 1400 each extend a predetermined distance D1, D2, D3, D4 radially inward from a reference line A1 that lies along the base 1401C, parallel to the shaft 536. Each of the predetermined distances D1, D2, D3, D4 is selected such that the plurality of sealing surfaces 1410C1, 1410C2, 1410C3, 1410C4 simultaneously contact that shaft 536 when the compression seal 1410 is deflected radially inward, from a relaxed position to a deflected position by the biasing unit 1430. The biasing unit 1430 of the shaft assembly 1400 is positioned in a predetermined position $L_M$ relative to a pivot point 1400P, longitudinally away from the bend 1403, to provide a uniform compression of the plurality of sealing surfaces 1410C1, 1410C2, 1410C3, 1410C4 against the shaft 536. Finite Element Analysis ("FEA") was used to determine the distances D1, D2, D3, D4 to ensure contact of all four sealing surfaces 1410C1, 1410C2, 1410C3, 1410C4.

Referring to FIG. 38, the biasing unit 1330 has a moment arm length $L_M$, measured from the pivot point 1300P located between the base 1401C and the transition leg 1404 to the center of the biasing unit 1330, 1430. The moment arm length $L_M$ of each shaft assembly 1300, 1400 was determined using FEA to ensure that the sealing surfaces 1310C, 1410C1, 1410C2, 1410C3, 1410C4 remain in contact with the shaft 736 as the self-lubricating sleeve 58 wears and as the shaft 536 oscillates and moves radially.

FIGS. 37A and 40 each depict two shaft seal assemblies 1300, 1300' and 1400, 1400', that seal against the shaft 536. A housing 103H3 has an inside surface 103HI, forming a bore extending through the housing 103H3. An outer sleeve 50, 50' is retained within the inside surface 103HI of the housing 103H3. A first annular recess 50R extends radially outward into an inside surface 50i, 50i' of the outer sleeve 50, 50' proximate a first housing end 103HA. A second annular recess 50R' extends radially outward into the inside surface 50i, 50i' of the outer sleeve 50, 50' proximate a second housing end 103HB. The shaft 536 extends into the bore formed by the inside surface 50i, 50i' of the outer sleeve 50, 50'. A first shaft seal assembly 1300, 1400 is disposed in the first recess 50R such that the anchor end 1301A, 1401A is proximate the first housing end 103HA. A second shaft seal assembly 1300', 1400' is disposed in the second recess 50R' such that the anchor end 1301A', 1401A' is proximate the second housing end 103HB.

Referring to FIGS. 37A and 40, a first self-lubricating sleeve 58 extends between the outer sleeve 50, 50' and the shaft 536 proximate to the first shaft seal assembly 1300, 1400. A second self-lubricating sleeve 58' extends between the outer sleeve 50, 50' and the shaft 536 proximate to the second shaft seal assembly 1300', 1400'. The self-lubricating sleeves 58, 58' surround the shaft 536. The shaft seal assemblies 1300, 1300', 1400, 1400' are each retained within an annular shoulder formed in an outer sleeve 50. A self-lubricating sleeve 58 is disposed radially between the outer sleeve 50 and the shaft 536 proximate one of shaft seal assemblies 1300, 1400. A separate self-lubricating sleeve 58' is disposed radially between the outer sleeve 50 and the shaft proximate the other of the shaft seal assemblies 1300', 1400'. In one embodiment, the self-lubricating sleeves 58, 58' each have a thickness T2 of approximately 0.60 inches and are each adhered to the outer sleeve 50 such that the self-lubricating sleeves 58, 58' slidingly engage the shaft 536. A center groove 59 spans an axial distance $C_Y$ between the two self-lubricating sleeves 58, 58', forming the center groove 59 between two axially spaced ends 59A, 59B thereof.

Figure 37B:
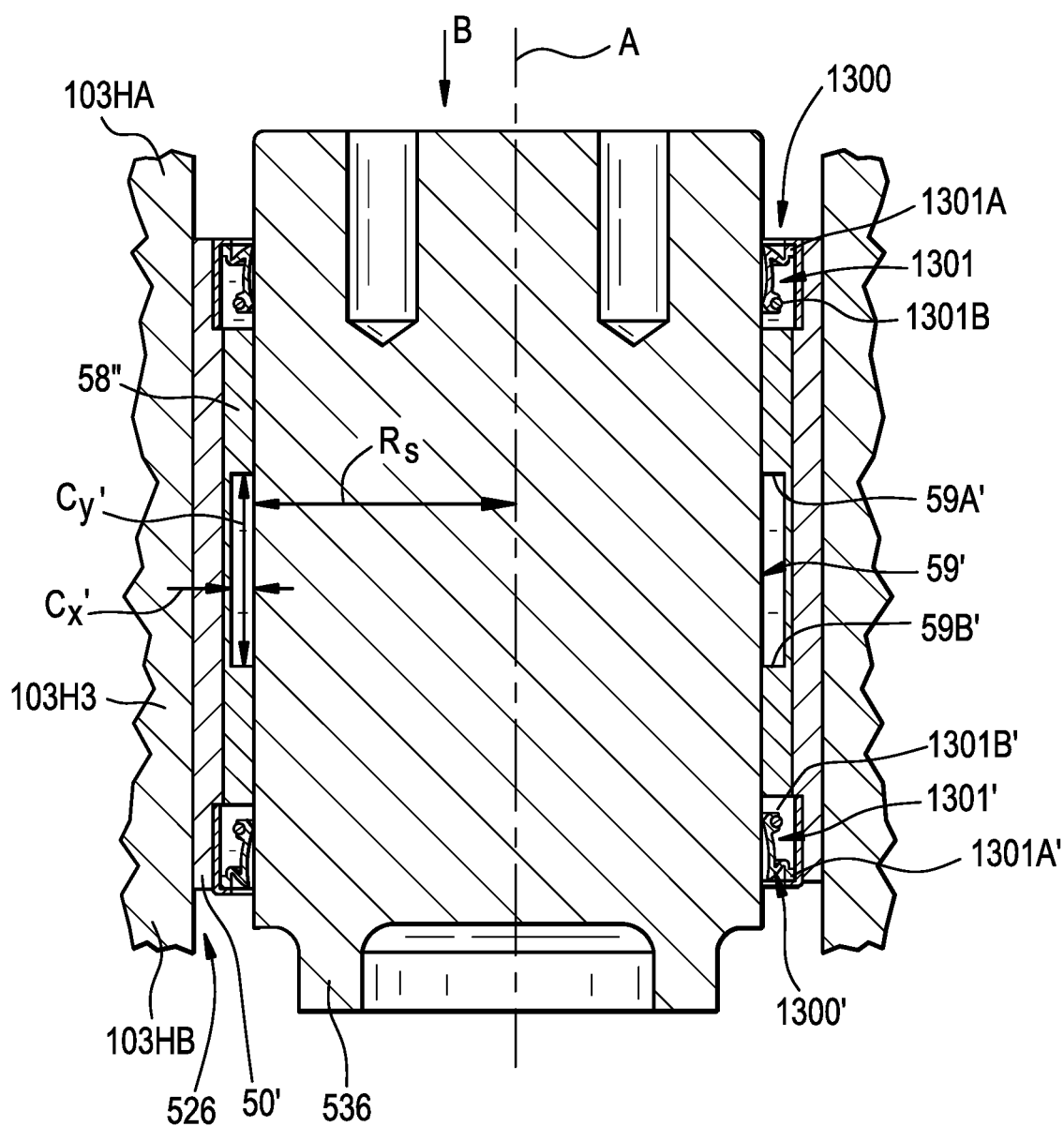
FIG. 37B is a cross sectional view of a shaft sealing system of the present invention including an alternative outer sleeve and self-lubricating sleeve.

In one embodiment, as depicted in FIGS. 37A and 40, the center groove 59 extends into the outer sleeve 50 in the radial direction. In one embodiment, as depicted in FIG. 37B, a center groove 59' extends only into a self-lubricating sleeve 58". The center groove 59 has a radial thickness $C_X$ surrounding the shaft 536 with a shaft radius $R_S$. The center groove 59 forms an annular volume $V_C$ that can be expressed by the following equation:

$$V_C = \pi C_Y(C_C + R_S)^2 - \pi C_Y(R_S)^2$$

that simplifies to the following equation:

$$V_C = \pi C_Y(C_X^2 + 2C_X R_S).$$

The center groove 59 has a volume that is 75% to 110% of the volume of the self-lubricating sleeves 58, 58', as installed. The center groove 59' has a volume that is 75% to 110% of the volume of the self-lubricating sleeve 58", as installed. During operation, the self-lubricating sleeves 58 wear and debris from the sleeves 58 collects within the center groove 59. The volume of the center groove 59 ensures that the debris from the self-lubricating sleeve 58 wear does not enter the engagement area between the shaft seal assemblies 1300, 1400 and the shaft 536 and prevents the debris from exiting the journal bearing assembly 500 or otherwise impacting the functionality of the journal bearing assembly 500 (e.g. eliminating having debris push the seals 1300, 1300', 1400, 1400' out of the cavity formed between the outer sleeve 50 and the shaft 536).

Although the invention is described with reference to particular embodiments thereof, it will be understood by one of ordinary skill in the art, upon a reading and understanding of the foregoing disclosure that numerous variations and alterations to the disclosed embodiments will fall within the scope of this invention and of the appended claims.

What is claimed is:

1. An outer seal assembly in a thrust bearing assembly, the outer seal assembly comprising:
    a flexible outer annular ring extending between a first outer end and a second outer end and having a radially inward-opening C-shaped cross section comprising:
    (a) an anchor leg extending radially inward proximate the first outer end, the anchor leg securing the outer annular ring to an outer receiving area of a rotatable thrust plate of the thrust bearing assembly;
    (b) a flexible neck extending between the first outer end and the second outer end; and
    (c) a sealing leg extending radially inward proximate the second outer end; and
    a sliding ring having a pocket formed therein, the sealing leg being secured in the pocket, the sliding ring comprising a lubricious material and being slideably positioned in a groove of a stationary thrust plate of the thrust bearing assembly and at least one of the sealing leg and the pocket tapers to improve retention of the sealing leg within the groove during rotation of the sliding ring within the stationary thrust plate.

2. The outer seal assembly of claim 1, wherein the sealing leg is elastically biased radially inward into the pocket.

3. The outer seal assembly of claim 1, further comprising a lip extending axially away from the second outer end, wherein the lip sealingly and slidingly engages a portion of the stationary thrust plate of the thrust bearing assembly.

4. The outer seal assembly of claim 1, further comprising a metallic retaining ring secured to the first outer end, the retaining ring having a mounting portion thereon, wherein the mounting portion is press fit into the receiving area.

5. The outer seal assembly of claim 1, further comprising a shield extending radially away from the first outer end.

6. The outer seal assembly of claim 1, wherein an axial outward facing upper surface of the sealing leg and an axial inward facing lower surface of the sealing leg both terminate at a radial inward facing engagement surface and at least a portion of at least one of the axial outward facing upper surface and the axial inward facing lower surface is oriented at a draft angle α measured relative to a horizontal reference line and the draft angle α being configured to improve retention of the sealing leg within the pocket as the sliding ring rotates in the groove of the stationary thrust plate.

7. The outer seal assembly of claim 1, wherein the pocket is defined by a shape comprising a radially outward-opening C-shaped cross section having an axial inward facing upper sliding surface, an axial outward facing lower sliding surface and a radial outward facing pocket surface extending therebetween, at least one of the axial inward facing upper sliding surface and the axial outward facing lower sliding surface is oriented at a draft angle β measured relative to a horizontal reference line and the draft angle β being configured to improve retention of the sealing leg within the pocket as the sliding ring rotates in the groove of the stationary thrust plate.

8. The outer seal assembly of claim 1, wherein the pocket is defined by a shape comprising a radially outward-opening C-shaped cross section having an axial inward facing upper sliding surface, an axial outward facing lower sliding surface and a radial outward facing pocket surface extending therebetween, at least a portion of the axial inward facing lower sliding surface is oriented at a draft angle β measured relative to a horizontal reference line and the draft angle β being configured to improve retention of the sealing leg within the pocket as the sliding ring rotates in the groove of the stationary thrust plate.

9. The outer seal assembly of claim 8, wherein the sliding ring rotates against an axial facing surface of the stationary thrust plate, at least a portion of the axial facing surface is oriented at a secondary draft angle γ and the secondary draft angle γ is measured relative to a horizontal reference line, and
    wherein at least one of the draft angle β and the secondary draft angle γ being configured to improve retention of the sealing leg within the pocket as the sliding ring rotates in the groove of the stationary thrust plate.

10. An inner seal assembly in a thrust bearing assembly, the inner seal assembly comprising:
    (i) a flexible inner annular ring extending between a first inner end and a second inner end, the flexible inner annular ring has a serpentine shape comprising a radially outward-opening C-shaped cross section that transitions into a radially inward-opening C-Shaped cross section, the radially outward-opening C-shaped cross section comprising:

(a) an anchor leg extending radially outward proximate the first inner end, the anchor leg being configured to secure the inner annular ring to an inner receiving area of a rotatable thrust plate of the thrust bearing assembly;
(b) a radially extending transition leg;
(c) a first flexible neck extending between the first inner end and the radially extending transition leg;
the radially inward-opening C-Shaped cross section comprising:
(d) a sealing leg extending radially inward proximate the second inner end; and
(e) a second flexible neck extending between the sealing leg and the radially extending transition leg;
(ii) a face seal ring, the second inner end being secured to the face seal ring, the face seal ring having a pocket formed therein, the sealing leg being secured in the pocket, at least one of the sealing leg and the pocket tapers to improve retention of the sealing leg within the pocket during rotation of the face seal ring, and the face seal ring comprising a lubricious material and being configured to slide on an axial facing surface of a stationary thrust plate of the thrust bearing assembly, the face seal ring having an axially facing groove opposite the axial facing surface of the stationary thrust plate;
(iii) a compression seal disposed in the axially facing groove, the compression seal sealing against the axial facing surface of the stationary thrust plate;
(iv) a biasing unit axially engaging the face seal ring and compressed between the face seal ring and a receiving surface of the rotatable thrust plate, the biasing unit urging the face seal ring towards the axial facing surface of the stationary thrust plate and thereby compressing the compression seal against the axial facing surface of the stationary thrust plate for sealing and engagement with the axial facing surface of the stationary thrust plate.

11. The inner seal assembly of claim 10, wherein an axial outward facing upper surface of the sealing leg and an axial inward facing lower surface of the sealing leg both terminate at a radial inward facing engagement surface and at least a portion of at least one of the axial outward facing upper surface and the axial inward facing lower surface is oriented at a draft angle α measured relative to a horizontal reference line and the draft angle α being configured to improve retention of the sealing leg within pocket during rotation of the face seal ring.

12. The inner seal assembly of claim 10, wherein the pocket is defined by a shape comprising a radially outward-opening C-shaped cross section having an axial inward facing upper sliding surface, an axial outward facing lower sliding surface and a radial outward facing pocket surface extending therebetween, at least one of the axial inward facing upper sliding surface and the axial outward facing lower sliding surface is oriented at a draft angle β measured relative to a horizontal reference line and the draft angle β being configured to improve retention of the sealing leg within the pocket during rotation of the face seal ring.

13. The inner seal assembly of claim 10, further comprising: a retainer ring secured to the anchor leg, the retainer ring being configured to secure the flexible inner annular ring in a shoulder formed in the rotatable thrust plate of the thrust bearing assembly.

14. The inner seal assembly of claim 10, wherein the biasing unit surrounds the flexible inner annular ring.

15. The inner seal assembly of claim 10, wherein the retainer ring comprises a metallic core with an elastomeric layer thereon.

16. The inner seal assembly of claim 13, wherein the retainer ring has an L-shaped cross section.

17. The inner seal assembly of claim 10, wherein the pocket is radially outward facing and the sealing leg is elastically biased radially inward into the pocket.

18. The inner seal assembly of claim 10, wherein the compression seal comprises an elastic material and the compressed compression seal is compressed by 10 to 20 percent of a size of the compression seal in a relaxed state.

19. A seal assembly in a thrust bearing assembly comprising:
an outer seal assembly comprising a flexible outer annular ring extending between a first outer end and a second outer end and a sliding ring having a first pocket formed therein, the flexible outer annular ring having a radially inward-opening C-shaped cross section comprising:
(a) a first anchor leg extending radially inward proximate the first outer end, the first anchor leg securing the outer annular ring to an outer receiving area of a rotatable thrust plate of the thrust bearing assembly;
(b) a first flexible neck extending between the first outer end and the second outer end; and
(c) a first sealing leg extending radially inward proximate the second outer end;
the first sealing leg being secured in the first pocket, the sliding ring comprising a lubricious material and being slidable in a groove of a stationary thrust plate of the thrust bearing assembly;
an inner seal assembly disposed radially inward of the outer seal assembly, the inner seal assembly comprising a flexible inner annular ring extending between a first inner end and a second inner end, a face seal ring, a compression seal and a biasing unit;
the flexible inner annular ring has a serpentine shape comprising a radially outward-opening C-shaped cross section that transitions into a radially inward-opening C-Shaped cross section, the radially outward-opening C-shaped cross section comprising:
(a) a second anchor leg extending radially outward proximate the first inner end, the second anchor leg securing the inner annular ring to an inner receiving area of a rotatable thrust plate of the thrust bearing assembly;
(b) a radially extending transition leg;
(c) a second flexible neck extending between the first inner end and the radially extending transition leg;
the radially inward-opening C-Shaped cross section comprising:
(a) a second sealing leg extending radially inward proximate the second inner end; and
(b) a third flexible neck extending between the second sealing leg and the radially extending transition leg;
the face seal having an axially facing groove therein opposite the axial facing surface of the stationary thrust plate and the second inner end being secured to the face seal ring, the face seal ring having a second pocket formed therein, the second sealing leg being secured in the second pocket, the face seal ring comprising a lubricious material and being configured to slide on an axial facing surface of a stationary thrust plate of the thrust bearing assembly;

the compression seal disposed in the axially facing groove, the compression seal being configured to seal against the axial facing surface of the stationary thrust plate;

the biasing unit axially engaging the face seal ring and urging the face seal ring axially away from the first inner end and compressing the compression seal compressed between the face seal ring and a receiving surface of the rotatable thrust plate, the biasing unit urging the face seal ring towards the axial facing surface of the stationary thrust plate and thereby compressing the compression seal against the axial facing surface of the stationary thrust plate for sealing and engagement with the axial facing surface of the stationary thrust plate, wherein at least one of the first sealing leg and the first pocket tapers to improve retention of the first sealing leg within the first pocket during rotation of the sliding ring within the stationary thrust plate, and at least one of the second sealing leg and the second pocket tapers to improve retention of the second sealing leg within the second pocket during rotation of the face seal ring.

20. The seal assembly of claim 19, wherein an axial outward facing upper surface of the first sealing leg and an axial inward facing lower surface of the first sealing leg both terminate at a radial inward facing engagement surface and at least a portion of at least one of the axial outward facing upper surface and the axial inward facing lower surface is oriented at a draft angle α measured relative to a horizontal reference line and the draft angle α being configured to improve retention of the first sealing leg within the first pocket as the sliding ring rotates in the groove of the stationary thrust plate.

21. The seal assembly of claim 19, wherein the first pocket is defined by a shape comprising a radially outward-opening C-shaped cross section having an axial inward facing upper sliding surface, an axial outward facing lower sliding surface and a radial outward facing first pocket surface extending therebetween, at least one of the axial inward facing upper sliding surface and the axial outward facing lower sliding surface is oriented at a draft angle β measured relative to a horizontal reference line and the draft angle β being configured to improve retention of the first sealing leg within the first pocket as the sliding ring rotates in the groove of the stationary thrust plate.

22. The seal assembly of claim 19, wherein the first pocket is defined by a shape comprising a radially outward-opening C-shaped cross section having an axial inward facing upper sliding surface, an axial outward facing lower sliding surface and a radial outward facing first pocket surface extending therebetween, at least a portion of the axial inward facing lower sliding surface is oriented at a draft angle β measured relative to a horizontal reference line and the draft angle β being configured to improve retention of the first sealing leg within the first pocket as the sliding ring rotates in the groove of the stationary thrust plate.

23. The seal assembly of claim 19, wherein the sliding ring rotates against an axial facing surface of the stationary thrust plate, at least a portion of the axial facing surface is oriented at a secondary draft angle γ and the secondary draft angle γ is measured relative to a horizontal reference line, and wherein at least one of the draft angle β and the secondary draft angle γ being configured to improve retention of the first sealing leg within the first pocket as the sliding ring rotates in the groove of the stationary thrust plate.

24. The seal assembly of claim 19, wherein an axial outward facing upper surface of the second sealing leg and an axial inward facing lower surface of the second sealing leg both terminate at a radial inward facing engagement surface and at least a portion of at least one of the axial outward facing upper surface and the axial inward facing lower surface is oriented at a draft angle α measured relative to a horizontal reference line and the draft angle α being configured to improve retention of the second sealing leg within second pocket during rotation of the face seal ring.

25. The seal assembly of claim 19, wherein the second pocket is defined by a shape comprising a radially outward-opening C-shaped cross section having an axial inward facing upper sliding surface, an axial outward facing lower sliding surface and a radial outward facing second pocket surface extending therebetween, at least one of the axial inward facing upper sliding surface and the axial outward facing lower sliding surface is oriented at a draft angle β measured relative to a horizontal reference line and the draft angle β being configured to improve retention of the second sealing leg within the second pocket during rotation of the face seal ring.

26. An outer seal assembly comprising:
a flexible outer annular ring extending between a first outer end and a second outer end and having a radially inward-opening C-shaped cross section comprising:
(a) an anchor leg extending radially inward proximate the first outer end;
(b) a flexible neck extending between the first outer end and the second outer end; and
(c) a sealing leg extending radially inward proximate the second outer end; and
a sliding ring having a pocket formed therein, the sealing leg being secured in the pocket, the sliding ring comprising a lubricious material;
a lip extending axially away from the second outer end; and
at least one of the sealing leg and the pocket has a taper thereon.

* * * * *